Feb. 3, 1959     T. H. BARTH     2,871,565
AIMING ANGLE SIGHT

Filed April 25, 1942     35 Sheets-Sheet 1

INVENTOR
*T. H. Barth*
BY
ATTORNEY

Feb. 3, 1959 T. H. BARTH 2,871,565
AIMING ANGLE SIGHT
Filed April 25, 1942 35 Sheets-Sheet 2

Inventor
T. H. Barth

Feb. 3, 1959        T. H. BARTH        2,871,565
AIMING ANGLE SIGHT
Filed April 25, 1942        35 Sheets-Sheet 3
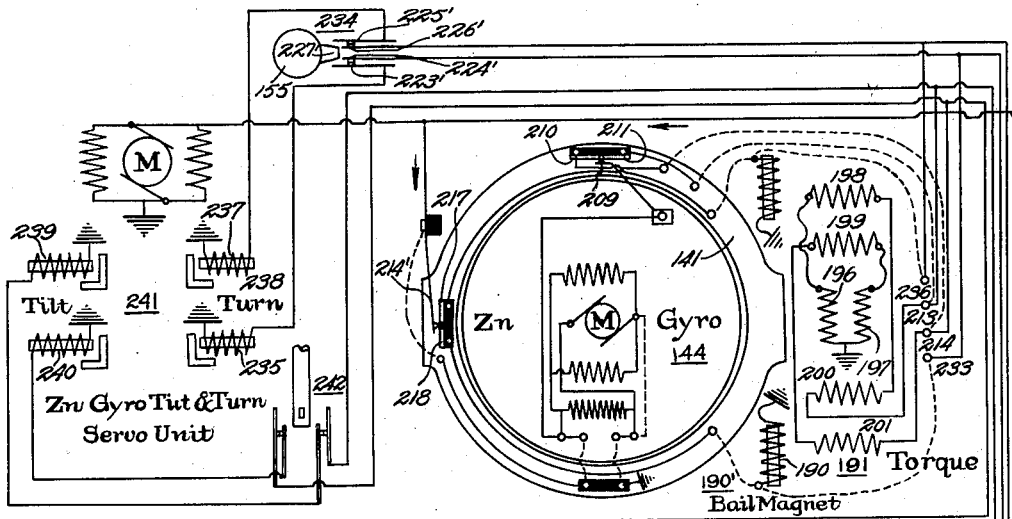
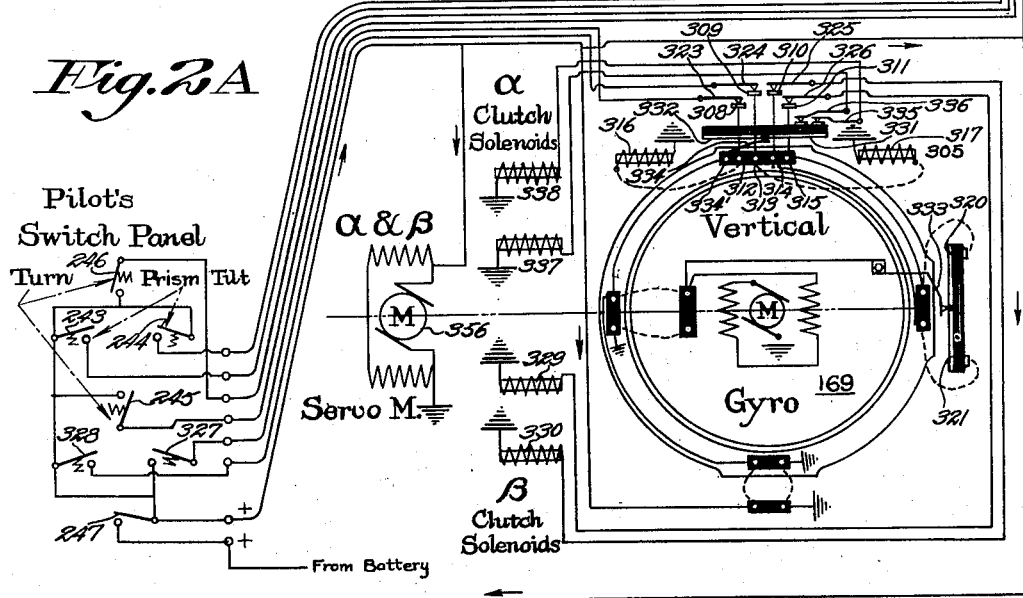
*Fig. 2A*
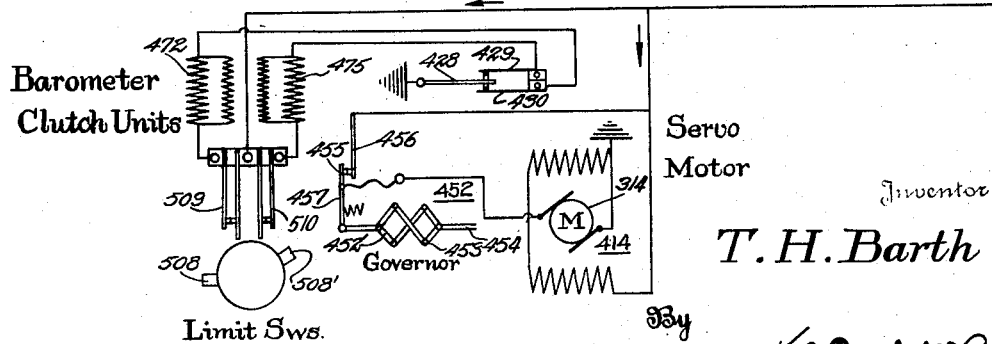
Inventor
T. H. Barth

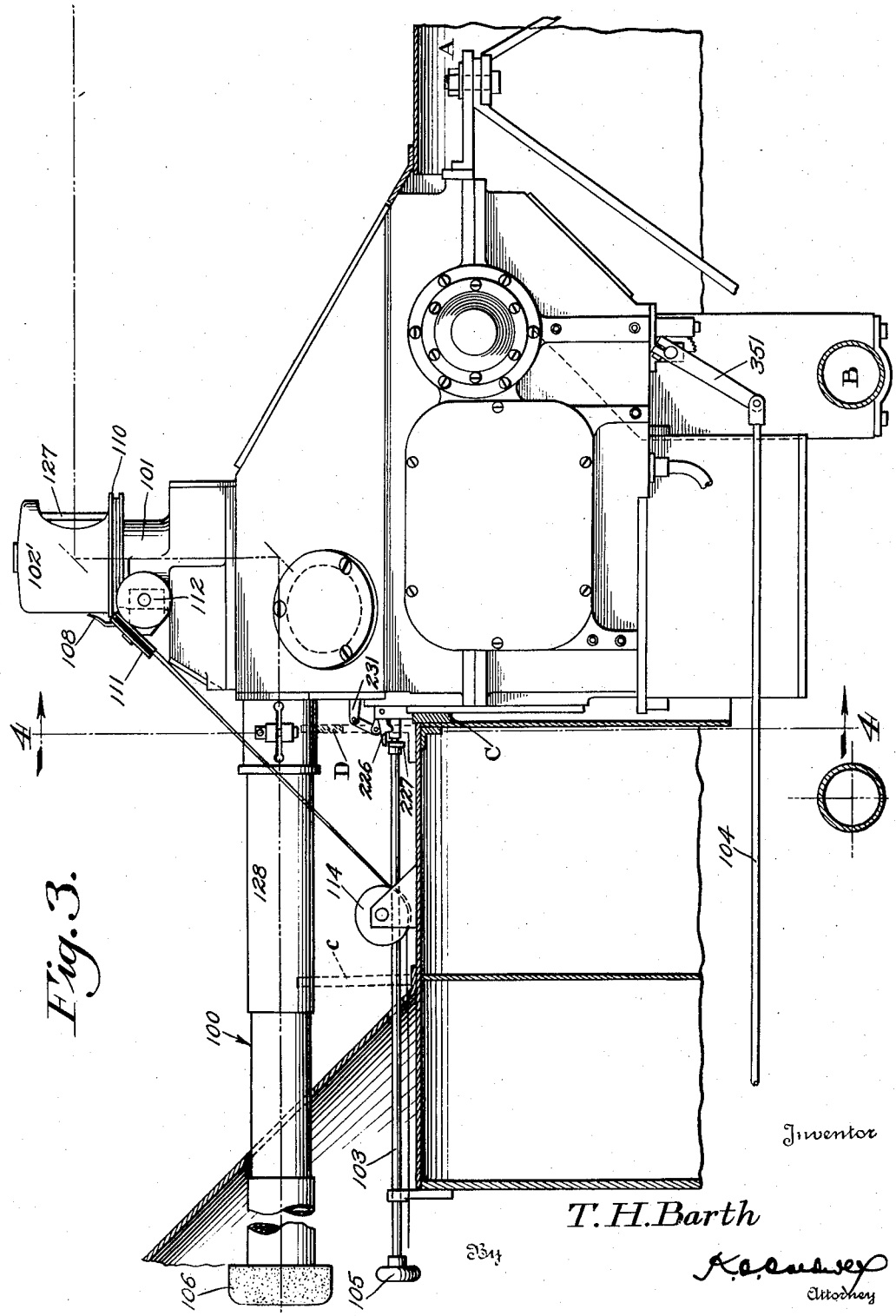

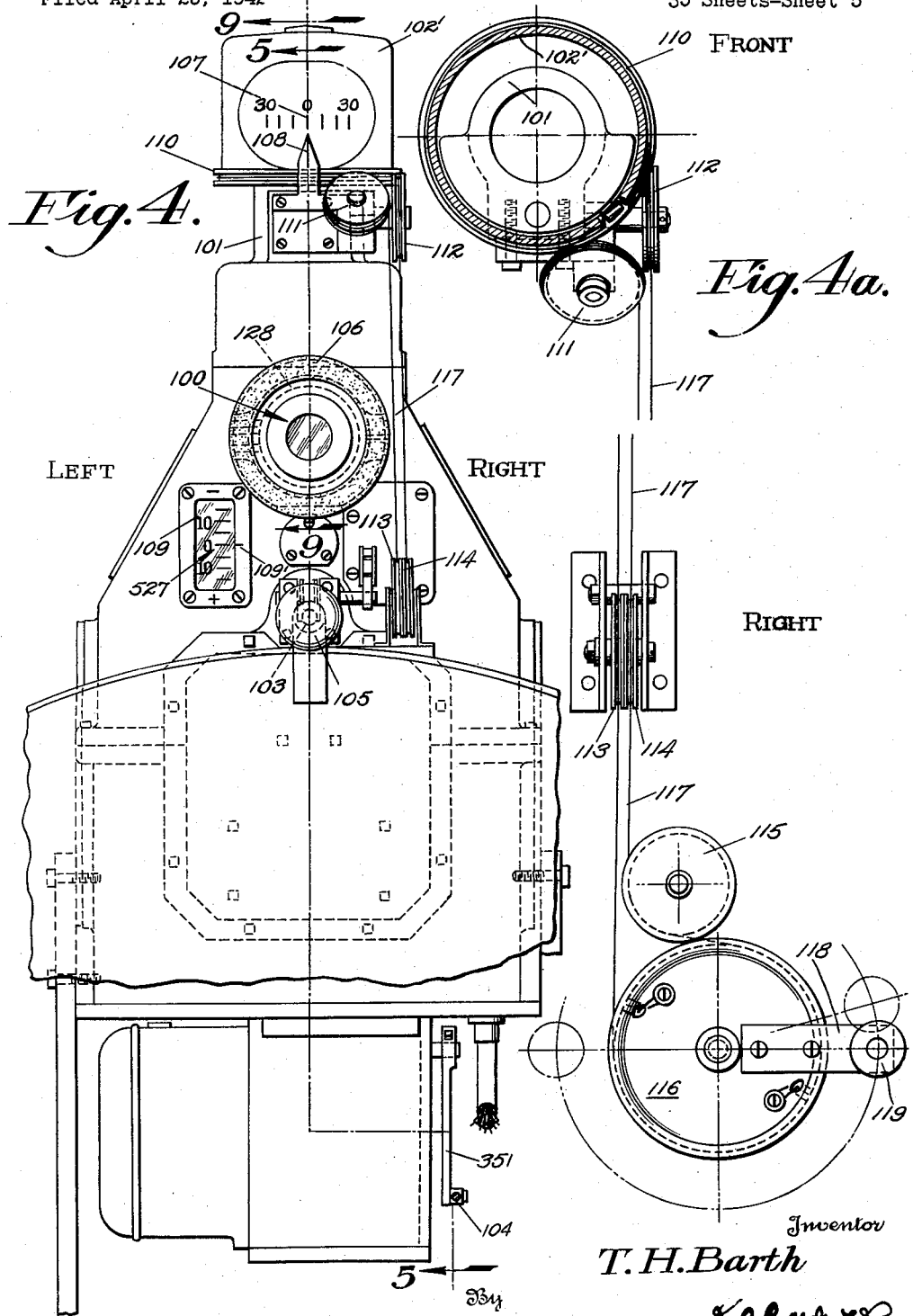

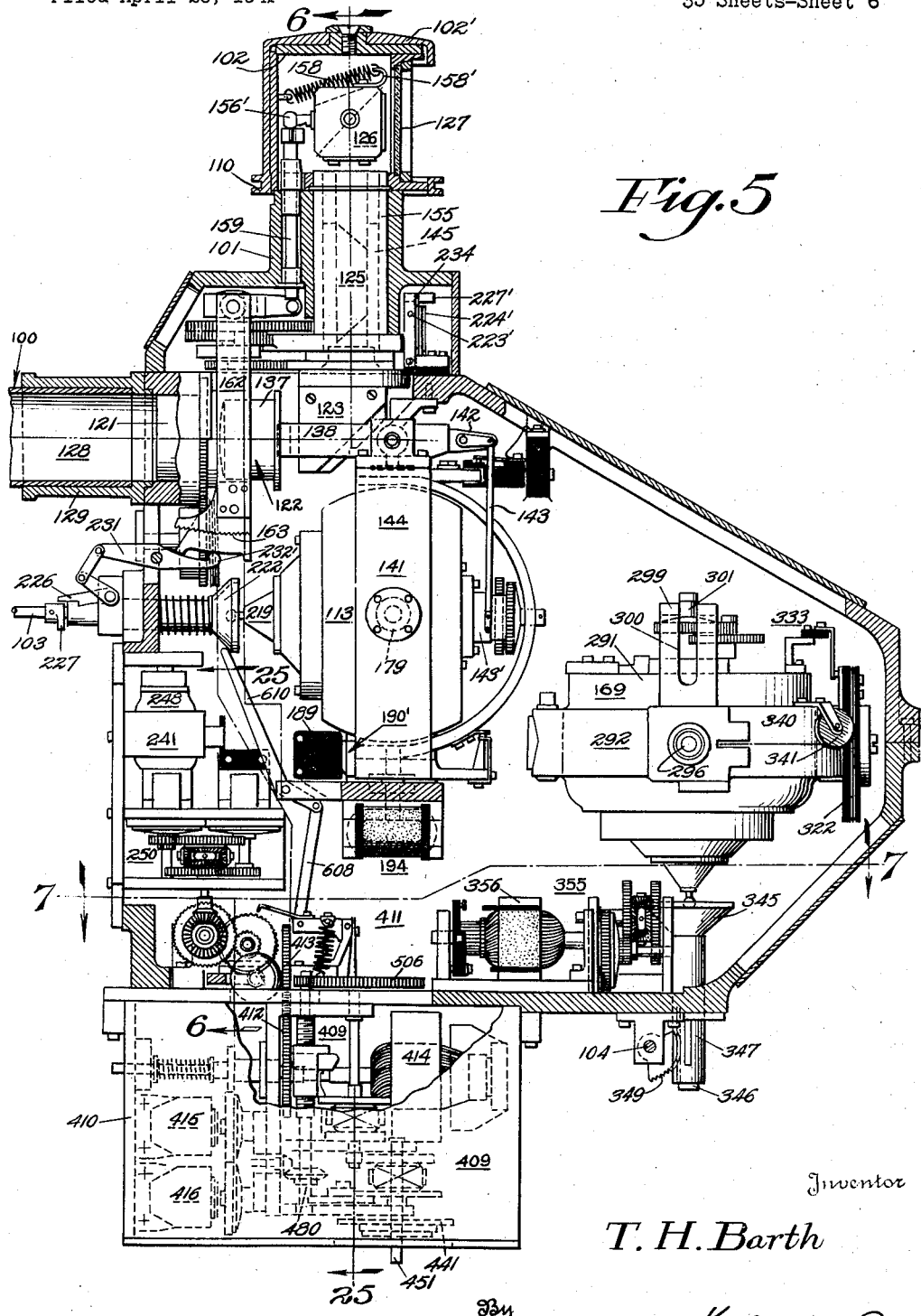

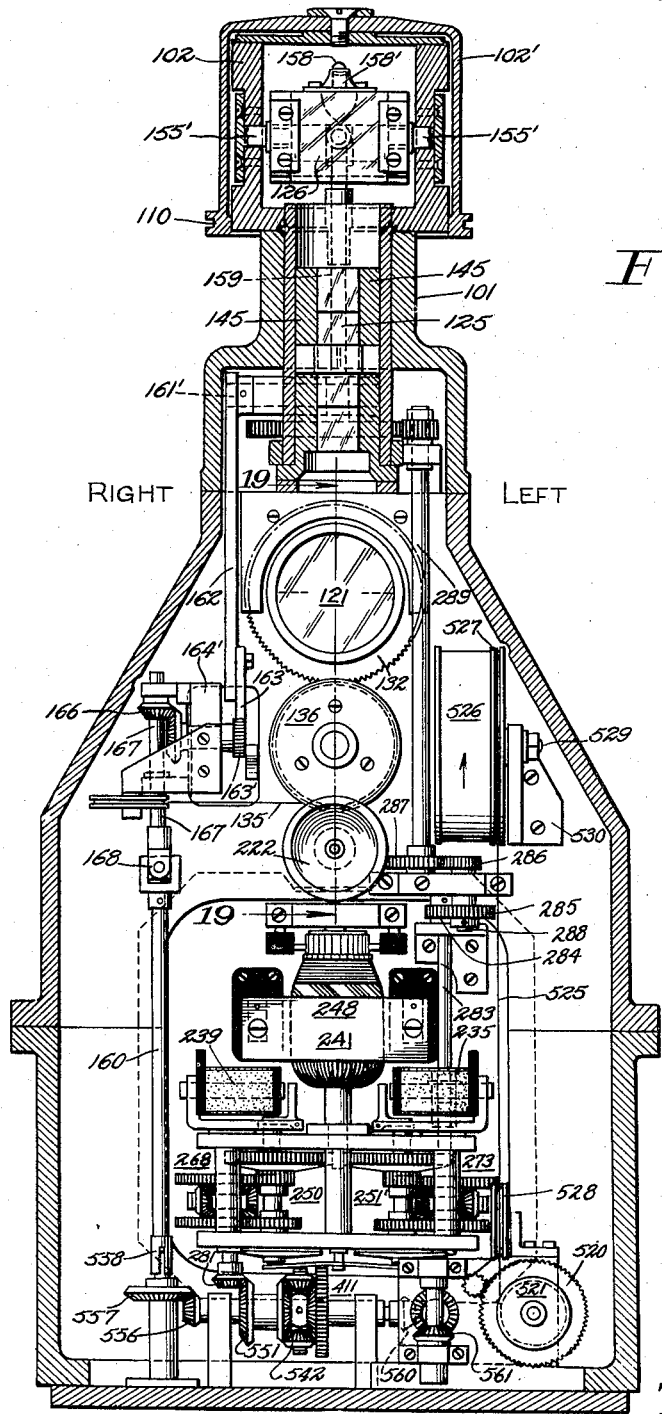

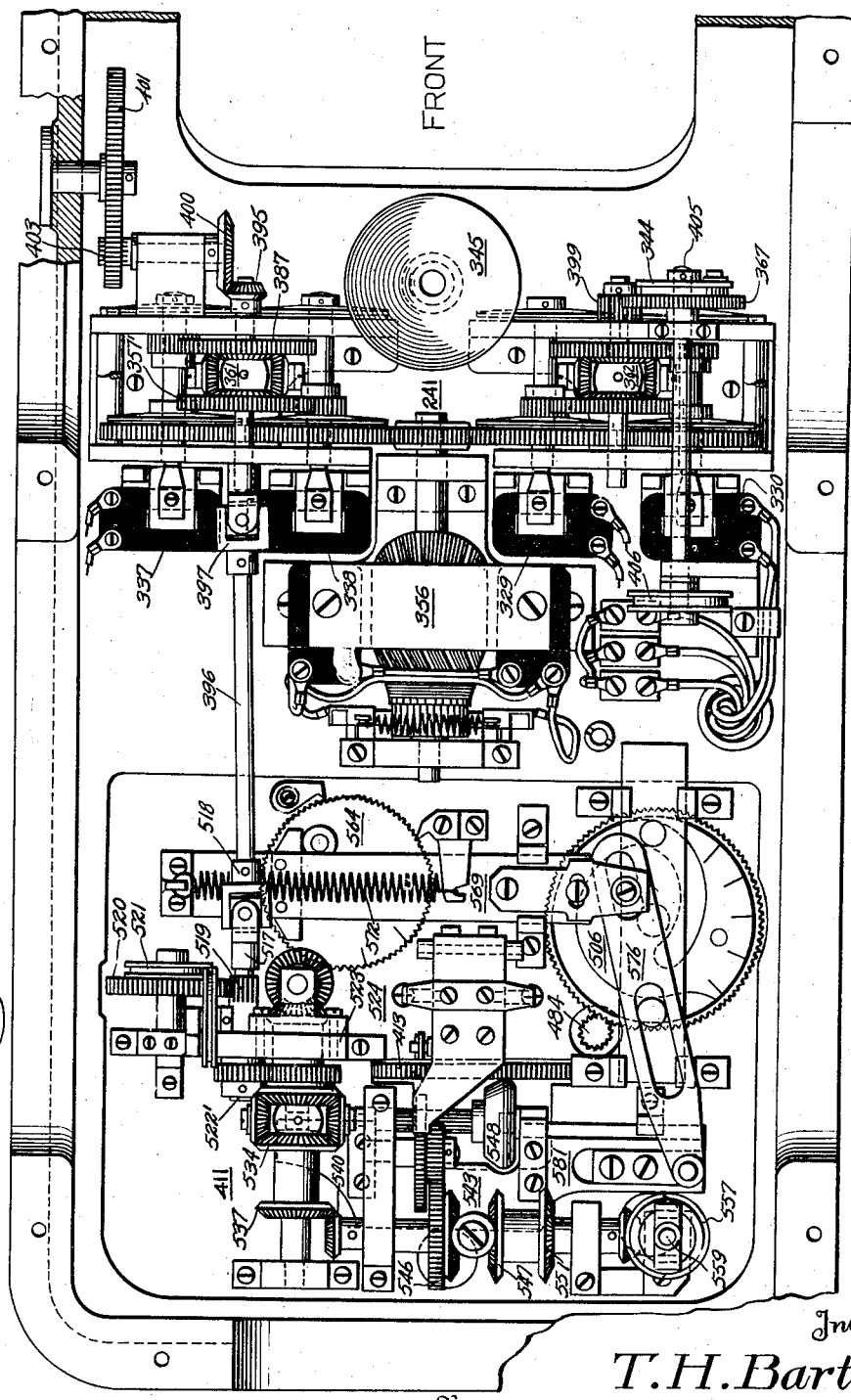

Feb. 3, 1959 — T. H. BARTH — 2,871,565
AIMING ANGLE SIGHT
Filed April 25, 1942 — 35 Sheets-Sheet 9

Inventor
T. H. Barth

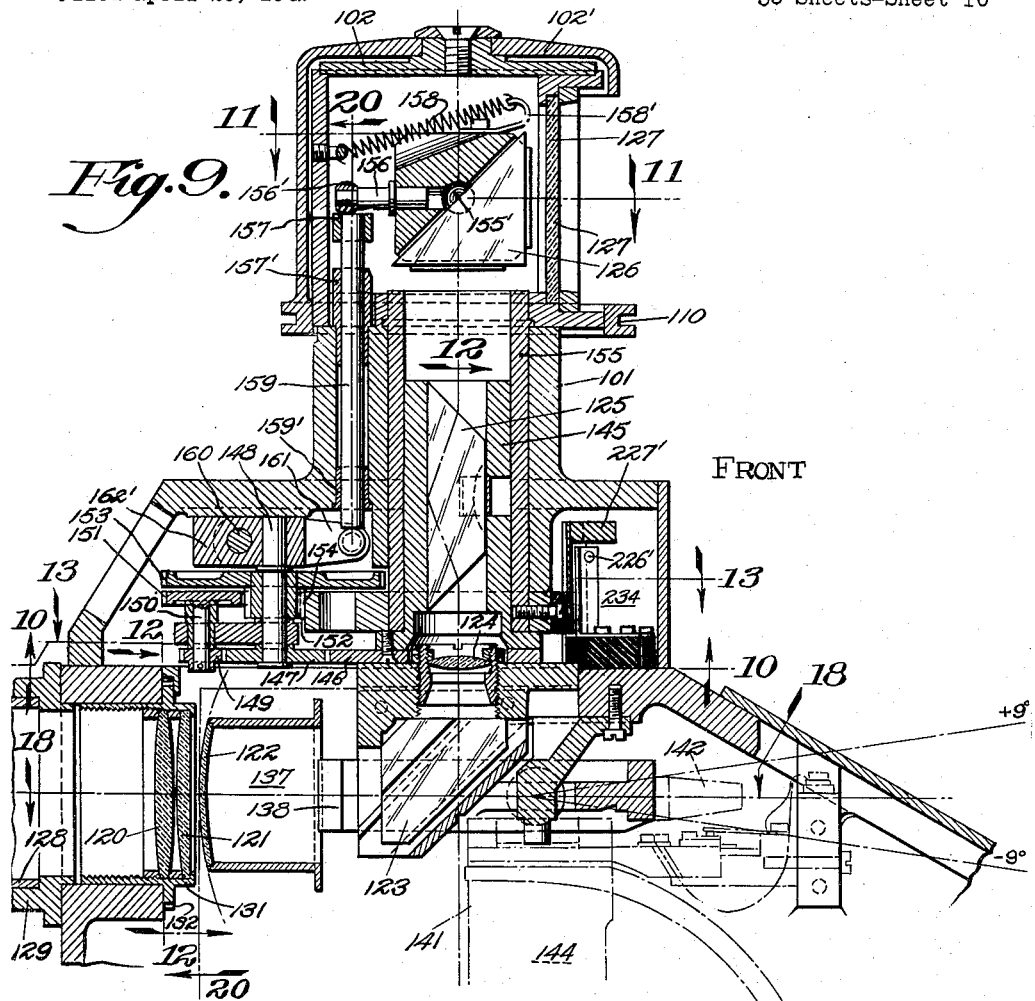

Feb. 3, 1959  T. H. BARTH  2,871,565
AIMING ANGLE SIGHT
Filed April 25, 1942  35 Sheets-Sheet 11

Inventor
T. H. Barth

Feb. 3, 1959 T. H. BARTH 2,871,565
AIMING ANGLE SIGHT
Filed April 25, 1942 35 Sheets-Sheet 12
*Fig.13.*
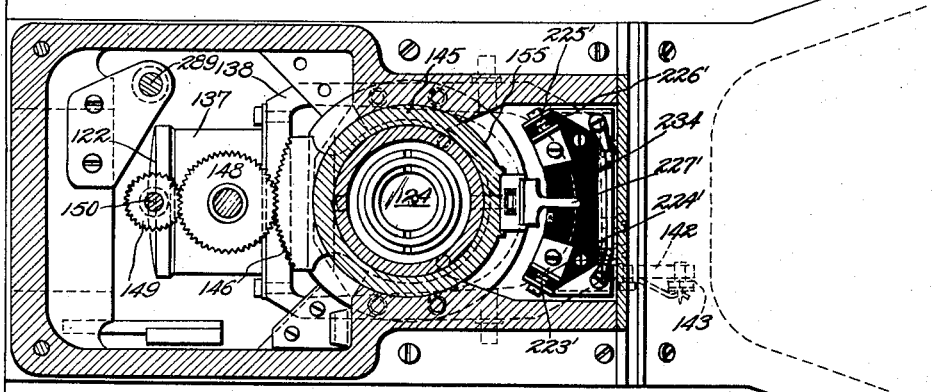
*Fig.14.*
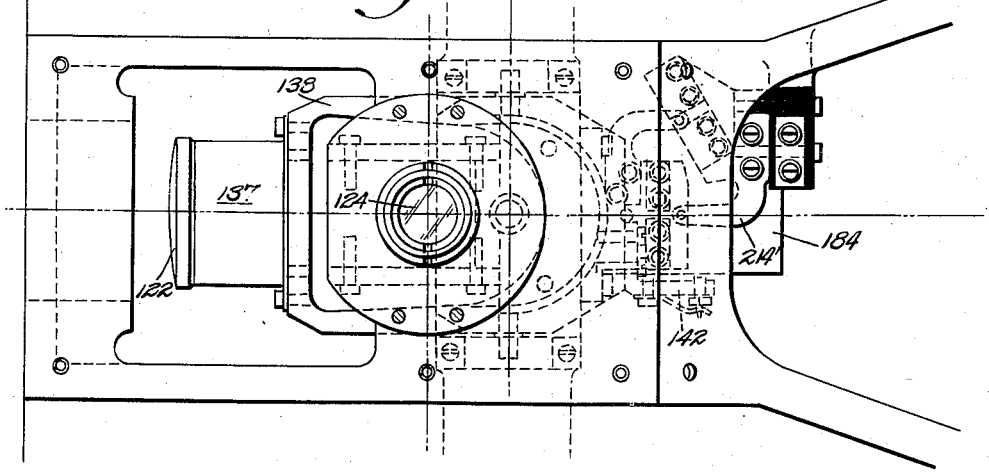
*Fig.15.*
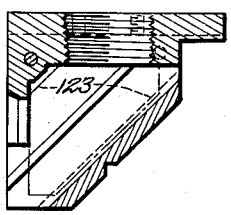
*Fig.16.*
Inventor
T. H. Barth
By K. C. Cardwell
Attorney

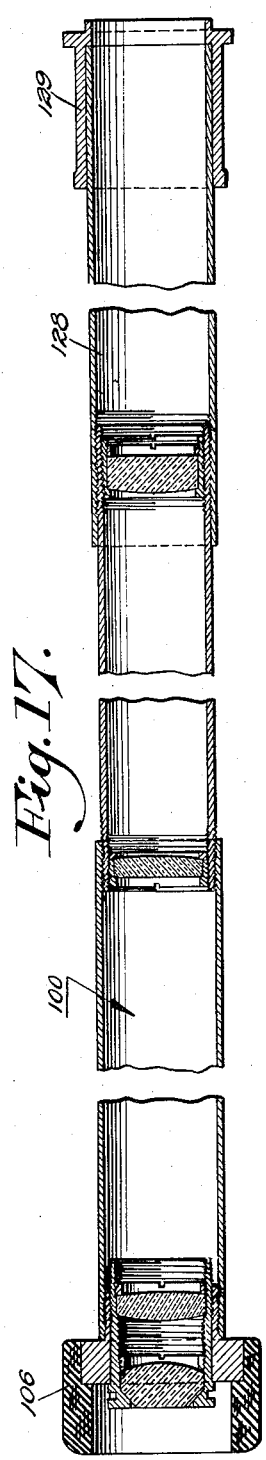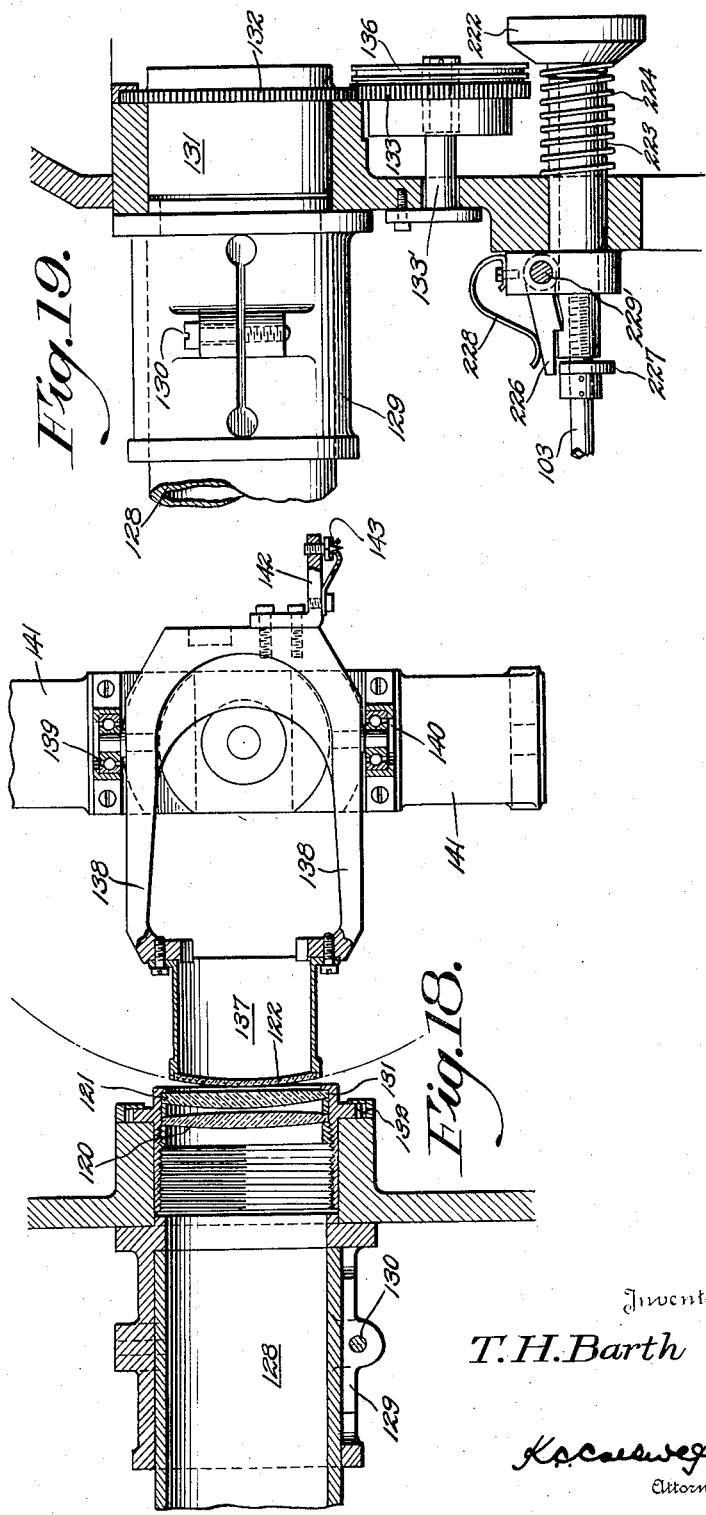

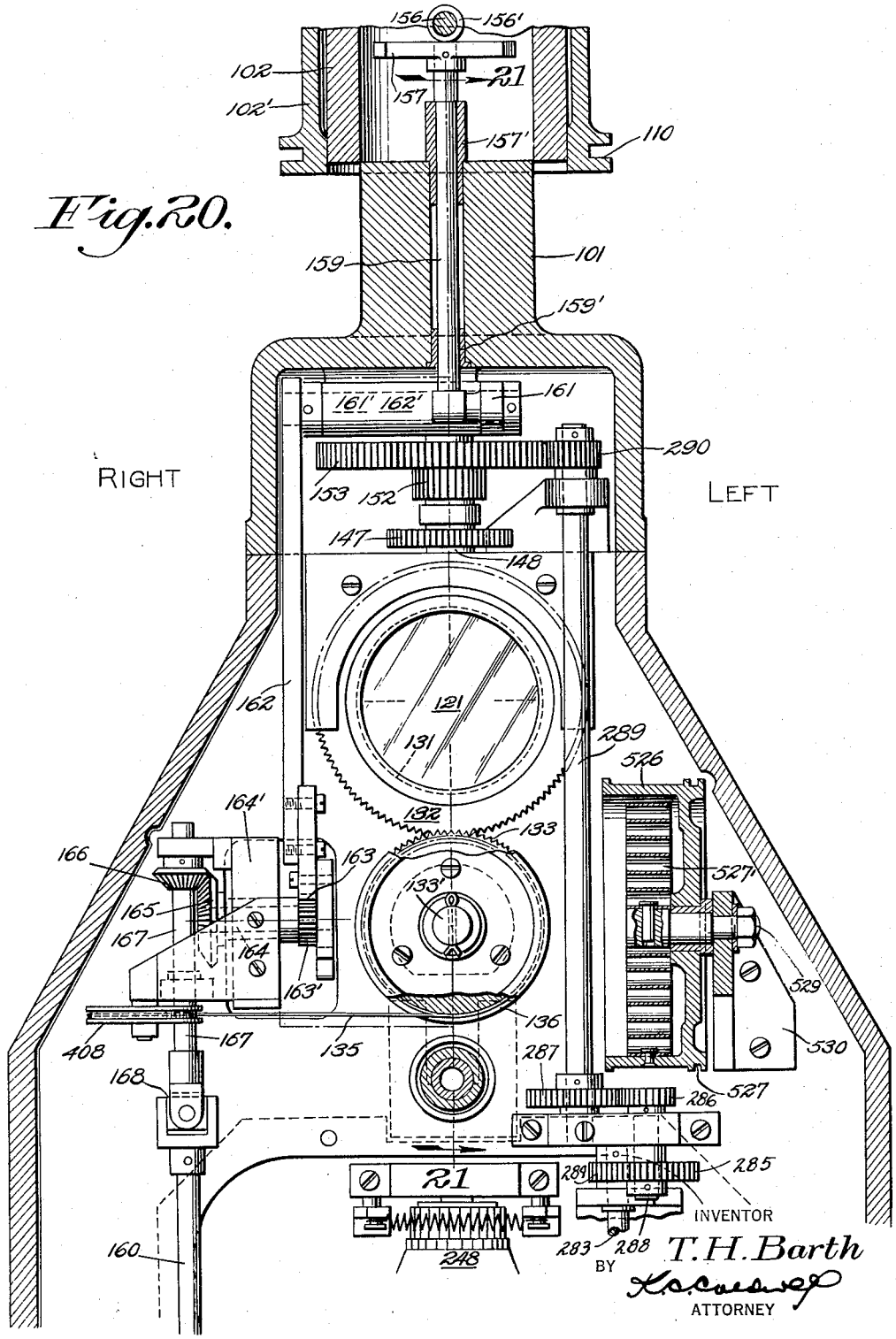

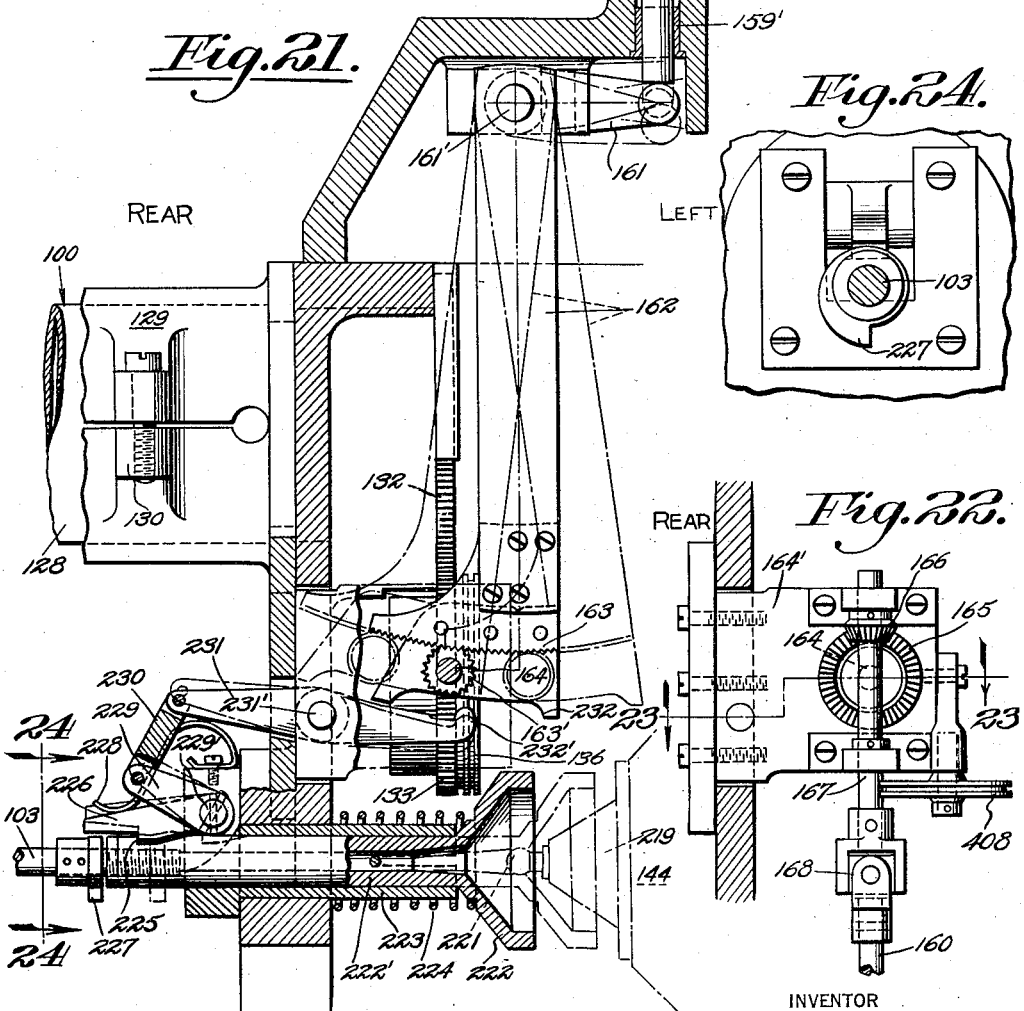
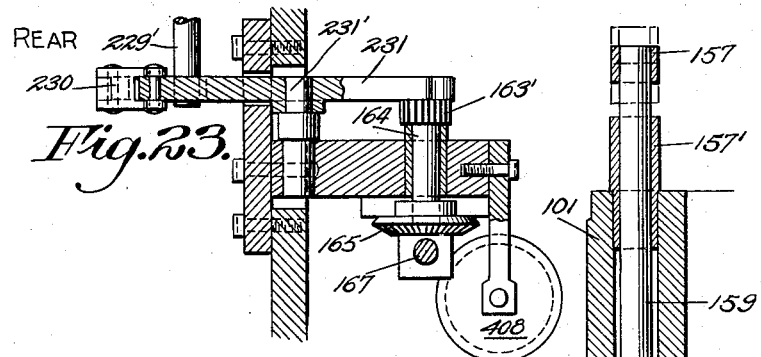
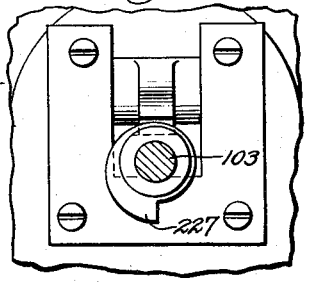

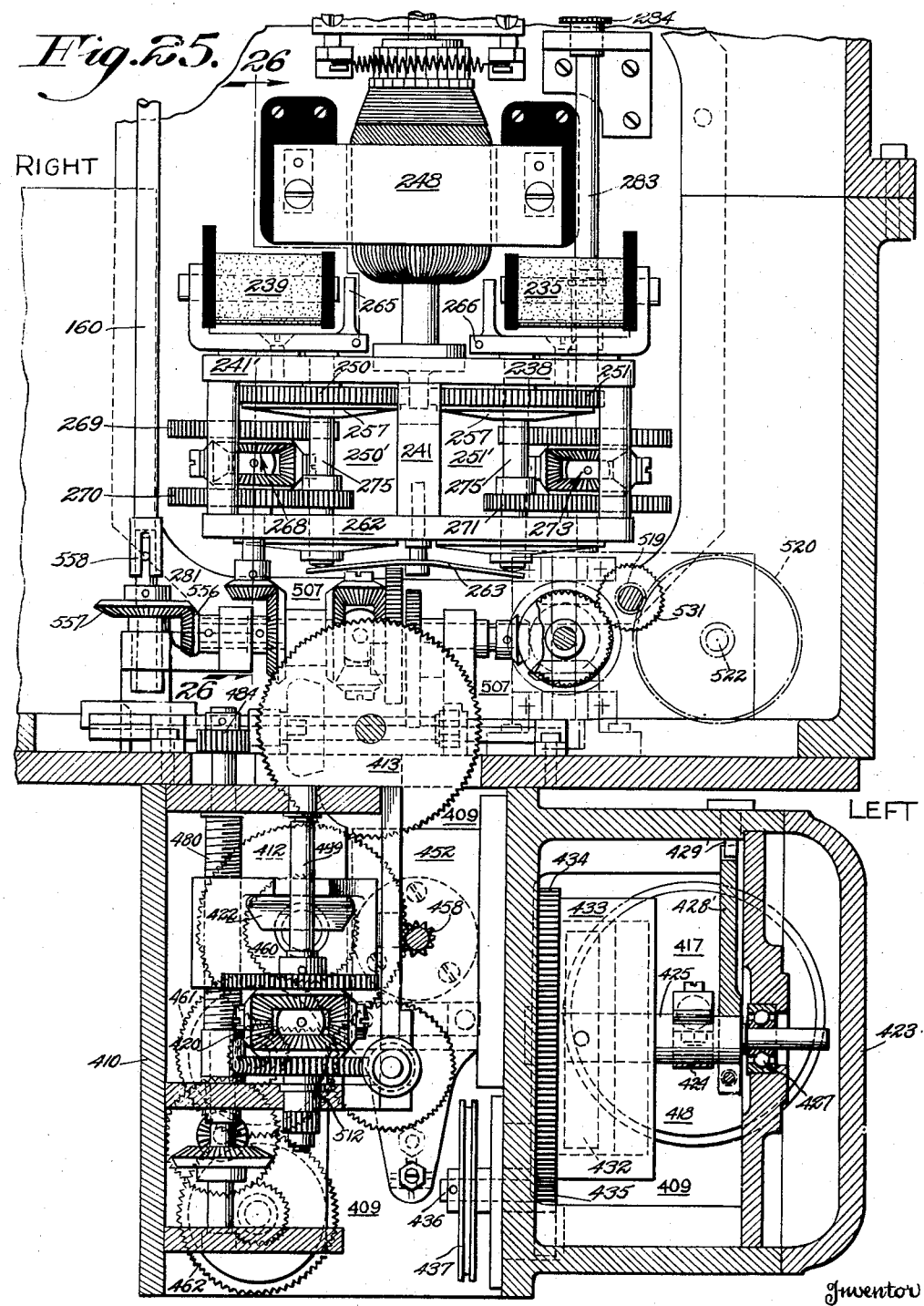

Inventor
T. H. Barth

Feb. 3, 1959 T. H. BARTH 2,871,565
AIMING ANGLE SIGHT
Filed April 25, 1942 35 Sheets-Sheet 18

Inventor
T. H. Barth
By K. C. Cardwell
Attorney

Figures 30, 31, 32:
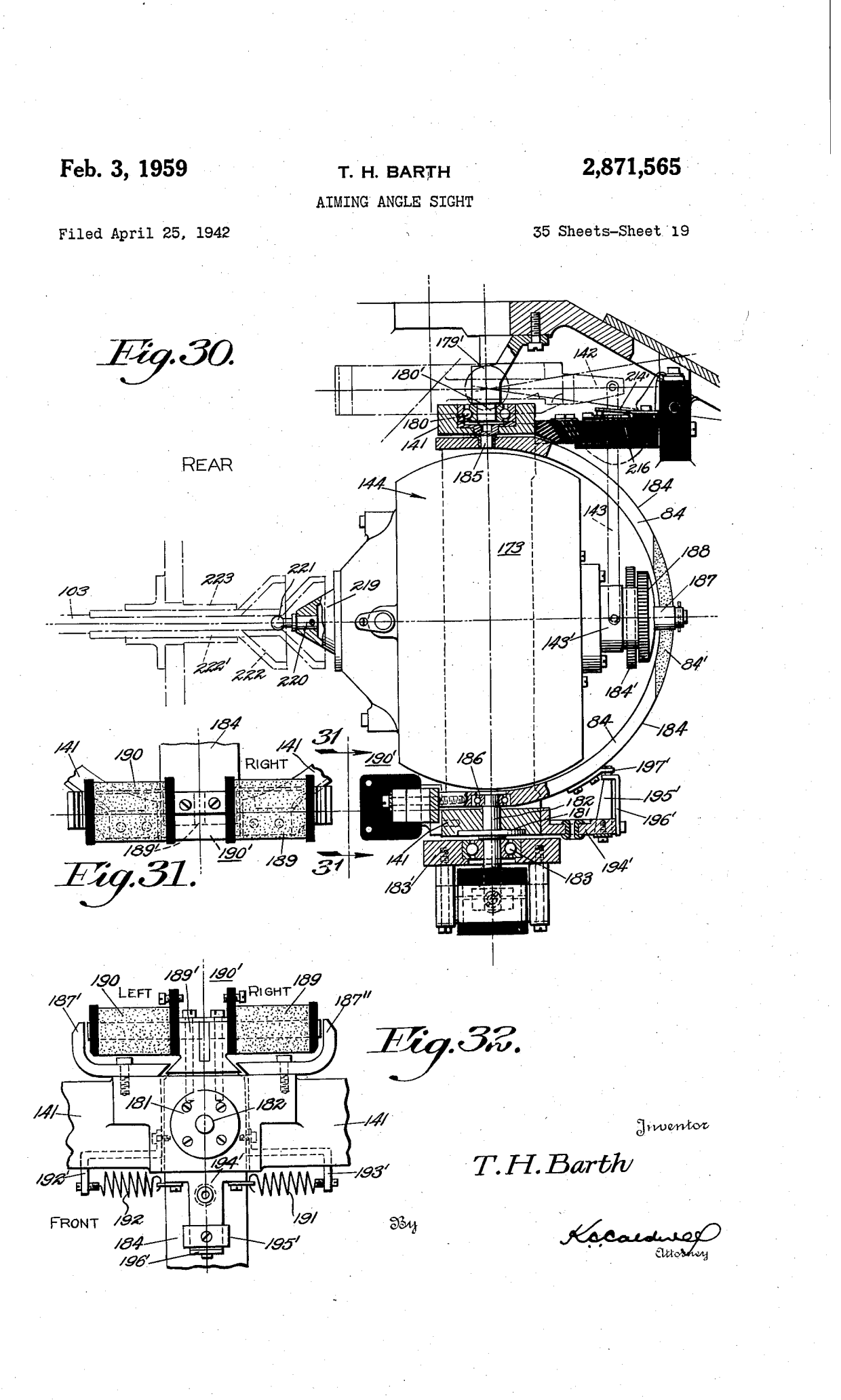

Feb. 3, 1959

T. H. BARTH 2,871,565

AIMING ANGLE SIGHT

Filed April 25, 1942

Inventor
T. H. Barth

By K. C. Caldwell
Attorney

Feb. 3, 1959
T. H. BARTH
2,871,565
AIMING ANGLE SIGHT
Filed April 25, 1942
35 Sheets-Sheet 20
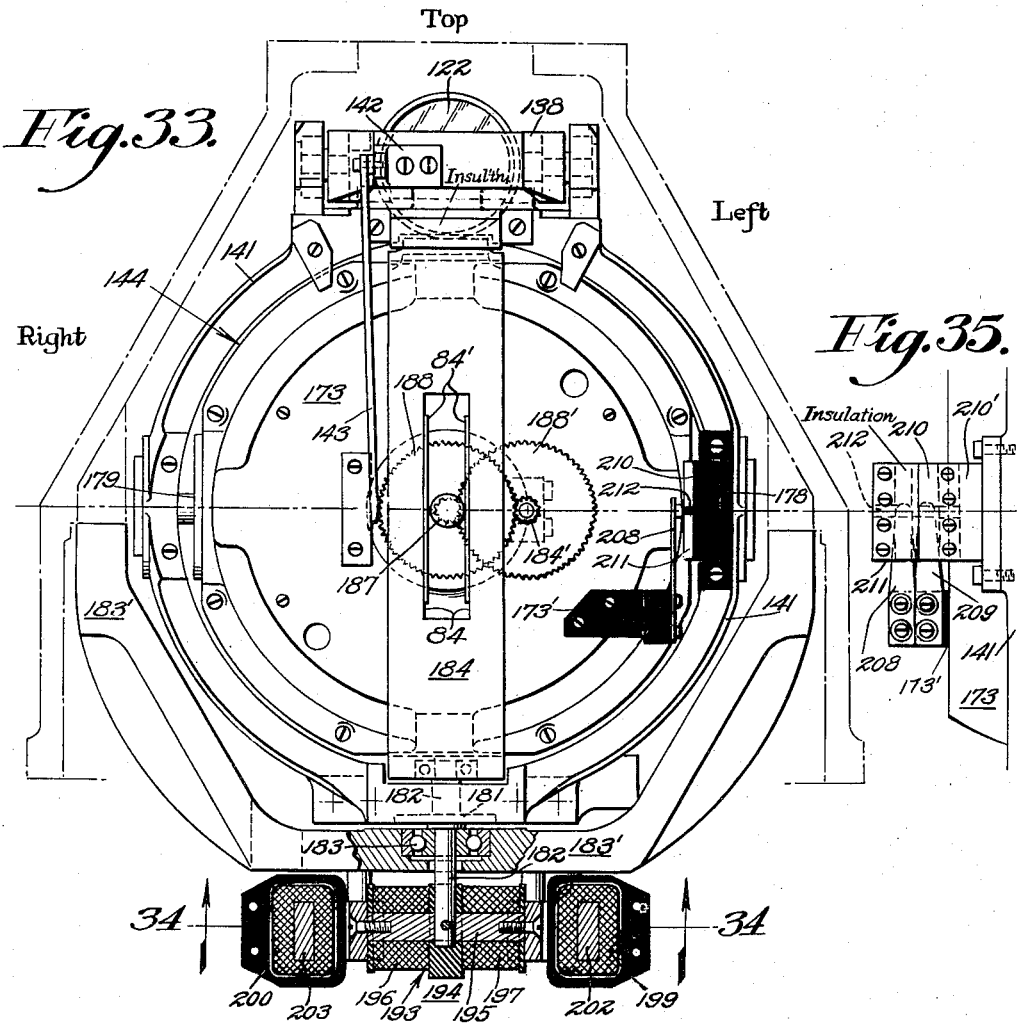
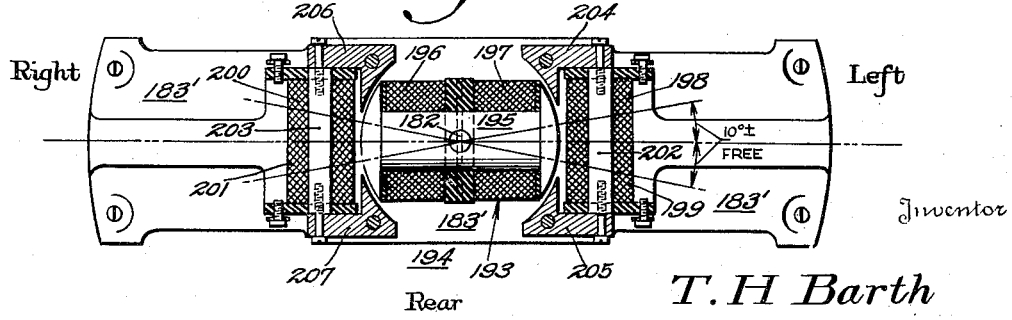
Inventor
T. H Barth
By
K. C. Caldwell
Attorney Feb. 3, 1959 — T. H. BARTH — 2,871,565
AIMING ANGLE SIGHT
Filed April 25, 1942 — 35 Sheets-Sheet 21

Inventor
T. H. Barth

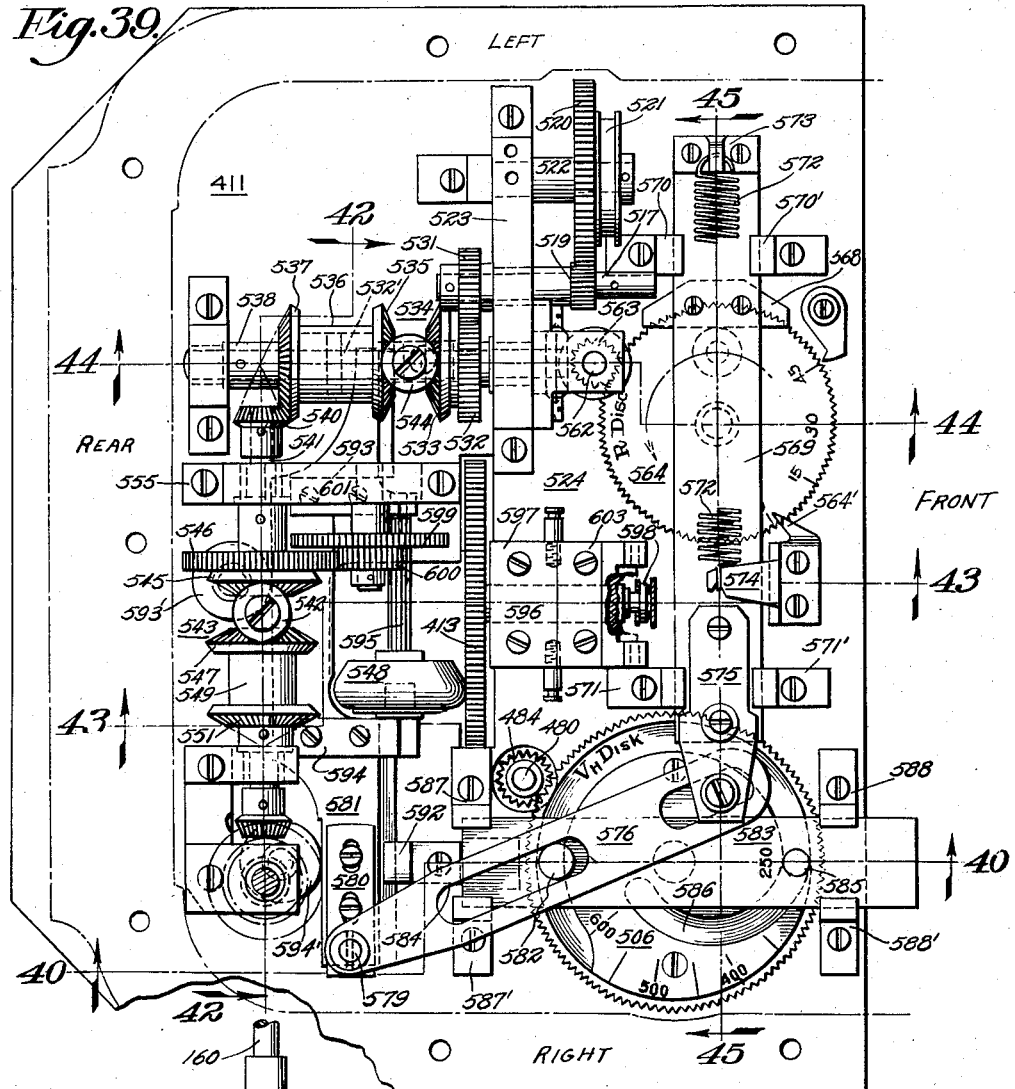

Feb. 3, 1959 T. H. BARTH 2,871,565
AIMING ANGLE SIGHT
Filed April 25, 1942 35 Sheets-Sheet 23

Inventor
T. H. Barth
By K. C. Cauldrey
Attorney

Inventor
T. H. Barth

Feb. 3, 1959 T. H. BARTH 2,871,565
AIMING ANGLE SIGHT
Filed April 25, 1942 35 Sheets-Sheet 25

INVENTOR
T. H. Barth
BY
K.C.Caldwell
ATTORNEY

Feb. 3, 1959

T. H. BARTH 2,871,565

AIMING ANGLE SIGHT

Filed April 25, 1942

Inventor
T. H. Barth
By
Attorney

Feb. 3, 1959 — T. H. BARTH — 2,871,565
AIMING ANGLE SIGHT
Filed April 25, 1942 — 35 Sheets-Sheet 28
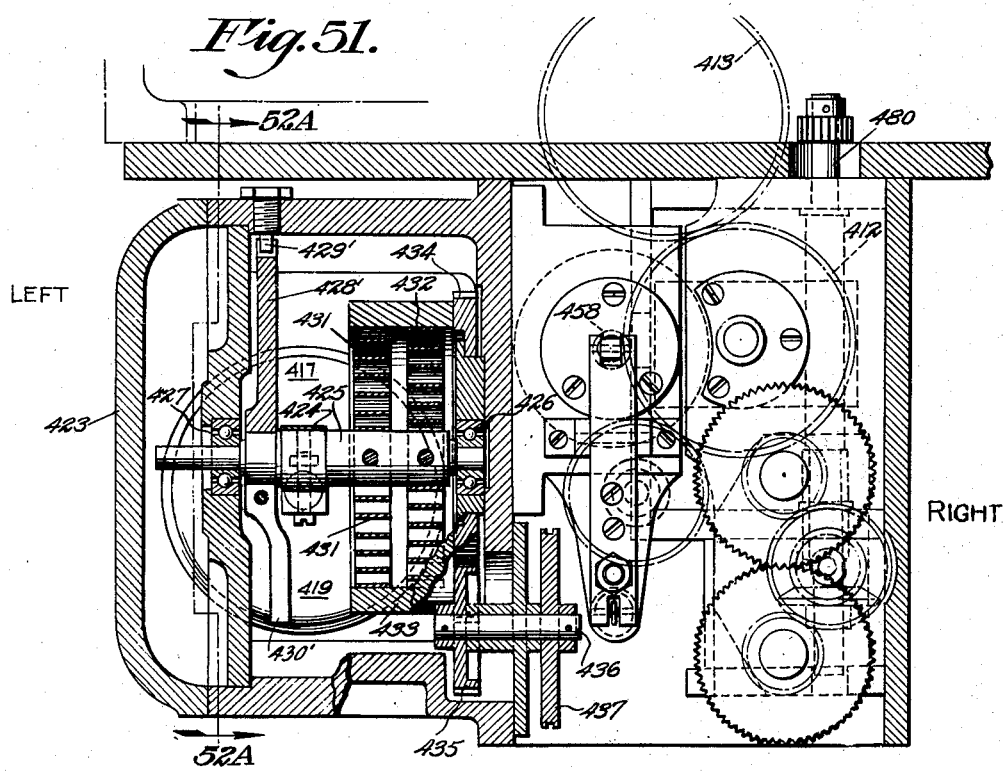
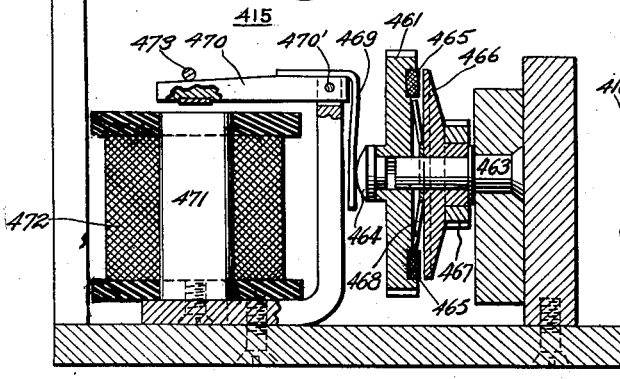
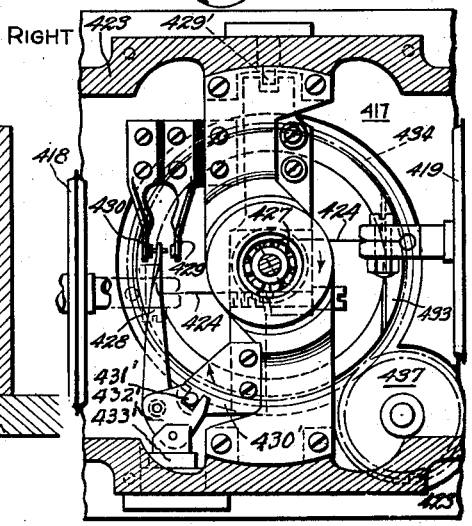
Inventor
T. H. Barth

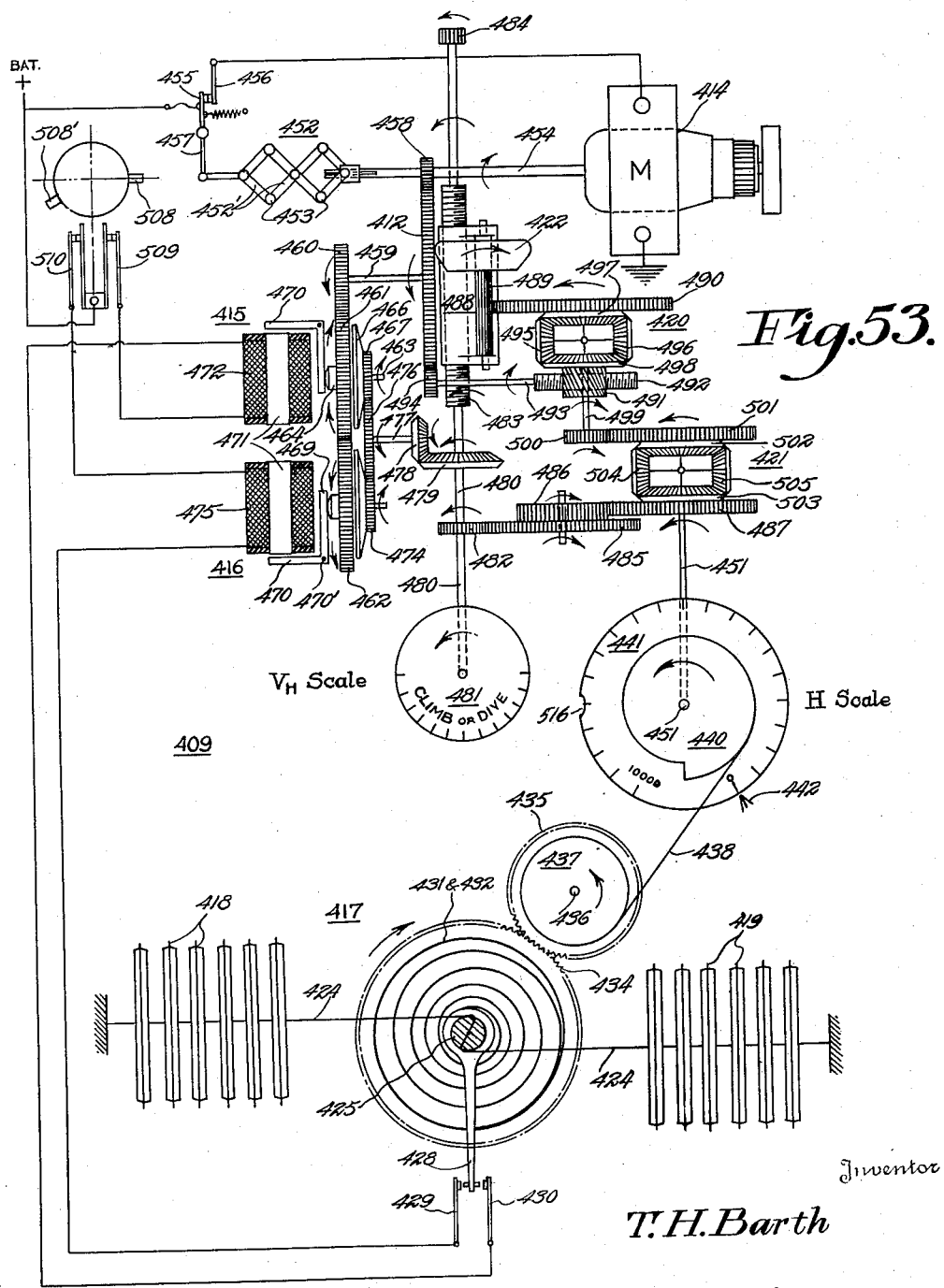

Feb. 3, 1959  T. H. BARTH  2,871,565
AIMING ANGLE SIGHT
Filed April 25, 1942  35 Sheets-Sheet 30

Inventor
T. H. Barth
By
Attorney

Feb. 3, 1959 T. H. BARTH 2,871,565
AIMING ANGLE SIGHT
Filed April 25, 1942 35 Sheets-Sheet 31

INVENTOR
T. H. Barth
BY
ATTORNEY

Feb. 3, 1959 T. H. BARTH 2,871,565
AIMING ANGLE SIGHT
Filed April 25, 1942 35 Sheets-Sheet 32

REAR

FRONT

Inventor
T. H. Barth

Feb. 3, 1959 — T. H. BARTH — 2,871,565
AIMING ANGLE SIGHT
Filed April 25, 1942 — 35 Sheets-Sheet 34

Inventor
T. H. Barth

Feb. 3, 1959     T. H. BARTH     2,871,565
AIMING ANGLE SIGHT
Filed April 25, 1942     35 Sheets-Sheet 35
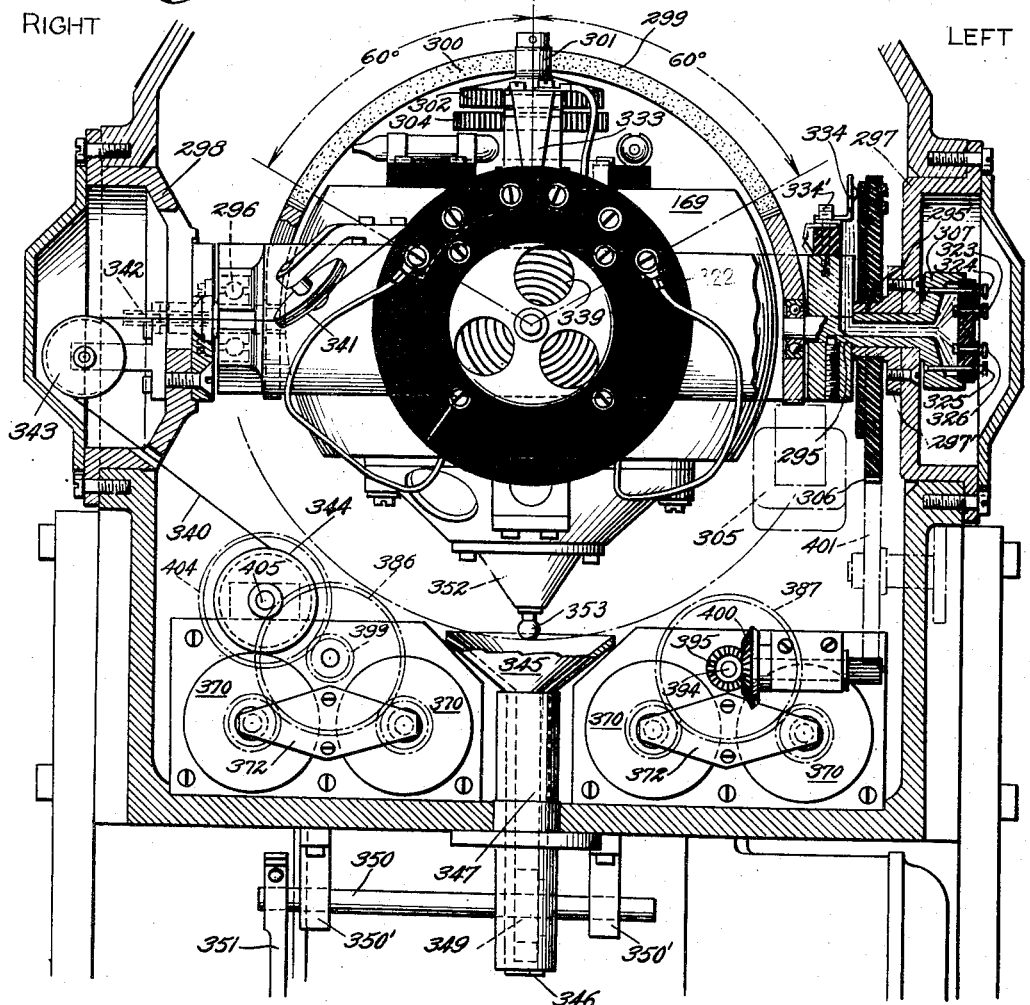
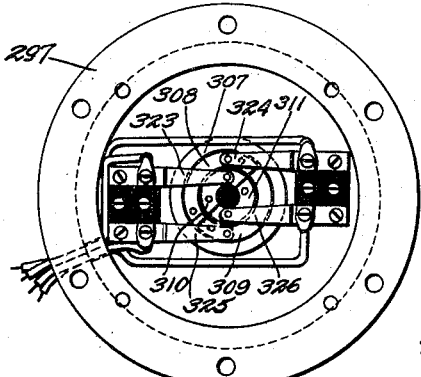
Inventor
T. H. Barth
Attorney

# United States Patent Office 2,871,565
Patented Feb. 3, 1959

2,871,565

AIMING ANGLE SIGHT

Theodore H. Barth, New York, N. Y., assignor to the United States of America as represented by the Secretary of the Navy Application April 25, 1942, Serial No. 440,543

25 Claims. (Cl. 33—46.5)

(Granted under Title 35, U. S. Code (1952), sec. 266)

My invention relates generally to aircraft bomb sights and particularly to such sights useful for dive bombing.

An object of my invention is to provide an improved aircraft bomb sight suitable for use when the bombing aircraft is not in level flight, and especially suitable for use when the bombing aircraft is diving on the target.

Another object of my invention is to provide an improved aircraft bomb sight suitable for use in single-seater airplanes in making dive bombing attacks.

A further object of my invention is to provide an improved aircraft bomb sight utilizing the collision track principle which requires minimum attention from the pilot-operator in its operation and which permits the pilot-operator to direct to the target.

My invention is designed especially for use in a single-seater airplane in which the pilot has other duties to perform besides the operation of the sight. In such an airplane the pilot has only his left hand free and cannot well make complex adjustments on a sight while looking into an eyepiece and operating the control stick with his right hand and the rudder with his feet, even after much practice. The setting of values from scales, charts, indicators, etc., that do not appear in the optical field, when during the next second several variables may change, and while the pilot-operator is under intense strain, is impracticable.

Hence, in a sight of this type, most variables should be pre-set, or discounted by the flight, or automatically generated from momentary flight values and set into the mechanism, and the required flight corrections should be shown in the optical field of the sight. Further, the already crowded condition of the pilot's cockpit makes it extremely desirable, if not necessary, to locate the sight mechanism elsewhere, and to control the sight mechanism indirectly from the cockpit. The above, and the large number of variables involved in dive bombing, call for a collision track sight.

In utilizing my invention, the airplane fuselage is brought to and flown on, an air track for which there is no athwartships or fore and aft target drift. This so-called collision sight discounts the lift component, the trajectory ground-allowance, and the horizontal components of wind and target velocity.

Compensating for wind and target vectors by directing to a collision course does not involve altitude. In my present invention, I compensate for angular trajectory allowance without regard to altitude, either momentary or release, and thus completely eliminate altitude in my sight, barring its slight effect on trail. This is an outstanding merit of my invention.

In view of this elimination of the altitude variable in my system, except for trail, bombs can be released during a dive bombing attack at any time whenever a practical collision condition is obtained, and, as the airplane is dived on a collision track, several releases can be made at various times during the dive. Furthermore, the target need not be on the ground but may be in space at any constant altitude.

In utilizing this sight, the pilot-operator maneuvers the airplane so that the target image, as seen through the optical system apparently moves to and stays on the intersection of a pair of stabilized crosslines. He also keeps indicators, which appear in the line of sight, approximately lined up and parallel to the stabilized crosslines. These indicators represent, respectively, the fuselage of the plane and its motion and position with respect to the stabilized sighting planes, and the lateral inclination of the wings with respect to the true horizon. The pilot-operator directs to the target and not to some indicated or "guessed" spot away from the target.

There are no marks, scales or other indicators in the field of the optical system except those above-mentioned, and during the dive no settings or adjustments of the sight are required. The sight is started in operation by means of a single switch. The sight described herein is designed to operate on 12 volts D. C., as has been found desirable.

My invention will be described and explained in connection with the accompanying drawings.

In connection with these drawings and the description that follows, the words "front side" are used to designate that side of my bomb sight farthest from the pilot-operator and nearest the front of the airplane in which installed; the words "rear side," that side facing or nearest to the pilot-operator; "right side," that side of my bomb sight to the right of the pilot-operator; "left side," that side to the pilot-operator's left.

In these drawings,

Fig. 2A is a schematic view showing the electrical circuits of the entire bomb sight;

Fig. 3 is a right side elevation of my bomb sight as installed in the fuselage of an airplane;

Fig. 4 is a rear view with parts in section as indicated by line 4—4 of Fig. 3, showing my device as set up before and as seen by the pilot-operator, with scales, eyepiece and controls as shown;

Fig. 4A is a detail plan view of the entrance prism case and its hand adjustment gear;

Fig. 5 is a general vertical longitudinal sectional view as indicated by line 5—5 of Fig. 4;

Fig. 6 is a vertical athwartships sectional view as indicated by line 6—6 of Fig. 5;

Fig. 7 is a horizontal sectional view showing a portion of the mechanism of my invention, with the upper sight case and the vertical gyro removed, equivalent to a view as indicated by line 7—7 of Fig. 5;

Fig. 9 is a vertical sectional view as indicated by line 9—9 of Fig. 4, showing most of the optical system;

Fig. 10 is a bottom plan view of the dove prism and its mounting, as indicated by line 10—10 of Fig. 9;

Fig. 13 is a horizontal sectional view through the case of the entrance prism as indicated by line 13—13 of Fig. 9;

Fig. 14 is a view looking down on the top of the sight casing with the entrance prism case removed;

Fig. 15 is a vertical longitudinal sectional view of the roof prism and its mount with the roof prism shown in dotted lines;

Fig. 16 is a front end elevation of the roof prism and its mount;

Fig. 17 is an axial sectional view of the sighting tube;

Fig. 18 is a detail view taken on line 18—18 of Fig. 9, showing the manner of supporting the reticle lens;

Fig. 19 is a vertical sectional view through a portion of the upper casing on line 19—19 of Fig. 6;

Fig. 20 is a vertical athwartships sectional view as indicated by line 20—20 of Fig. 9, but extending downward to the turn and tilt servo-motor;

Fig. 21 is a vertical longitudinal sectional view as indicated by the line 21—21 of Fig. 20;

Fig. 22 is a right side elevation of the supporting bracket for a portion of the tilt-gear mechanism, showing some of the gears and shafting;

Fig. 23 is a horizontal sectional view as indicated by the line 23—23 of Fig. 22;

Fig. 24 is a view from the rear as indicated by line 24—24 of Fig. 21, showing the cam for releasing the locking mechanism for the azimuth gyro;

Fig. 25 is a vertical sectional view as indicated by line 25—25 of Fig. 5;

Fig. 30 is a right side elevation of the azimuth gyro, with parts in section;

Fig. 31 is a rear elevation of the bail magnet of the azimuth gyro;

Fig. 32 is a bottom plan view of the bail magnet and poles pieces of the azimuth gyro, showing the manner of mounting each;

Fig. 33 is a front elevation of the azimuth gyro, with parts in section, showing details of the torque motor;

Fig. 34 is a bottom horizontal sectional view as indicated by line 34—34 of Fig. 33, showing further details of the torque motor;

Fig. 35 is a detailed partial left elevation showing one group of brushes and contacts of the azimuth gyro;

Fig. 39 is a top plan view of the computer unit;

Fig. 40 is a vertical longitudinal sectional view of the computer unit, as indicated by line 40—40 of Fig. 39;

Fig. 51 is a vertical cross-sectional view of the barometric unit as indicated by line 51—51 of Fig. 49;

Fig. 52 is a vertical longitudinal sectional view through one of the magnetic clutches of the barometric unit;

Fig. 52A is a fragmentary elevation of the barometric diaphragm operated switch mechanism;

Fig. 53 is a complete mechanical and electrical diagrammatic sketch of the barometric unit;

Fig. 65 is a vertical athwartships front view, partly in section, of the vertical gyro; and Fig. 66 is a left elevation of the left mounting hub of the vertical gyro, and shows the brush and contact arrangement therein.

Figure 1:
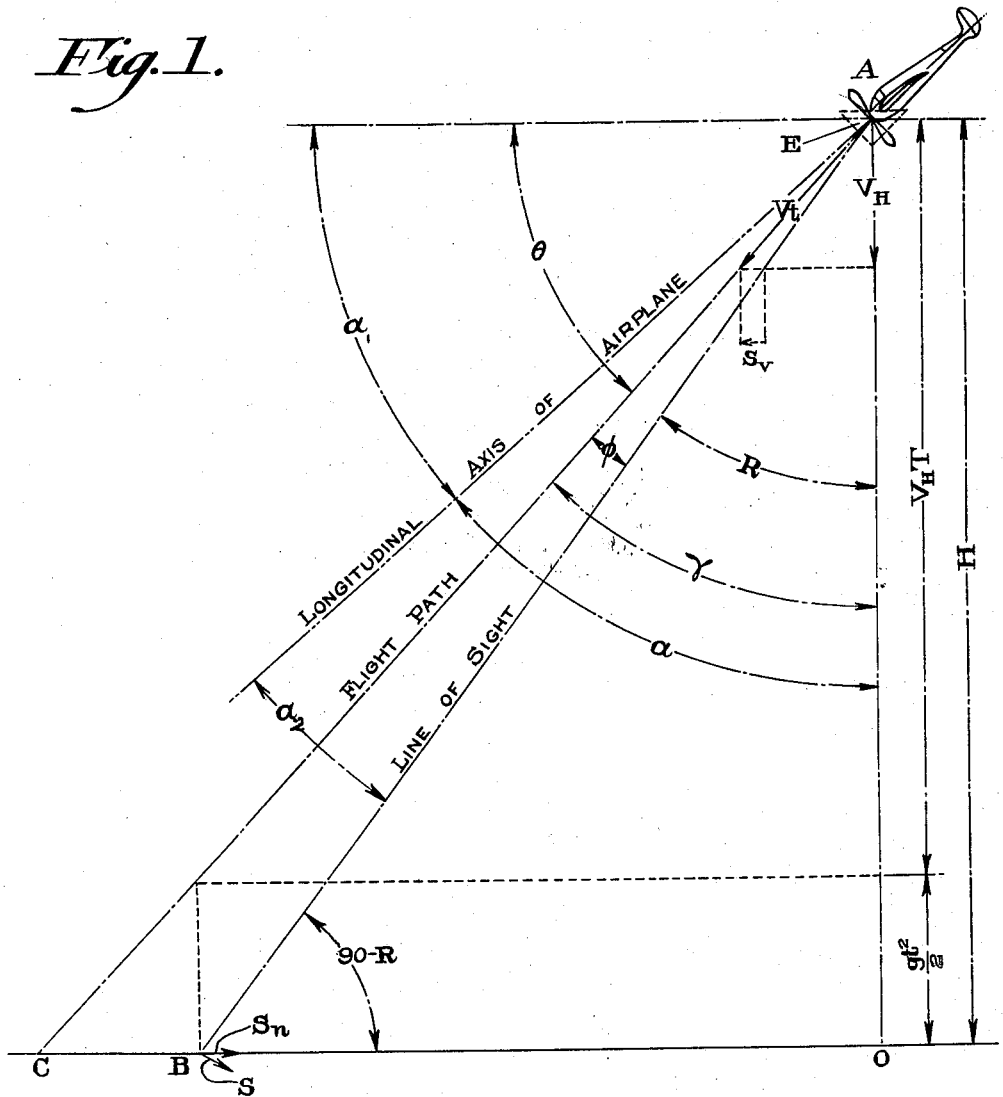
Fig. 1 is a geometrical sketch illustrating the various angles, distances, velocities etc., involved in the solution of the problem.
Figure 1A:
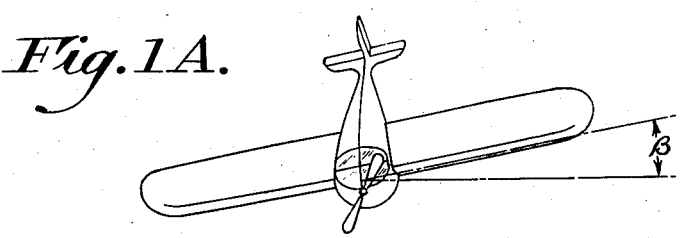
Fig. 1A is a view of an airplane in flight as seen from the front, illustrating the angle $\beta$.

In explaining the theory of how my invention accomplishes trajectory compensation, resort is had to Figs. 1 and 1A. Referring to Fig. 1, which also shows a representation of a diving airplane with an enlarged representation E of the entrance prism of my invention, the following nomenclature is used:

$\theta$ = the dive angle = the angle between the flight path and the horizontal.

$R$ = the range angle = the angle between the vertical and the line of sight from the airplane to the target.

$\phi$ = the angle between the flight path and the line of sight.

$\alpha$ = the angle between the longitudinal axis of the airplane and the vertical.

$\alpha_1$ = the angle between the longitudinal axis of the airplane and the horizontal.

$\alpha_2$ = the angle between the line of sight and the longitudinal axis of the airplane.

$V$ = airspeed of the airplane in ft./sec.

$V_t$ = speed of the airplane along the flight path in ft./sec.

$V_H$ = the vertical velocity of the airplane = the vertical component of $V_t$ in ft./sec.

$\gamma$ = the track angle = the angle between the flight path of the airplane and the vertical.

$T$ = the time of fall of a bomb in a vacuum from an altitude H, with an initial vertical velocity = $V_H$.

$H$ = the altitude in feet above the target at which the bomb is released.

$B$ = the target; the line CBO representing the ground or sea level, or, in the case of an air target, a line parallel to the earth's surface passing through such air target.

$CB$ = the trajectory ground allowance in ft., which would be the linear trajectory error, if uncorrected.

Referring to Fig. 1A, which shows a representation of a diving airplane with its wings laterally inclined with reference to the horizontal, $\beta$ = the angle through which the wings of the airplane are inclined laterally with reference to the horizontal.

A basic feature of my invention is the compensation of the trajectory ground allowance (CB, Fig. 1) by means of apparent drift, produced by tilting the entrance prism E towards O (Fig. 1) at such a rate $n$, that the target B apparently drifts forward towards C, with reference to the azimuth stabilized cross-lines, a distance of CB on the ground in T seconds. Tilting entrance prism E forward (towards point O) causes the stabilized cross-lines of my invention, hereinafter fully described, to apparently move aft, with reference to the airplane, on the ground, the target apparently drifting forward towards C. The pilot-operator then maneuvers the airplane to bring and keep the cross-lines on the target, and when such a condition is reached the collision problem is momentarily solved. When this condition is reached, there is no apparent drift of the target with reference to the stabilized cross-lines, but the entrance prism E is being tilted away from point O and the range angle R is being changed at the rate of $n$ degrees/sec., such correcting for the trajectory error, in the manner described below.

Again referring to Fig. 1, assume the stabilized cross-lines are on target B, with the airplane altitude and flight path as shown. The vacuum time of fall for H and an initial velocity of $V_H$ will be T seconds, for all angles R. Then $$H = V_H T + \tfrac{1}{2} g T^2 \quad (1)$$

$$\tan \gamma = \frac{H \tan R}{V_H T} \quad (2)$$

As the range angle R is changed at the rate of $$\frac{dR}{dt} = n \text{ degrees/sec.}$$

the ground end of radius AB moves at a linear rate S, in a direction perpendicular to AB, of $$n \frac{\pi}{180} \frac{H}{\cos R} \text{ ft./sec.}$$

The horizontal component of linear rate S, or its rate of movement along the ground =

$$n \frac{\pi}{180} \frac{H}{\cos^2 R} \text{ ft./sec.} = \text{rate } S_n$$

In time T, the ground end of radius AB will move in a direction along the ground a distance =

$$n \frac{\pi}{180} \frac{H}{\cos^2 R} \times T \text{ ft.}$$

which distance must equal the trajectory ground allowance CB, if trajectory compensation is to be made. This being so, $$n \frac{\pi}{180} \frac{H}{\cos^2 R} \times T = CB = H (\tan \gamma - \tan R)$$

or $$n = \frac{dR}{dt} = \left( \frac{\tan \gamma - \tan R}{T} \right) \frac{180}{\pi} \cos^2 R \quad (3)$$

Substituting Equation 2 in Equation 3

$$n = \frac{\dfrac{H \tan R}{V_H T} - \tan R}{T} \times \frac{180}{\pi} \times \cos^2 R$$

$$n = \frac{\left( \dfrac{H}{V_H T} - 1 \right) \tan R}{T} \times \frac{180}{\pi} \times \cos^2 R$$

Substituting Equation 1

$$n = \frac{\left[ \left( \dfrac{V_H T + \tfrac{g}{2} T^2}{V_H T} \right) - 1 \right] \tan R}{T} \times \frac{180}{\pi} \times \cos^2 R$$

$$= \left( 1 + \frac{\tfrac{g}{2} T^2}{V_H T} - 1 \right) \frac{\tan R}{T} \times \frac{180}{\pi} \times \cos^2 R$$

$$= \frac{\tan R}{V_H} \times \cos^2 R \times \frac{g}{2} \times \frac{180}{\pi}$$

$$= \frac{1}{V_H} \times \frac{\sin R}{\cos R} \times \cos^2 R \times \frac{g}{2} \times \frac{180}{\pi}$$

Since $\sin 2R = 2 \sin R \cos R$ $$n = \frac{g}{2} \times \frac{180}{\pi} \times \frac{1}{2} \times \frac{\sin 2R}{V_H}$$

or $$n = C \frac{\sin 2R}{V_H} \quad (4)$$

where $$C = \frac{g}{2} \times \frac{180}{\pi} \times \frac{1}{2}$$

Equation 4 is not an empirical formula, but is a true expression for $n$ in a vacuum, and is the angular rate at which the line of sight AB (Fig. 1), is rotated toward point O to compensate for the trajectory error or ground allowance in a vacuum. For trajectories in air, the value of $n$ must be increased slightly to compensate for the trail of the bomb due to air friction.

The actual linear drift rate in a horizontal plane is $S_v$ ft./sec. (Fig. 1), in a direction away from O. This is exactly compensated for by rotating the sighting plane including AB towards O at an angular rate $n$, such producing a linear horizontal velocity at the ground end of AB of $S_n$ ft./sec., toward O. Thus $S_v T = S_n T = BC$, the trajectory allowance.

Thus, it is apparent that the angular rate $n$ is completely independent of altitude in a vacuum, and is independent of altitude in air, barring the slight effect of altitude on trail.

If $n$ be plotted as a function of R and $V_H$, it will be observed that $n$ varies little for values of R from 40° to 50°.

It should be noted that $V_t$ is not the air speed of the airplane, but is a function of V, the wind and the lift angle of the wings of the airplane. While in Fig. 1 $V_t$ is shown constant in both magnitude and direction, its magnitude varies with the angle of dive and the lift angle, and the end point of its vector describes a non-circular curve as the fuselage is tilted for trajectory compensation. In fact, even with the use of angular rate $n$ the track of the airplane would be curved, because neither air speed nor wind remain constant.

My invention comprises the following principal elements: the optical system, the barometric unit, the computer unit, the azimuth gyro and the vertical gyro, together with their associated and interconnecting circuits and mechanisms, including what I denominate the turn and tilt servo unit, and the $\alpha$ and $\beta$ servo unit.

Figure 8:
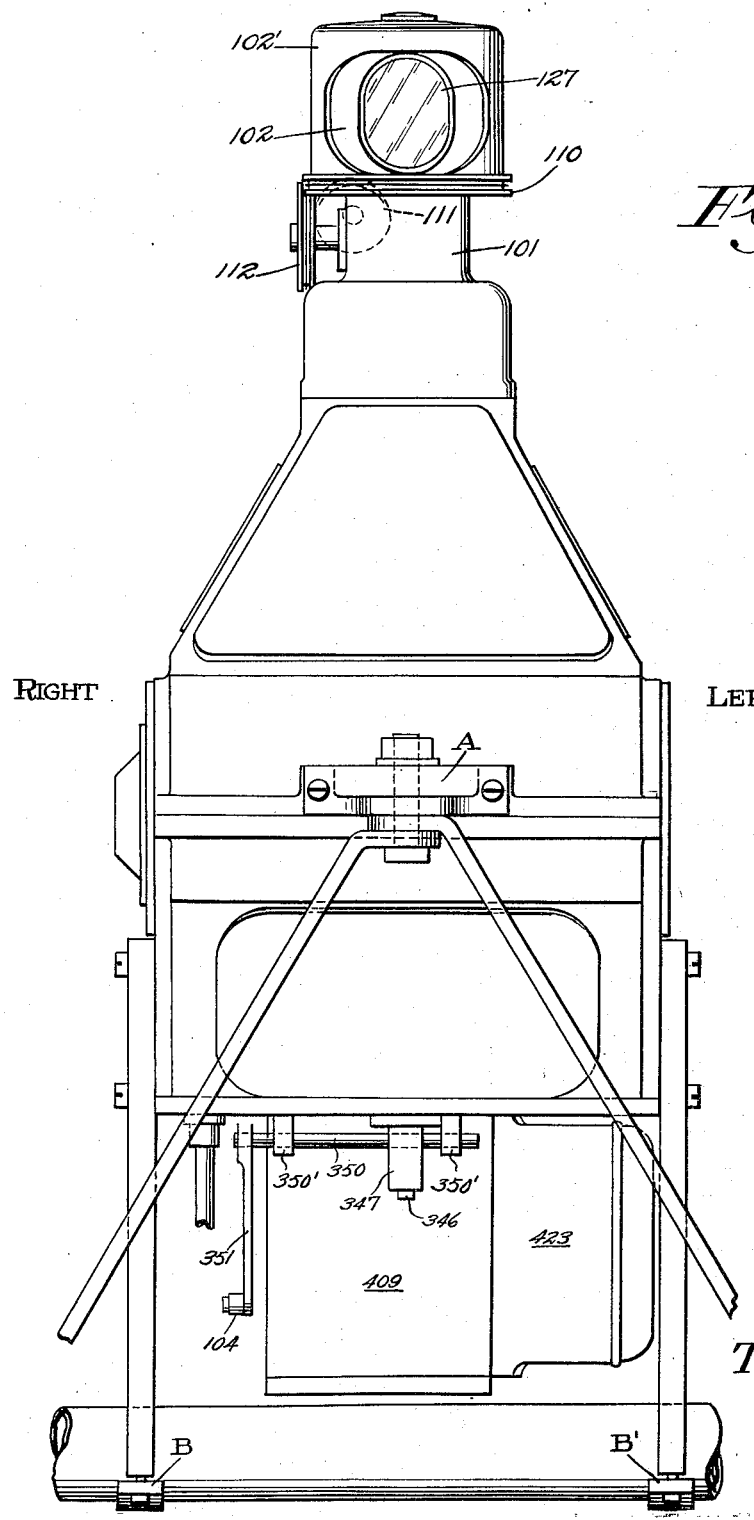
Fig. 8 is a front elevation showing the sight case with stays and supports for mounting in the fuselage of an airplane.
Figure 11:
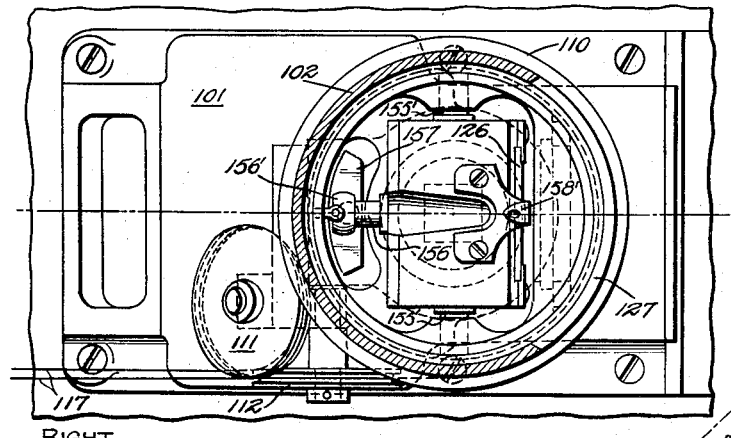
Fig. 11 is a horizontal sectional view through the entrance prism and case as indicated by line 11—11 of Fig. 9.

Figs. 3, 4, and 8 are exterior views of the casing of my invention as viewed from the right side, rear and front, respectively. As shown, the sight is mounted forward of the pilot's cockpit, the longitudinal axis of the sight being parallel to the longitudinal axis of the airplane. The bomb sight casing is supported at A (Figs. 3, 8) by fore and aft and athwartships brackets rigidly secured to the fuselage of the airplane, is clamped to an athwartships tubular member of the fuselage at B and B', (Figs. 3, 8) and is further secured to the fuselage at C and D (Fig. 3). Access may be had to the interior of the casing through removable plates, as shown.

The sighting telescope 100 extends rearwardly from the rear of the sight casing to the forward end of the pilot's cockpit. Supported by a vertical cylindrical extension 101 of the sight casing is rotatable entrance prism casing 102 (Fig. 20) with an opening in the front thereof. Azimuth gyro unlocking and locking control rod 103 and vertical gyro unlocking rod 104 also extend rearwardly from the sight casing to the cockpit, rod 103 terminating in knob 105. A soft rubber guard 106 is provided at the eye end of telescope 100. A rotatable shutter 102' (Figs. 3, 4, 8) having an opening therein surrounds casing 102 and protects the front window 127 when the sight is not in use. The mechanism by which this shutter is manually rotated is shown in Figs. 3, 4 and 4A. This mechanism comprises a sheave 110, integral with the shutter, a series of guide pulleys 111, 112, 113, 114 and 115, a hand-operated driving sheave 116, and a flexible cable 117. Cable 117, the ends of which are secured to sheave 116, is tightly stretched and threads the afore-mentioned sheaves and pulleys, passing through a slot in sheave 110, such that any rotation of sheave 116 causes corresponding rotation of sheave 110, and hence shutter 102'. Driving sheave 116 is rotatably secured to the fuselage of the airplane within easy reach of the pilot operator and is provided with an extension arm 118 and knob 119 to facilitate its rotation. A pointer 108, rigidly attached to a bracket mounted on extension 101, indicates on a scale 107, inscribed on the rear of shutter 102', the relative position of the opening in the shutter. Visible through a window 109 in the sight casing is a graduated dive angle indicator drum 527. An index 109' inscribed at the edge of window 109 indicates the momentary dive angle.

I will next proceed to describe the optical system of my invention in connection with Figs. 9 to 20 inclusive, Fig. 9 being the principal drawing.

The optical system is a well known panoramic system and in addition to serving the functions hereinafter described gives the advantages of some periscopic height. The line of sight from the eye through the system and out the front window 127 passes through the following lenses or prisms: first through a complete terrestrial sighting telescope 100 (Fig. 17), of a type well known in the art, which telescope acts as the eye piece of the system, and includes field lenses 120 and 121 (Fig. 9). Next, the line of sight passes through reticle lens 122, thence through roof prism 123 where it undergoes a 90° change of direction, thence through objective lens 124, thence through dove prism 125, thence through entrance prism 126 where it undergoes a large change of direction, and finally out front window 127.

Figure 12:
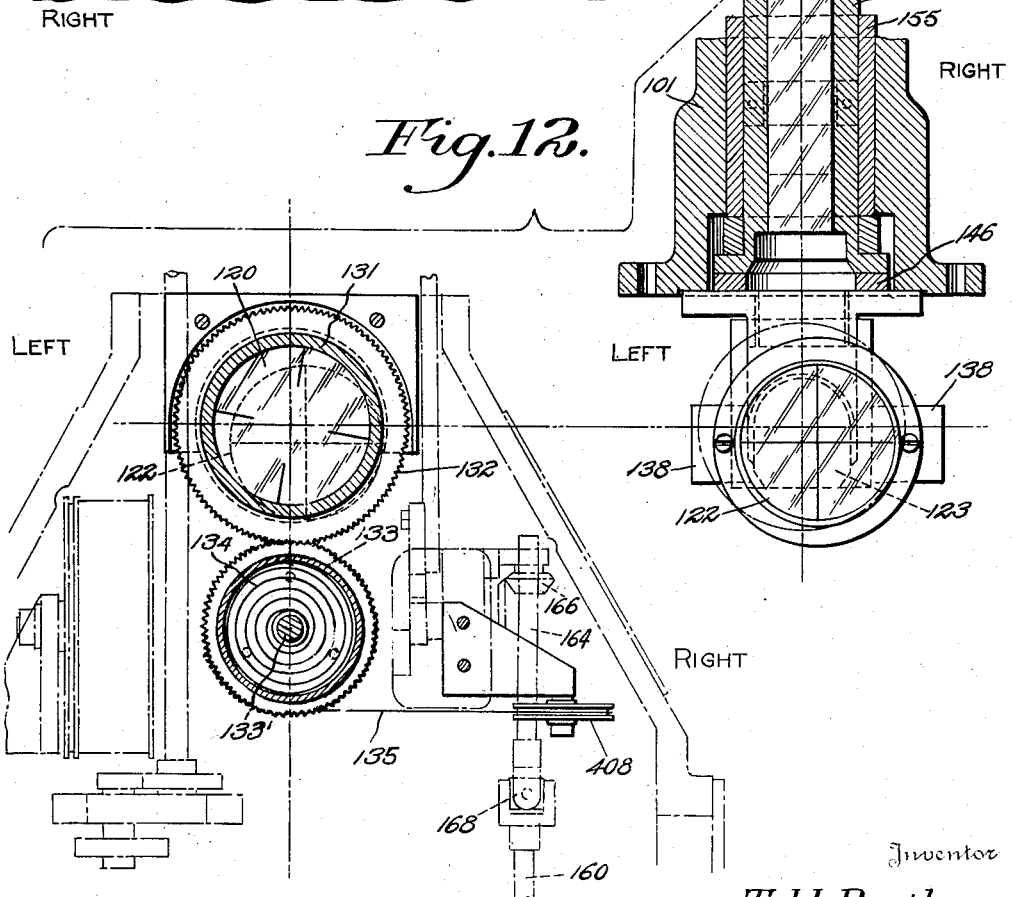
Fig. 12 is an exploded vertical cross-sectional view somewhat as indicated by lines 12—12—12 of Fig. 9, with parts in phantom, showing lens displacements corresponding to the airplane being inclined longitudinally and laterally.

The tube 128 of telescope 100 slides inside clamping sleeve 129 (Fig. 19) secured to the bomb sight casing and is rigidly held in place by clamping screw 130. Lenses 120 and 121 are mounted in rotatable tube 131 and rotate with it as gear 132, integral with tube 131, is rotated by gear 133 (Figs. 12 and 20). A spring 134 secured to gear 133 and to fixed shaft 133' tends to cause gear 133 to rotate in a counterclockwise direction, as viewed in Fig. 12. Flexible cable 135, the movement of which is controlled by servo power in turn controlled by the vertical gyro, rides in and is secured to a pulley 136, rigidly attached to gear 133. Four radial lines, 90° apart are etched on the flat surface of lens 120 and serve as field indicators. These four lines are in focus, are adjacent to the rim of the lens and each extends from the rim of the lens about one-half the distance to the center. If these lines were extended to the center of the lens they would form two cross-lines 90° apart, but as they do not, they are denominated the incomplete cross-lines.

Reticle lens 122 is supported in a tube 137 (Figs. 9, 18) secured to one end of bifurcated yoke 138 which is astride the roof prism 123 and is pivoted in bearings 139 and 140 mounted on the cardan 141 of the azimuth gyro 144. The other end of yoke 138 has a bracket 142 extending therefrom to which is connected one end of link 143 (Figs. 5, 30), the other end of link 143 connecting to a casing member 143' surrounding the spin axis of the azimuth gyro. The position of lens 122 is thus controlled by any tilt or turn of the azimuth gyro 144. Two complete cross-lines, 90° apart (Fig. 12), are etched on lens 122, and these cross-lines, in conjunction with the incomplete cross-lines described above, indicate fuselage motions. Roof prism 123 and objective lens 124 are secured to the sight casing in their respective mountings (Fig. 9).

The dove prism 125 is mounted in rotatable flanged tube 145, to the flange of which arc gear 146 (Figs. 9 and 10) is fixedly secured to mesh with gear 147 which turns freely on fixed journal 148. Gear 147 is driven by pinion 149, fixedly secured to rotating shaft 150, the latter integral with gear 151. Gear 151 is in turn driven by pinion 152 which rotates with gear 153, the latter driven from the turn servo unit 238, hereinafter described.

Pinion 152 also meshes with and drives an arc gear 154 which is fixed to the lower end of rotatable tube 155 which has entrance prism case 102 fixed to its upper end to rotate with it. The entrance prism 126 is mounted on gudgeons 155' (Fig. 11) which are supported in bearings in case 102, such that when case 102 rotates, prism 126 rotates with it at the rate of $n_4$ degrees per sec.

The driving gear ratios are such that dove prism 125 is moved, from a coinciding center fore-and-aft position, through one-half the angle and at one-half the angular rate that the entrance prism 126 is moved. The dove prism is used in the optical system and is rotated as described above in order to prevent the azimuth stabilized cross-lines from turning in the optical field.

Entrance prism 126 is also tilted in case 102 about the axis of its gudgeons by means of the mechanism shown in Figs. 5, 9, 11, 20 and 21. One end of short arm 156 is secured to the mounting of prism 126, the other end of arm 156 being provided with a roller 156' which rests on table 157. A coil spring 158 (Fig. 5) connected between a hook 158' secured to the prism mounting and the prism case 102 causes roller 156' to rest on table 157 for all positions of the table. Table 157 is secured to the upper end of push rod 159, which is moved longitudinally up and down in bearings 157' and 159' as shaft 161' (Fig. 20) is rotated, by means of the mechanism shown in Figs. 20 and 21. The lower end of rod 159 rests on a roller supported from crank arm 161 which is secured to shaft 161', the latter having a bearing 162' secured to the sight casing. Arm 162 is fixedly secured to and pivots on shaft 161', while gear segment 163, rigidly attached to arm 162 near its lower end, meshes with gear 163', the latter being secured to and rotatable with the same shaft 164 to which bevel gear 165 is rigidly attached. Shaft 164 is rotatable in a bearing in bracket 164' rigidly secured to the sight casing. Bevel gear 165 meshes with bevel gear 166 which is attached to short shaft 167, the latter being driven from shaft 160 through universal joint 168. It is apparent that rotation of shaft 160, which is driven from the computer unit 411 described below, causes corresponding rotation of gear 163', such gear, meshing with segment 163, producing movement of arm 162, rotation of shaft 161', longitudinal movement of rod 159, and hence movement of table 157, producing a tilt of the entrance prism 126 in its mounting in case 101. When prism 126 is tilted, such occurs at the rate of $n \pm n_2$ degrees per sec.

My invention utilizes two gyroscopes, the azimuth gyro 144 and the vertical gyro 169. The azimuth gyro 144, which will be described in connection with Fig. 5, and Figs. 30 to 37 inclusive, is mounted in the sight casing (Fig. 5) almost directly below the periscopic portion of the optical system and its spin axis, when locked, lies parallel to the longitudinal axis of the airplane.

Figure 36:
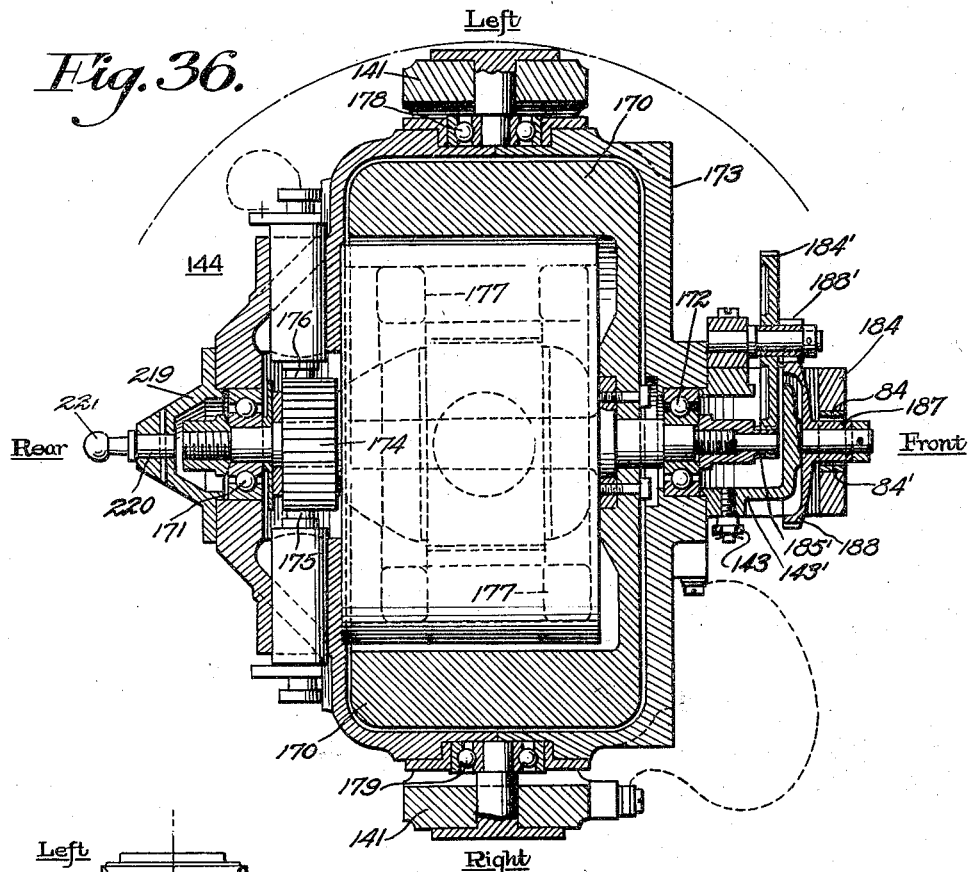
Fig. 36 is a horizontal cross-sectional view of the azimuth gyro.
Figure 37:
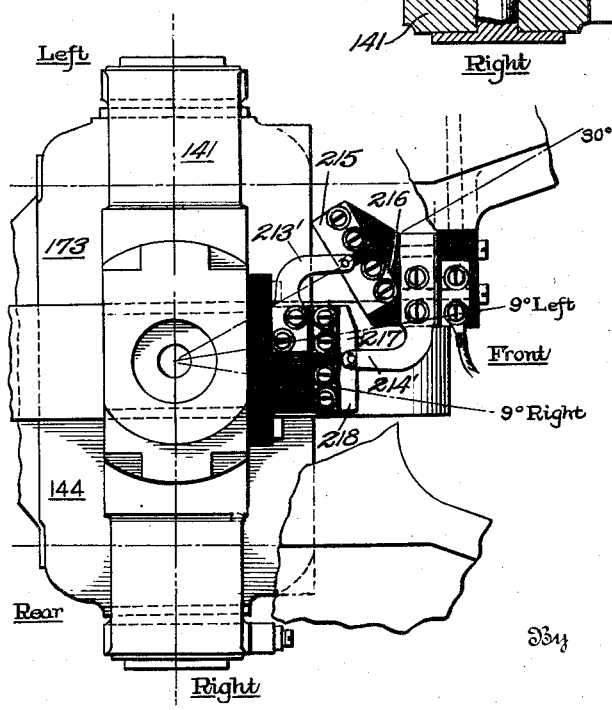
Fig. 37 is a fragmentary top plan view of the azimuth gyro, showing another group of brushes and contacts.

The azimuth gyro 144 is essentially a shunt wound D. C. motor (Fig. 2A), the armature of which is the gyro rotor 170, and whose casing 173 is mounted in a cardan 141. Referring to Fig. 36, rotor 170 is supported in ball bearings 171, 172 in gyro casing 173, and is provided with a commutator 174 upon which brushes 175, 176 bear. The field windings 177 are mounted in casing 173. Casing 173 is supported in bearings 178, 179 mounted in the opposite sides of cardan 141, such permitting casing 173 to rotate through a part of a revolution about the generally athwartships axis through bearings 178, 179. The cardan 141 is rotatably supported in upper bearing 180 (Fig. 30) and rests upon and is secured to a flange 181, the latter being rigidly secured to a shaft 182 which is rotatably supported in lower bearing 183. Upper bearing 180 is journaled on a shaft 180' which is supported from a bracket 179' rigidly connected to the sight casing. Bearing 183 is supported by a member 183' (Fig. 33) rigidly secured to the sight casing.

Semi-circular bail 184 is pivotally mounted in cardan 141, the upper end of bail 184 being disposed in a normally vertical plane, passes around the forward side of azimuth gyro 144 and is drilled to receive short shaft 185, which is an extension of shaft 180'; the lower end of this bail is rotatably supported in bearing 186 which fits around the upper end of shaft 182. Bail 184 has a central longitudinal slot 84 therein, the sides of which are provided with friction linings 84' of cork. Roller 187, driven by gears 188, 188', 184' and 185' (Fig. 36) from the rotor shaft, bears against this roughened surface and causes turning of the gyro about the axis through bearings 180 and 183 when the bail magnet 190' is energized, as described below.

Solenoids 189, 190 (Figs. 31, 32) of bail magnet 190' are secured to a bracket 189' which is bolted to bail 184 at its lower end and extends therefrom, while pole pieces 187', 187'', bolted to cardan 141, are positioned adjacent to solenoids 189, 190, respectively, such that when either solenoid is energized the pole piece adjacent thereto is magnetically attracted, producing sufficient rotation of the bail in its bearings to cause one or the other cork-lined surfaces 84' in the slot 84 in bail 141 to bear against roller 187. A pair of coil springs 191, 192 (Fig. 32) are respectively secured between brackets 193', 192', bolted to the bail 184, and bracket 194', secured to cardan 141. These springs 191, 192 are in tension and are adjustably mounted. Also secured to bracket 194' is a modified U-shaped leaf spring 195' (Figs. 30, 32), the arms of which are held separated by a spacer member 196' also secured to bracket 194'. A centering member 197', bolted to the bail 184, is disposed between the arms of leaf spring 195', but does not touch either arm of spring 195' when the bail 184 is in its central position with reference to roller 187. Coil springs 191, 192 and leaf spring 195' tend to return the bail 184 to its central position when it is displaced therefrom by the action of the bail magnet 190'.

Shaft 182 (Fig. 33) also supports, at its lower end, the armature 193 of the torque motor 194 for the azimuth gyro. This armature comprises a core piece 195, secured to shaft 182, with two armature coils 196, 197 (Figs. 2A, 33, 34) wound on the core piece. Field coils 198, 199, 200, 201 are wound on field cores 202, 203, secured to fixed members 183', field cores 202, 203 being provided with pole piece extensions 204, 205, 206, 207. Armature 193 is centrally located with reference to these pole piece extensions. The armature and field coils of this torque motor 194 are so connected (Fig. 2A) that when energized, in the manner explained below, this motor will exert a torque on cardan 141 tending to rotate it in bearings 180, 183, such resulting in tilting of the gyro spin axis in accordance with the well-known laws of gyroscopic precession.

A pair of insulated brushes 208, 209 (Figs. 33, 35), attached to the azimuth gyro casing 173 by a bracket 173', are disposed so as to bear either against contact 210, contact 211 or an insulated neutral surface 212 between such contacts. Contacts 210, 211 and neutral surface 212 are insulatedly mounted on a bracket 210' which is rigidly secured to cardan 141. Brushes 208 and 209 are electrically connected together and are further connected by suitable conductors to the positive line (Fig. 2A). Contacts 210 and 211 are respectively connected by flexible conductors to terminals 213 and 214 of the torque motor 194. The internal connections of the torque motor are as shown in Fig. 2A, one terminal of each armature coil being connected to ground. Since the negative battery terminal is also connected to ground, it is apparent that when brushes 208, 209 bear against either contact 210 or 211, as occurs when the airplane is dived or climbed (cardan 141 following the movements of the airplane and the spinning azimuth gyro 144 pointing in a constant direction in space), the torque motor will be energized. The electrical connections are so made that the torque motor will exert a torque in such direction as to cause the gyro rotor to be tilted so as to generally follow the climbing or diving movement of the longitudinal axis of the airplane, and at a rate of $n_1$ degrees per sec.

Terminal 213 is further connected through one set of contacts of limit switch 242 to one terminal of tilt solenoid 239, while terminal 214 is similarly connected to one terminal of tilt solenoid 240 through a separate set of contacts of limit switch 242. Solenoids 239, 240 are parts of the prism tilt servo unit 241', described below. Limit switch 242 breaks the electrical circuit to solenoid 239 or 240 when the prism is tilted past its maximum safe angle. Push-button switches 243 and 244 are connected respectively between terminals 213 and 214 and the positive line, and when manually closed, energize solenoids 239 and 240 respectively, to tilt the entrance prism 126 up or down as may be desired, and thus to pre-set it at any desired angle within the limits of its travel.

Two additional brushes 213', 214' and two additional pairs of contacts, 215, 216 and 217, 218 are provided (Fig. 37), the circuits between these brushes and their respective contacts being closed when the direction of the longitudinal axis of the airplane is changed to the right or left through a sufficient angle, causing movement of the sight casing relative to cardan 141. Brushes 213' and 214' are electrically connected together. Contact 215 is connected to contact 218, contact 216 to contact 217, flexible conductors being used in all these connections. Brush 213' and contacts 217, 218 are insulatedly mounted on a bracket secured to cardan 141; brush 214' and contacts 215, 216 are insulatedly mounted on a bracket rigidly secured to the sight casing. Insulated neutral surfaces are provided between contacts 215, 216 and between contacts 217, 218, similar to the neutral surface between contacts 210 and 211, above described. In Fig. 2A, brush 214' and contacts 217 and 218 only are indicated, brush 213' and contacts 215, 216 being in parallel with those indicated. Brushes 213', 214' are connected to the positive line, contacts 215, 218 are connected to bail magnet solenoid 190 (Figs. 2A, 32), and contacts 216, 217 are connected to bail magnet solenoid 189, the remaining terminal of each solenoid 189, 190 being connected to ground. Thus, when the airplane is turned right or left through a sufficient angle, the circuit is closed between brushes 213', 214' and contacts 215, 218 or contacts 216, 217, one of bail magnet solenoids 189, 190 is energized, producing sidewise movement of bail 184 (Figs. 32, 33). Rotating roller 187 then bears against the roughened surface of one side of the longitudinal slot in the bail, exerting a torque on the end of the gyro rotor shaft, and causing the gyro, its case and cardan to turn in bearings 180, 183, at a rate of $n_3$ degrees per sec.

This turning continues until the electrical circuit between brushes 213', 214' and their respective contacts is broken, brushes 213', 214' then bearing against the insulated surface between these pairs of contacts. It is in this manner that the azimuth gyro is precessed to follow the turning movement of the airplane.

Contacts 215 and 218 are further connected to terminal 233 (Fig. 2A), which is connected through spring contacts 223', 224' of limit switch 234 to one terminal of solenoid 235 of the prism turn servo gear 238. Similarly, contacts 216 and 217 are connected to terminal 236 which is connected through a separate pair of spring contacts 225', 226' of limit switch 234 to one terminal of solenoid 237 of prism turn servo unit 238. The remaining terminals of both solenoids 235 and 237 are grounded. Thus, when the bail magnet 190' is energized, as a result of the circuit between brush 214' and contact 217 or 218 being closed, the prism turn servo unit 238 is also energized, causing turning of the entrance prism 126 at a rate of $n_4$ degrees per sec., in the manner below described. A circuit opening dog 227', secured to tube 155 (Figs. 2A, 13) opens the normally closed electrical circuit between contacts 223', 224' or 225', 226' when the entrance prism 126 has been turned to its safe limit of travel.

Push-button switches 245, 246 are connected respectively between terminals 236 and 233 and the positive line, and when manually closed, energize respectively prism turn solenoids 237 and 235, so as to pre-set prism 126 any desired angle to the right or left. Switch 247 (Fig. 2A) closes the electrical circuit between the positive terminal of the 12 v. D. C. battery and the positive line, and is the main switch for starting and stopping the sight mechanism. Switches 243 and 247, inclusive, are all within easy reach of the pilot-operator.

The neutral insulated surfaces between the respective pairs of aforementioned contacts are preferably of such width that the direction of the axis of the airplane must be changed greater than ±10 degrees on either side of the center of these insulated surfaces before the brushes make electrical contact with their respective contacts.

Secured to the rear side of the casing of the azimuth gyro is a conical extension 219 (Figs. 5, 21, 30, 36). A non-rotating locking guide shaft 220 is rigidly secured to extension 219 such that the axis of shaft 220 coincides with the axis of the rotor 170 of the gyro. The rearward end of shaft 220 terminates in a spherical member 221. Disposed adjacent to extension 219 is a locking cone 222 and integral sleeve 222', which is slidably supported in sleeve 223, the latter being fixedly secured to the rear side of the sight casing. The inner surface of the front end of cone 222 is shaped to receive extension 219, shaft 220 and spherical member 221, such that when ball 221 engages the inner tapered surface of the locking cone 222 and sleeve 222', the azimuth gyro 144 is securely locked against movement, although its rotor is free to spin. A coil spring 224 tends to force the locking cone 222 and sleeve 222' in engagement with extension 219 and ball 221. There is a notch 225 in locking sleeve 222' near its rearward end, notch 225 being engageable by pawl 226 to hold locking sleeve 222' and cone 222 in its rearward position against spring 224 and out of engagement with extension 219 and ball 221. The inner surface of sleeve 222' at its rearward end is threaded to receive unlocking and locking rod 103 to which cam 227 (Figs. 21 and 24) is rigidly secured. Rod 103 is rotatable in the threaded portion of sleeve 222' and as it rotates, cam 227 engages and lifts pawl 226 clear of notch 225, permitting spring 224 to force the locking cone 222 and sleeve 222' forward into engagement with extension 219 and spherical member 221, thus locking the azimuth gyro. This gyro is unlocked by pulling rod 103, and with it sleeve 222', to the rear against spring 224 until pawl 226 engages the notch 225 in sleeve 222'. A spring 228, one end of which is secured to a flange member integral with sleeve 223, acts to force pawl 226 into engagement with notch 225.

Pawl 226 is also withdrawn from engagement with notch 225, and the azimuth gyro locked by a mechanism shown in Fig. 21, including arm 229, link 230, lever 231 and cam extension 232. Arm 229 is rigidly secured to the same shaft 229' to which pawl 226 is attached. Link 230 connects arm 229 to one end of lever 231 which is pivoted near its longitudinal center on pin 231' fixedly secured to the sight casing. Cam extension 232, which is rigidly secured to arm 162 and moves with it, bears against the upper surface of lever 231 on the opposite side of its pivot from link 230. The free end of lever 231 has a lip 232' thereon. When the lower end of arm 162 is moved sufficiently to the right, as seen in Fig. 21, cam extension 232 engages lip 232' on lever 231, and forces the right side of lever 231 downward. Such, acting through the mechanism just described, forces pawl 226 out of engagement with slot 225, thus locking the gyro. This locking of the azimuth gyro occurs when the entrance prism is tilted downward through a large angle, as might occur when the pilot suddenly "pulls out" of a dive.

The azimuth gyro 144 has 9° of universal freedom with reference to the sight casing. The bail magnet 190' and torque motor 194 always act to precess this gyro, however, when the angle between its axis and the longitudinal axis of the plane is greater than 1°.

The turn and tilt servo unit 241, which is controlled by current through brushes 208 and 209 associated with the azimuth gyro 144, as above described, and which furnishes the motive power to turn both the entrance prism 126 and the dove prism 125, and which further supplies the rate $n_2$ to the computer unit, will next be described in connection with Figs. 25 to 29, inclusive. This unit, which includes the servo turn unit 238 and the servo tilt unit 241', comprises essentially a shunt wound D. C. motor 248, four solenoid operated clutch units 250', 251', 252', 253' and two differentials 268, 273. Motor 248 is energized when the main switch 247 on the pilot's switch panel is closed. A pinion 249 on the motor shaft meshes with and drives gears 250, 251, the latter two gears driving gears 252 and 253, respectively. The armature of motor 248 and gears 250, 251, 252, 253 rotate continuously while the sight is in operation.

Clutch units 250', 251', 252', and 253' include, respectively, gears 250, 251, 252 and 253, clutch units 250' and 252' are, in turn, included in the tilt servo unit 241' and clutch units 251' and 253' are included in the turn servo unit 238. Clutch units 250' and 251' have corresponding parts and are operative in the same manner to drive the upper gears of differentials 268 and 273, respectively; clutch units 252' and 253' are likewise correspondingly similar and are operative to drive the lower gears of differentials 268 and 273. Further, the tilt servo unit 241' is identical with the turn servo unit 238 and operates in the same manner. This being so, only the tilt servo unit 241' will be described in detail herein.

Figure 26:
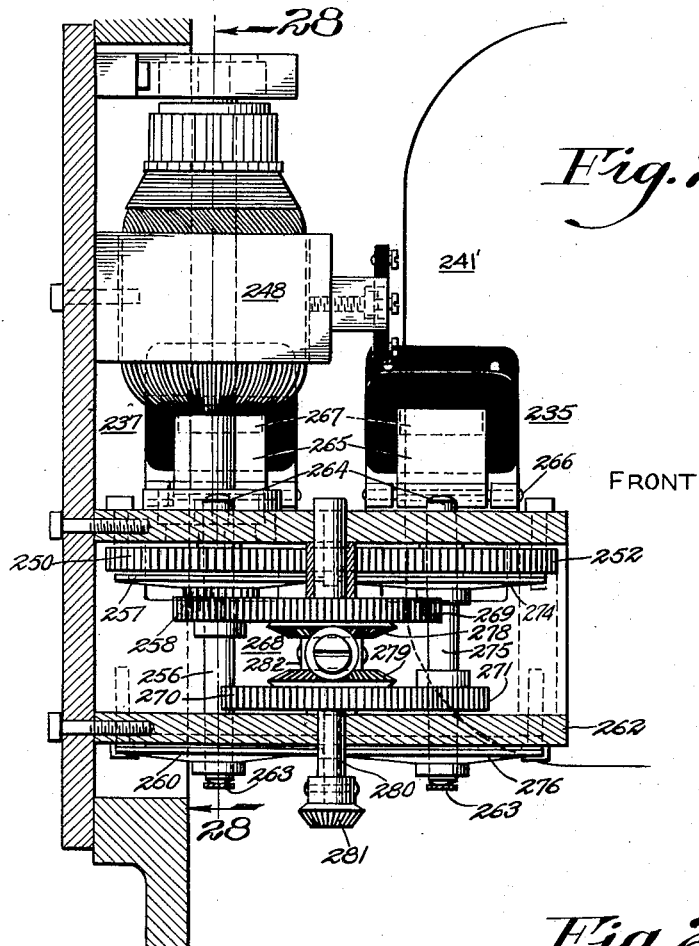
Fig. 26 is a vertical longitudinal sectional view as indicated by line 26—26 of Fig. 25.
Figure 27:
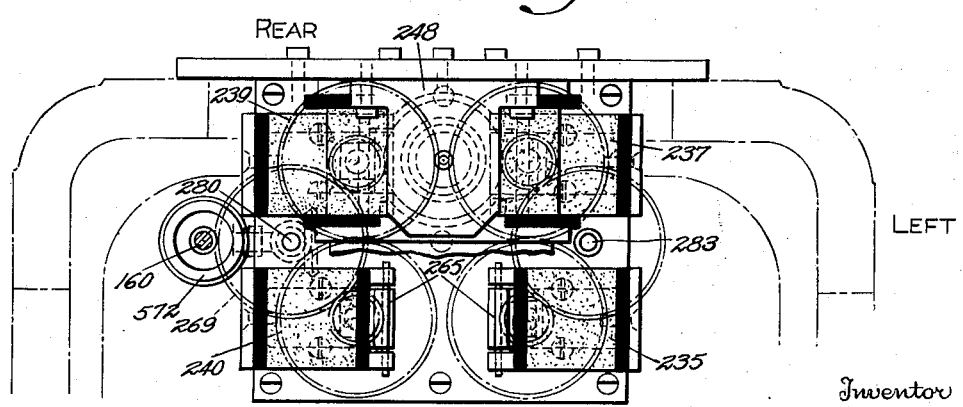
Fig. 27 is a top plan view of the turn and tilt servo unit.

Gear 250 (Fig. 28) of clutch unit 250' of the tilt servo unit 241' has an annular depression in its lower face in which a cork insert 254 is fixedly embedded. Gear 250 also has an integral upwardly-extending sleeve 255, both gear 250 and sleeve 255 being rotatable on a shaft 256 and free to slide longitudinally thereon. Disposed immediately below gear 250 is a friction plate 257 having a downwardly-extending integral gear 258, both plate 257 and gear 258 being secured to shaft 256. A spring disc 259, disposed between plate 257 and gear 250, acts to keep cork insert 254 on gear 250 out of frictional engagement with plate 257. Secured to the lower end of shaft 256 is a second friction plate 260 which is held in frictional engagement with cork insert 261 secured to rigid plate 262, by spring 263, the latter acting to compress spring disc 259. Sleeve 255 extends upwards beyond the upper end of shaft 256 and supports, at its upper end, a short dome-topped push rod 264, the latter having an integral flange that rests on the upper end of sleeve 255. One arm of lever 265, pivoted on pin 266, rests on the domed-surface of push rod 264, the other arm of lever 265 being disposed adjacent the core 267 of solenoid 239. Gear 258 meshes with and drives the upper gear 269 of differential 268 (Fig. 26).

Clutch unit 252' (Fig. 26) of the tilt servo unit 241' is identical with clutch unit 250', except that gear 271, which corresponds to gear 258 of the clutch unit 250', is not integral with plate 274, but is secured to shaft 275 near its lower end, and meshes with and drives the lower gear 270 of differential 268.

Figure 28:
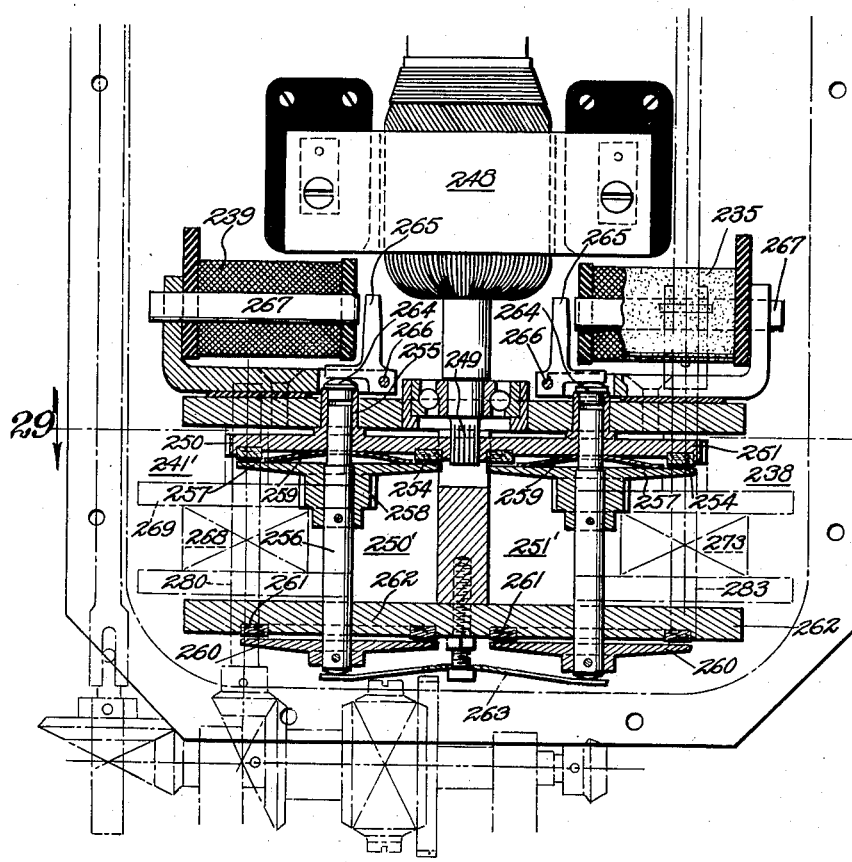
Fig. 28 is a vertical transverse sectional view of the turn and tilt servo unit as indicated by line 28—28 of Fig. 26.
Figure 29:
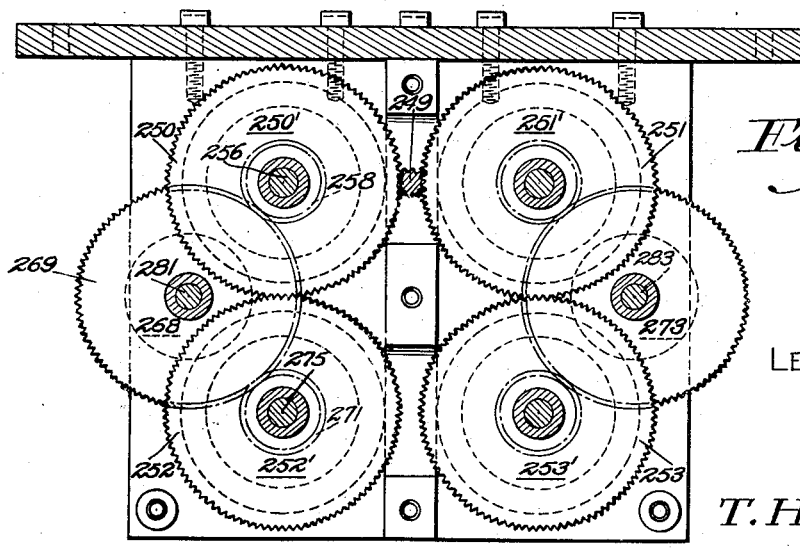
Fig. 29 is a horizontal sectional view as indicated by line 29—29 of Fig. 28, and shows the planetary gears of the turn and tilt servomotor unit.

The servo tilt unit 241' operates as follows: As shown in Figs. 26 and 28, both lower friction plates 260, 276 are held in frictional engagement with cork inserts secured to rigid plate 262, such preventing rotation of shafts 256 and 275. However, gears 250, 252 rotate freely on their shafts, driven by pinion 249. Now, if solenoid 239 be energized, as would occur when the longitudinal axis of the airplane were tilted, its core 267 would attract the adjacent arm of lever 265 (Fig. 28), causing the latter to force gear 250 downward until it frictionally engages plate 257, at the same time moving shaft 256 slightly downward against spring 263, breaking the frictional engagement between plate 260 and the cork insert 261 in plate 262. When this occurs, plate 257, shaft 256 and gear 258 rotate, the latter driving the upper gear 269 of differential 268. The lower gear of differential 268 being held against rotation since shaft 275 (Fig. 26) is still frictionally held stationary, the rotation of upper gear 269 and with it bevel gear 278, causes the planetary gears of the differential to rotate and travel around stationary bevel gear 279. Such produces rotation of shaft 280 and bevel gear 281, shaft 280 being secured to and rotatable with the planetary gear mounting 282.

If solenoid 240 be energized, instead of solenoid 239, the clutch unit 252' operates in a similar manner, except that the lower gear 270 of differential 268 is rotated while the upper gear 269 remains stationary, such also producing rotation of the planetary gears, their mounting 282, shaft 280 and bevel gear 281, but in the opposite direction.

The turn servo unit 238, including the other two magnetic clutch units 251' and 253', operates in an identical manner, shaft 283 (Figs. 6, 25), rotatable with the planetary gear mounting of differential 273, turning in one direction when solenoid 235 is energized, and in the opposite direction when the other turn solenoid 237 (Figs. 2A, 25) is energized. Gear 284 (Figs. 20, 25) is secured to and rotates with shaft 283 and drives shaft 289 (Figs. 6, 9, 20) through gears 285, 286, 287 and short shaft 288 (Fig. 20). Shaft 289 has a pinion 290 secured thereto at its upper end (Fig. 20), pinion 290 meshing with and driving gear 153. Rotation of gear 153 produces turning of the dove prism 125 and entrance prism 126, as described above, under the optical system.

The vertical gyro 169 of my invention will now be described in connection with Figs. 2A, 5, 61, 62, 64, 65 and 66. The spinning axis of this gyro is substantially vertical while the sight is in operation. It is mounted in the front portion of the sight casing (Fig. 5).

The vertical gyro consists essentially of a series wound D. C. motor (Fig. 2A) whose armature is the gyro rotor and whose casing 291 (Fig. 62) is pivotally supported in a cardan 292, in bearings 293, 294 whose axes are substantially fore and aft as referred to the airplane in which the sight is mounted. The cardan 292 is rotatably supported on journal 296 and is secured to hollow shaft 295, the axes of journal 296 and shaft 295 being substantially athwart-ships. Journal 296 is fixedly secured to hub 298, the latter being bolted to the sight casing. Shaft 295 rotates with cardan 292 in bearing sleeve 295' supported by a flange 297' secured to hub 297, the latter bolted to the sight casing. The outer end of shaft 295 terminates in a flange 307 (Fig. 66), the latter being divided into four segments 308, 309, 310, 311, insulated from each other, and internally connected through shaft 295 to terminals 312, 313, 314, 315 respectively (Fig. 2A). Terminals 312 and 313 are respectively connected by flexible conductors to the ungrounded terminals of solenoids 316 and 317 of the bail magnet 305. Terminals 314 and 315 connect, respectively, to contacts 321 and 320 of disc 322.

Brushes 323, 324, 325, 326 (Figs. 2A, 66) bear against and make electrical contact with segments 308, 309, 310, 311, respectively. These brushes are insulatedly mounted on hub 297 and connect respectively to push button switch 327, push button switch 328, β clutch solenoid 330 and β clutch solenoid 329.

Also rotatably supported on journal 296 and shaft 295 is a generally semi-circular bail 299 having a central longitudinal cork-lined slot 300 therein. A roller 301 (Fig. 62), driven from the gyro rotor shaft through gears 302, 303, 304 and an additional gear (not shown) rigidly secured to and rotatable with the gyro rotor shaft, rotates in slot 300 and bears against the sides of this slot when bail 299, actuated by bail magnet 305, is rotated slightly in its bearings in the manner described below.

Rotatable on bearing sleeve 295' is a gear 306, having two contacts 331, 332 insulatedly mounted thereon, adjacent brush 334, the latter insulatedly mounted on cardan 292. Brush 334 (Fig. 2A) is connected to terminal 334' which is in turn connected to the positive line, while contacts 331, 332 are respectively connected through spring contacts 335, 336 to α clutch solenoids 338 and 337. There is an insulated neutral surface disposed between contacts 331 and 332.

Disc 322 (Fig. 62) is rotatably journaled on a short cylindrical extension from the forward side of cardan 292. A spring 339 acts to cause disc 322 to rotate clockwise as seen in Fig. 65. Disc 322 has a circumferential groove 339' (Fig. 61) therein in which is wound a flexible cable 340, one end of the latter being secured to disc 322. Cable 340 threads guide pulleys 341, 342, 343 and its other end is wound around and secured to a drum 344 of the α and β servo unit 355. Cable 340 being taut, the angular position of disc 322 is thus controlled by the movement of drum 344. A brush 333 (Figs. 2A, 62, 65) insulatedly mounted on the case 291 of the vertical gyro 169, bears against either contact 320, 321 or an insulated neutral surface between. Brush 333 is connected to the positive line and when it bears against contacts 320 or 321, it closes the electrical circuit to β clutch solenoids 329, 330, respectively.

The bail magnet 305, being similar in construction to the bail magnet 190' of the azimuth gyro 144, is not shown in detail. Its solenoids 316, 317 (Fig. 2A) are energized only when push-button switches 327, 328 are closed by the pilot-operator in the operation of pre-setting the vertical gyro 169 to the vertical.

Figure 61:
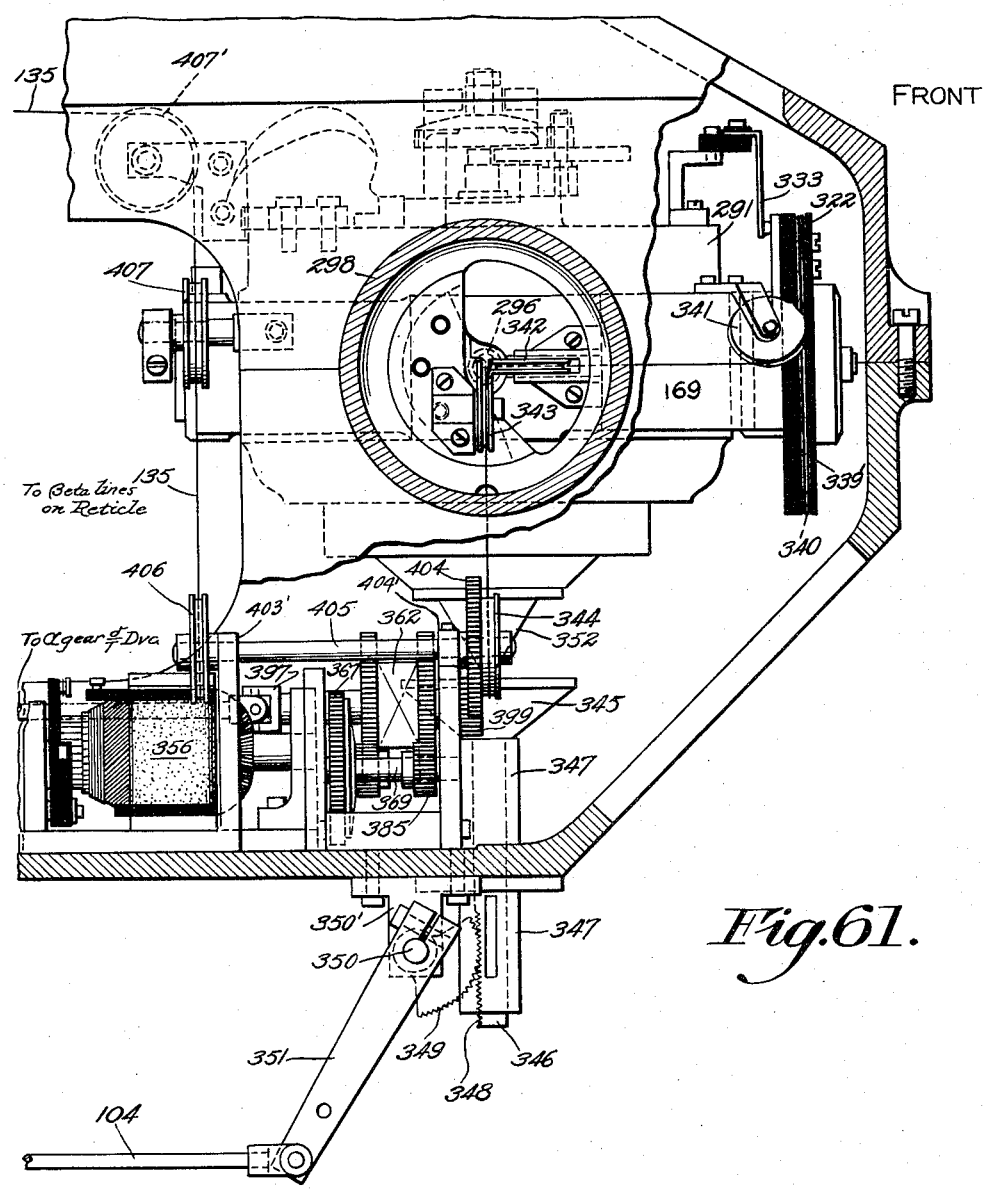
Fig. 61 is a right elevation of the front end of the bomb sight, with the sight case partially removed, showing the right side of the vertical gyro, its locking gear, and the right side of the $\alpha$ and $\beta$ servo unit.
Figure 62:
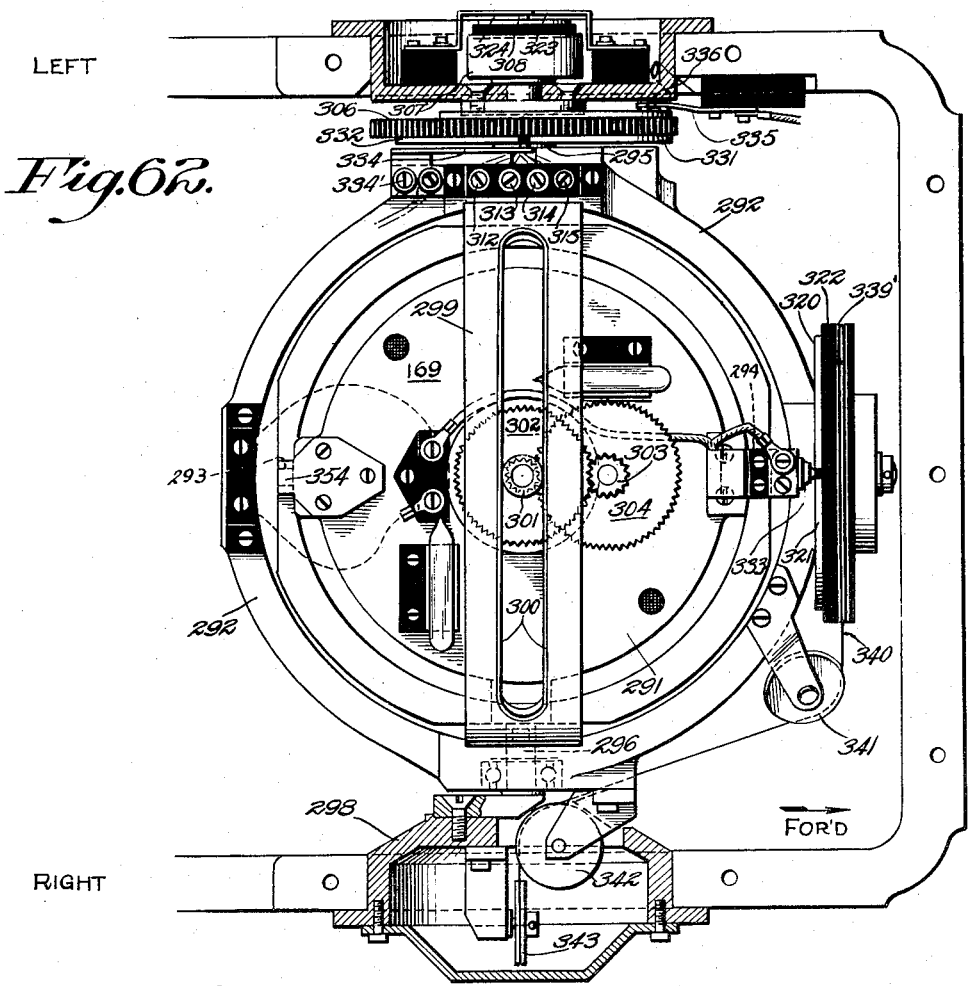
Fig. 62 is a top plan view of the vertical gyro as mounted in the sight casing.
Figure 64:
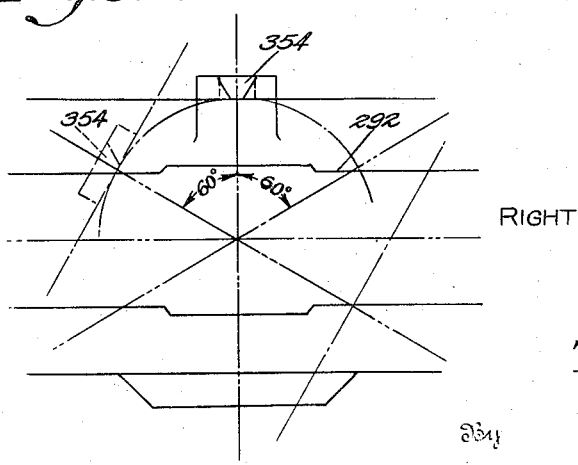
Fig. 64 is a diagrammatic view of the mechanical stop restricting the vertical gyro to 60° tilt with reference to its Cardan.

A locking cone 345 and integral sleeve 346 (Figs. 61, 65) is provided for the vertical gyro 169, sleeve 346 passing through and being longitudinally slidable in a guide 347 secured to the sight casing. Gear teeth are cut in the outer surface on the lower end of sleeve 346 forming a rack 348 which is engaged by gear sector 349, the latter secured to and rotatable with shaft 350. Shaft 350 is rotatably supported in brackets 350' rigidly secured to the sight casing. Lever 351, to which rod 104 is attached, is also clamped to shaft 350, such that longitudinal movement of shaft 104 causes longitudinal movement of sleeve 346, and with it, locking cone 345. When the pilot-operator pushes rod 104 to the front, moving it to the right as seen in Fig. 61, the locking cone 345 is moved upward and engages a conical extension 352 of the vertical gyro casing 291 to lock the vertical gyro, a spherical tip 353 on extension 352 engaging the interior surface of sleeve 346. The vertical gyro 169 is unlocked when the pilot-operator pulls rod 104 to the rear, such causing movement of the rod to the left, as seen in Fig. 61.

A stop plate 354 (Fig. 64) secured to the case 291 of the vertical gyro comes into contact with the cardan 292 thereof when the gyro case 291 is tilted 60° with reference to the cardan, and thus mechanically prevents further relative tilt of the gyro and case.

It should be noted that when the azimuth gyro 144 and the vertical gyro 169 are locked, brushes 208, 209, 213', 214', 333 and 334 are centered on the neutral insulated surfaces between the aforementioned contacts.

The α and β servo unit 355 is located in the sight casing almost directly under the vertical gyro 169, with the motor 356 of this unit under the rear portion of the azimuth gyro 144, and will be described in connection with Figs. 2A, 7, 54, to 60, inclusive. Like the turn and tilt servo unit, the α and β servo unit comprises essentially a shunt wound electric motor 356, four clutch units 357, 358, 359, 360, two differentials 361, 362 and the necessary connecting gearing, shafting, etc. Clutch units 357 and 358 are the α clutch units and differential 361 is the α differential; while clutch units 359 and 360 are the β clutch units, differential 362 being the β differential.

Figure 54:
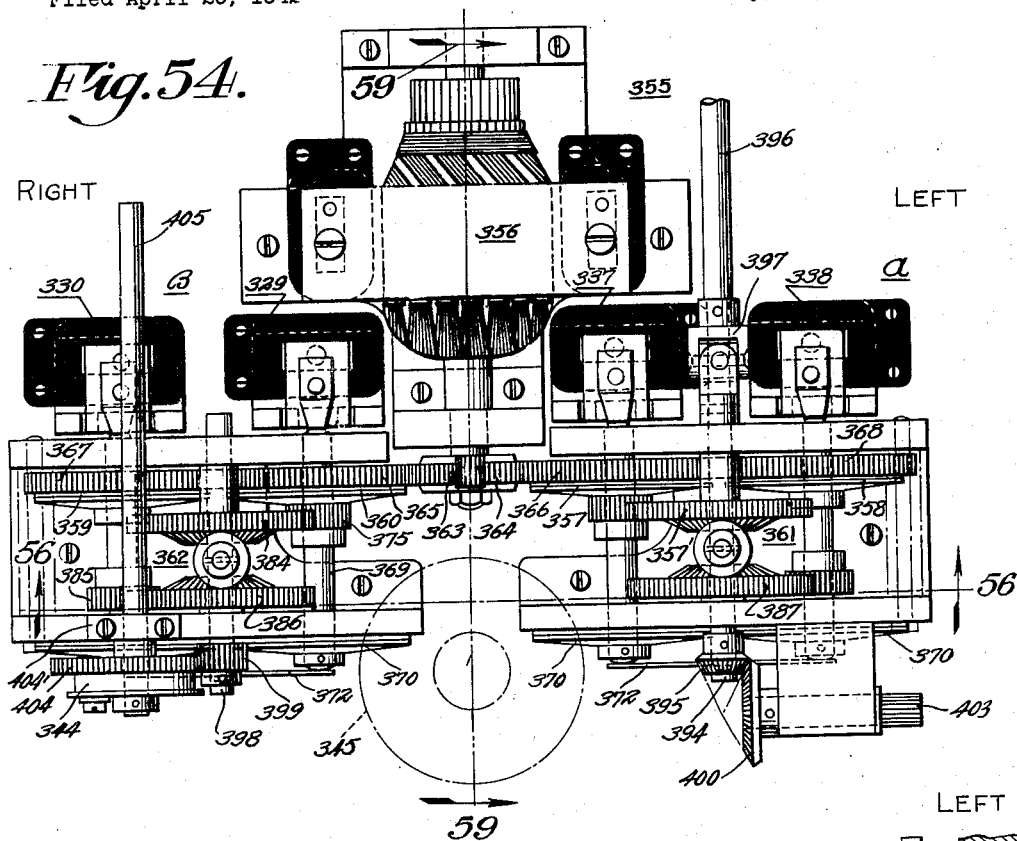
Fig. 54 is a plan view of the $\alpha$ and $\beta$ servo unit.
Figure 55:
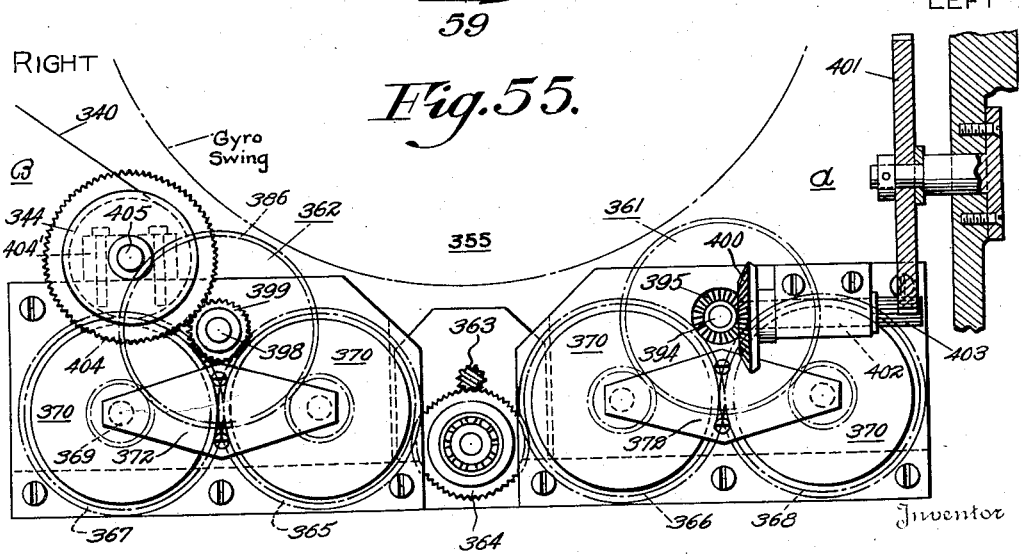
Fig. 55 is a front elevation of the $\alpha$ and $\beta$ servo unit.
Figure 56:
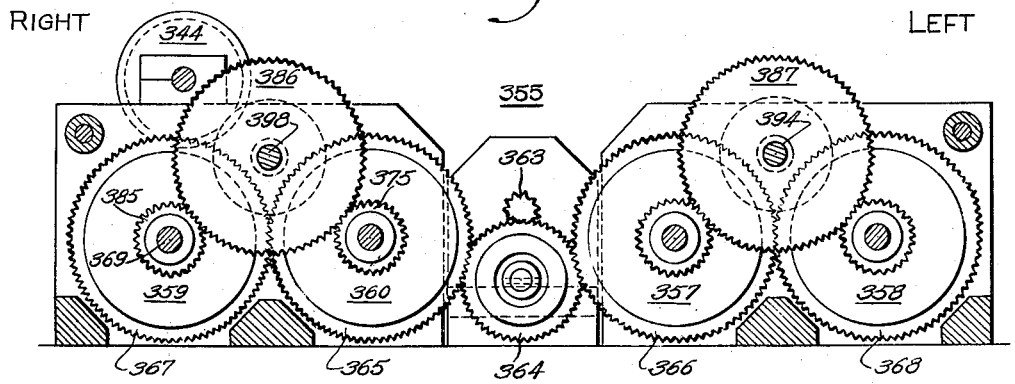
Fig. 56 is a vertical transverse sectional view of the $\alpha$ and $\beta$ servomotor unit, as indicated by line 56—56 of Fig. 54.
Figure 57:
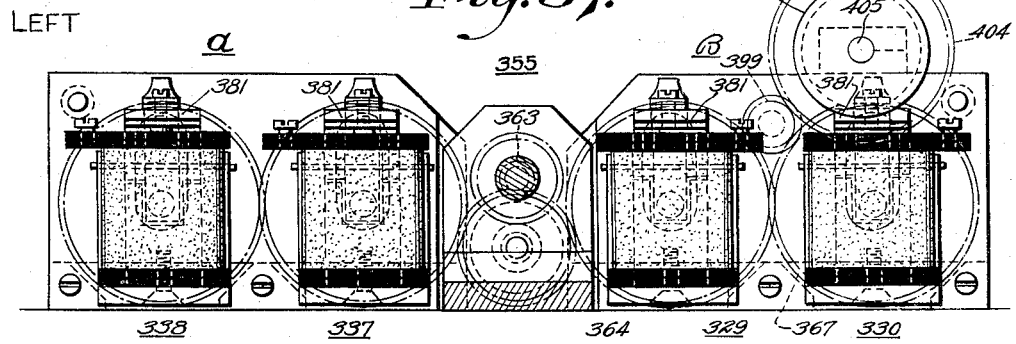
Fig. 57 is a rear elevation of the magnetic clutch units of the $\alpha$ and $\beta$ servomotor unit, with the motor shaft and base plate in cross-section.
Figure 60:
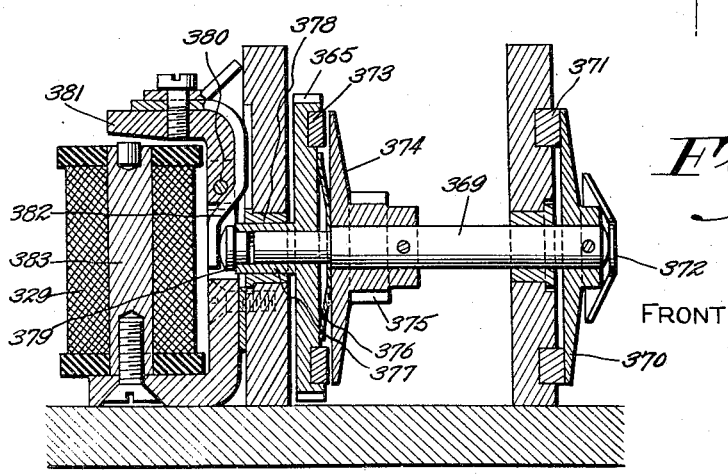
Fig. 60 is a vertical sectional view through one of the magnetic clutch units of the $\alpha$ and $\beta$ servo unit.

A pinion 363 (Figs. 54, 55, 56, 57) secured to and rotatable with the shaft of motor 356 meshes with and drives gear 364, the latter driving gears 365 and 366 (Fig. 54). Gears 365 and 366 drive, respectively, gears 367 and 368. The armature of motor 356 rotates continuously at an approximately constant speed while the bomb sight is in operation, as do gears 365, 366, 367 and 368, these gears being a part of clutch units 360, 357, 359 and 358, respectively. Clutch units 357 and 360 are substantially identical as are clutch units 358 and 359. Fig. 60 shows clutch unit 360 in cross-section.

Referring to Fig. 60, gear 365, driven by gear 364, rotates freely at an approximately constant speed on shaft 369, the latter held against rotation by disc 370. Disc 370 is secured to shaft 369 and is held in frictional engagement with a cork insert 371 fixedly secured in an annular depression in a fixed extension from the sight casing by a flat spring 372. Gear 365 also has a cork insert 373 secured in an annular depression in one face thereof. Disposed opposite cork insert 373 is a clutch disc 374 having an integral pinion 375, the latter secured to shaft 369. A spring disc 376 acts to hold disc 374 out of frictional engagement with cork insert 373. Gear 365 has an integral sleeve 377 which is rotatably supported in a bearing 378, the latter supported in a rigid extension from the sight casing. Shaft 369 terminates before passing through sleeve 377 and a short push rod 379 having an integral dome-topped flange is disposed in the rear end of sleeve 377. Pivoted on a fixed pin 380 is one end of a pole piece 381 having a lever 382 bolted thereto, one end of lever 382 bearing against the dome-topped surface of push rod 379. The other or free end of pole piece 382 is disposed adjacent the iron core 383 of β solenoid 329, core 383 and solenoid 329 being bolted to a fixed extension from the sight casing.

Figure 58:
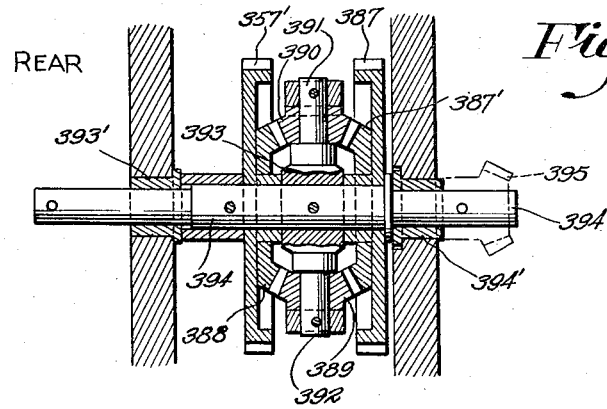
Fig. 58 is a cross-sectional view through one of the differentials of the $\alpha$ and $\beta$ servomotor unit.

The α and β clutch units operate in a similar manner to the turn and tilt clutch units described above. When solenoid 329 (Fig. 60) is energized, it attracts the end of pole piece 382 adjacent thereto, lever 382 forcing sleeve 377 and gear 365 to the front, or to the right, as seen in Fig. 60, until the cork insert 373 frictionally engages clutch disc 374. Meanwhile, shaft 369 and with it disc 370, have been moved sufficiently to the right to break the frictional engagement between disc 370 and cork insert 371. Due to the frictional engagement between gear 365 and disc 374, through cork insert 373, disc 374, pinion 375 and shaft 369 are rotated, gear 375 meshing with and driving the rear gear 384 (Fig. 54) of β differential 362. This rotation of gear 375 and the rear gear 384 of β differential 362 continues as long as solenoid 329 is energized.

α clutch unit 357 is identical in construction and operation with β clutch unit 360, and drives the rear gear 357' of α differential 361 when α solenoid 338 is energized. β clutch unit 359 is identical with β clutch unit 360 except that gear 385, which corresponds to gear 375, drives the front gear 386 of β differential 362 when solenoid 330 is energized. α clutch unit 358 is identical with β clutch unit 359 and drives the front gear 387 of α differential 361 when α solenoid 337 is energized.

α and β differentials 361 and 362 are similar in both construction and operation to the turn and tilt differentials previously described. Fig. 58, which is a cross-sectional view of the α differential 361, shows the front gear 387 and the rear gear 357' of this differential having, respectively, bevel gears 387' and 388 secured thereto. Planetary gears 389, 390 are rotatably mounted on stub shafts 391, 392 integral with sleeve 393, the latter secured to and rotatable with through shaft 394. Shaft 394 is rotatable in fixed bearings 393', 394', has a bevel pinion 395 secured to its front end, and is connected to and drives shaft 396 through universal joint 397 (Fig. 54). Shaft 394 rotates in one direction when front gear 357' is rotated with rear gear 357' held stationary, and in the reverse direction when rear gear 357' is rotated with front gear 357' held stationary.

β differential 362 is like differential 361 in both construction and operation, except that its shaft 398 has a pinion 399 secured to its front end, the rear end of shaft 398 terminating after passing through its rear bearing.

Figure 2:
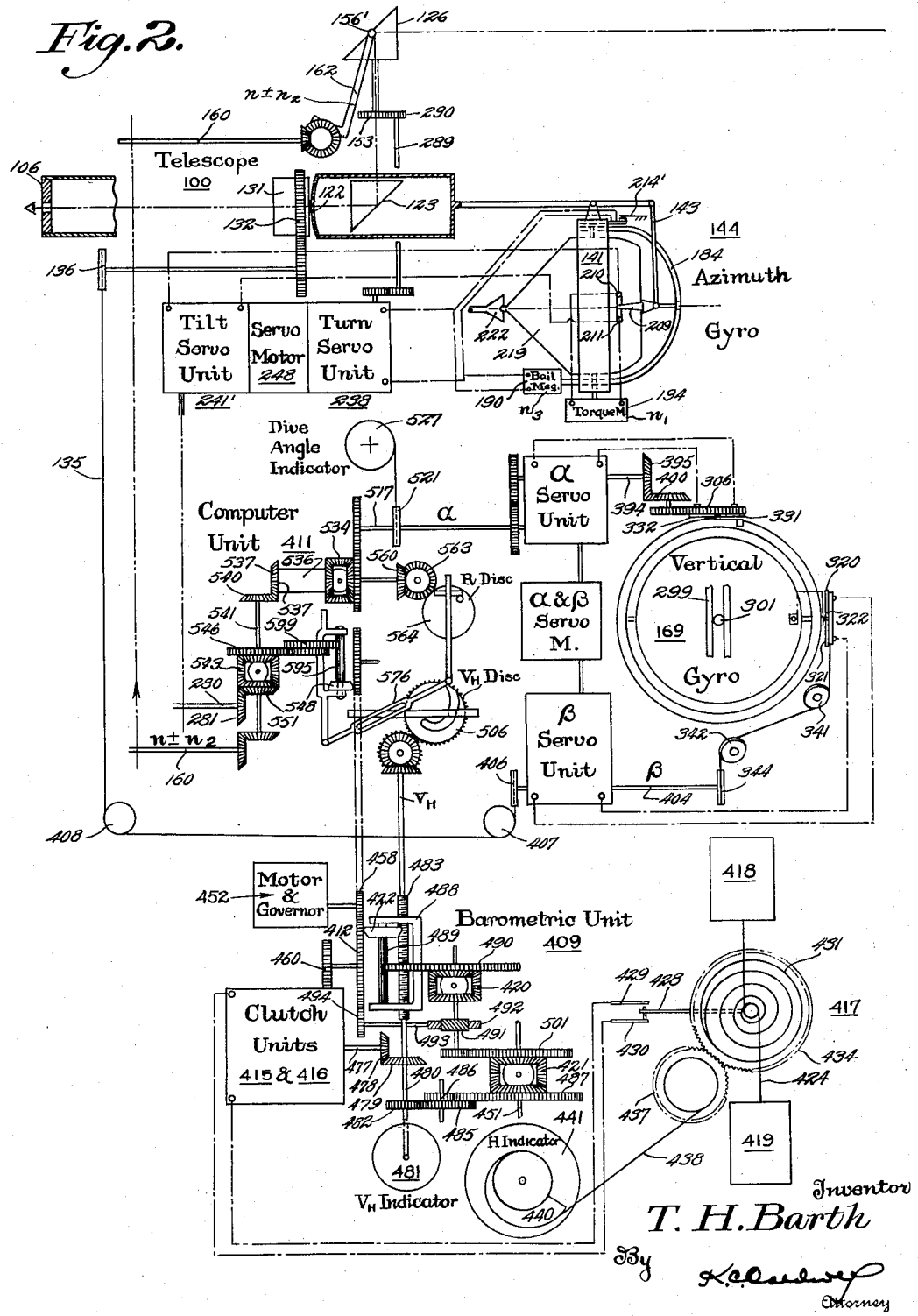
Fig. 2 is a schematic showing the general mechanical arrangement of my entire bomb sight.
Figure 59:
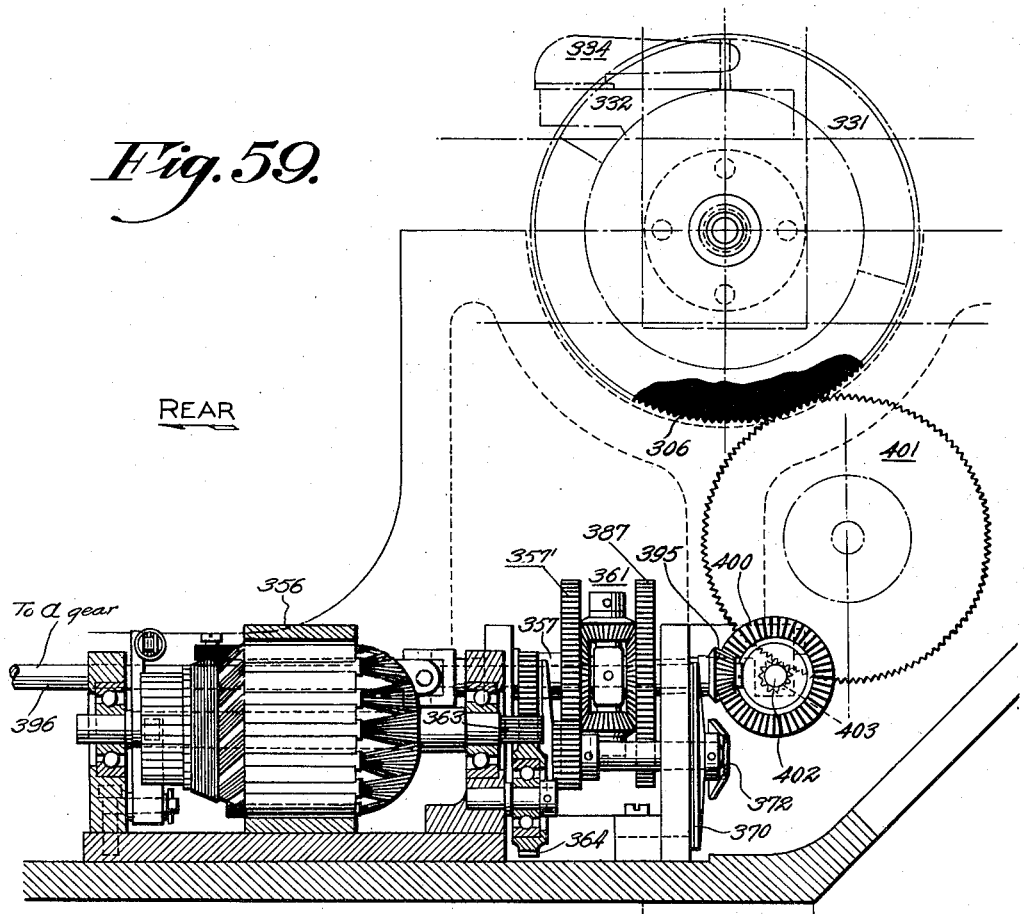
Fig. 59 is a vertical longitudinal sectional view of the $\alpha$ and $\beta$ servo unit as indicated by line 59—59 of Fig. 54.

Bevel pinion 395 meshes with and drives bevel gear 400 (Figs. 2, 7, 55), the latter driving gear 401, through shaft 402 and pinion 403. Gear 401 meshes with and drives gear 306 of the vertical gyro 169 (Figs. 2, 59, 65).

Drum 344 (Figs. 54, 55, 65) to which one end of aforementioned cable 340 is secured, is secured to gear 404, the latter meshing with and being driven by pinion 399. Gear 404 is secured to a shaft 405, the latter having a drum 406 secured at its rear end. Shaft 405 is rotatable in bearings 403' (Figs. 54 and 61) and 404' (Fig. 54). To drum 406 is secured the other end of aforementioned cable 135, the latter threading guide pulleys 407, 407' and 408 enroute (Figs. 2, 12, 20, 61). Aforementioned spring 134 acts to keep cable 135 taut. It is apparent from Fig. 2 that the movement of drum 406, controlled by the vertical gyro 169 through the β servo unit, controls the angular position of tube 131 and hence of the incomplete cross-lines.

The barometric unit 409 of my invention will next be described in connection with Figs. 2, 2A, 25, 48 to 53, inclusive. This unit itself contains several novel features and has separate application in connection with altitude indicators, rate of climb or dive indicators, as well as in connection with my present bomb sight, in which it is an essential element. The barometric unit solves for the variable $V_H$ (Fig. 1) which it mechanically supplies as one input to the computer unit 411 in the manner described below. The barometric unit 409 may also be utilized to indicate the momentary altitude, as well as the rate of climb or dive.

The barometric unit 409 is mounted in its own case 410 (Figs. 5, 25) directly below the computer unit 411, in such manner that its constant speed disc-gear 412 meshes with and drives the disc 413 (Fig. 25) of the computer unit, disc 413 projecting downward into the case 410 of the barometric unit. The barometric unit 409 includes (Fig. 53) a governor-controlled electric motor 414, a pair of solenoid-actuated clutch units 415 and 416, a barometric element 417 including two sets 418, 419 of diaphragms, a computing mechanism including two differentials 420 and 421, disc-gear 412, and a roller 422, an output or $V_H$ shaft 480, together with suitable gearing, shafting, etc., and indicators.

The barometric element 417 (Figs. 25, 49, 51) is enclosed in its own case 423. Each set 418, 419 of six aneroid diaphragms is rigidly and adjustably supported by case 423, the free end of each set 418, 419 being connected to opposite ends of metallic belt 424, the latter passing through an S-shaped slot in a shaft 425. Shaft 425 is supported on ball bearings 426, 427. A lever 428' (Figs. 51, 52A) is rigidly secured to shaft 425 and has one free end slotted. A stop 429', secured to casing 423, projects into the slotted portion of lever 428' and limits the movement of lever 428' and likewise the rotation of shaft 425. The other end of lever 428' has a triangular-shaped plate 430' secured thereto, plate 430' having a perpendicularly projecting pin 431' which engages a slot in an oscillating plate 432'. Plate 432' is pivoted on an extension 433' secured to casing 423. Contact lever 428 is secured to plate 432' and oscillates with it, the free end of contact lever 428 oscillating between spring contacts 429 and 430. The slot in lever 428' is of such width as to limit the angular movement of contact lever 428 to ¼° in either direction from its mid-position. Also secured to shaft 425 are the inner ends of two identical but opposing coil springs 431, 432 (Figs. 51, 53), the outer ends of springs 431, 432 being secured to spring casing 433 at points 180 degrees apart, such that springs 431, 432 impose equal but opposing turning moments on shaft 425. Spring casing 433 is secured to spring gear 434, which meshes with pinion 435, secured to and rotatable with shaft 436. Cable drum 437, which has one end of cable 438 secured thereto (Figs. 2, 50 and 53), is also secured to shaft 436. Since the two sets 418, 419 of diaphragms are of equal weight and size and are adjusted for equal pull on shaft 425, this shaft carries no bearing loads, except loads due to the acceleration of the mass of the shaft 425, lever 428, and one-half of the mass of the diaphragms and springs 431, 432, one-half of the mass of the latter being less than one-tenth of a pound.

The working length of the diaphragms is constant for all air pressures, barring slight elastic deformations. Actually, these diaphragms work within 0.001 inch.

Shaft 425 extends beyond bearing 427 (Figs. 25, 51) and a bi-metallic spring capable of exerting a small corrective movement for temperature correction could be secured to this extension. However, such is not employed in my present bomb sight since the barometric unit is used to supply only $V_H$, and errors in altitude H do not affect $V_H$ seriously.

The outermost diaphragm of set 419 is secured to a rod 445 (Fig. 49) in any well known manner such as by providing an annular groove in rod 445 and a cooperating annular internal shoulder in a hole in the end of the diaphragm to fit into the annular groove in the rod. Rod 445 to which adjusting gear 446 is secured is threaded into casing 443 and a spring finger may be secured to the casing for preventing distortion of the diaphragm by the torque exerted in rotating the screw by having the finger engage a vertical slot in a hub on the end of the diaphragm. A stop 448 secured to casing 423 by screw 449 prevents rotation of gear 446 after adjustment. Rotation of gear 446 varies the longitudinal position of rod 445 and hence varies the tension of the diaphragms of set 419 on shaft 425. The tension of set 418 of diaphragms is adjustable in a similar manner by a mechanism including shaft 443, pinion 444, threaded rod 444' and adjusting gear 450.

Figure 48:
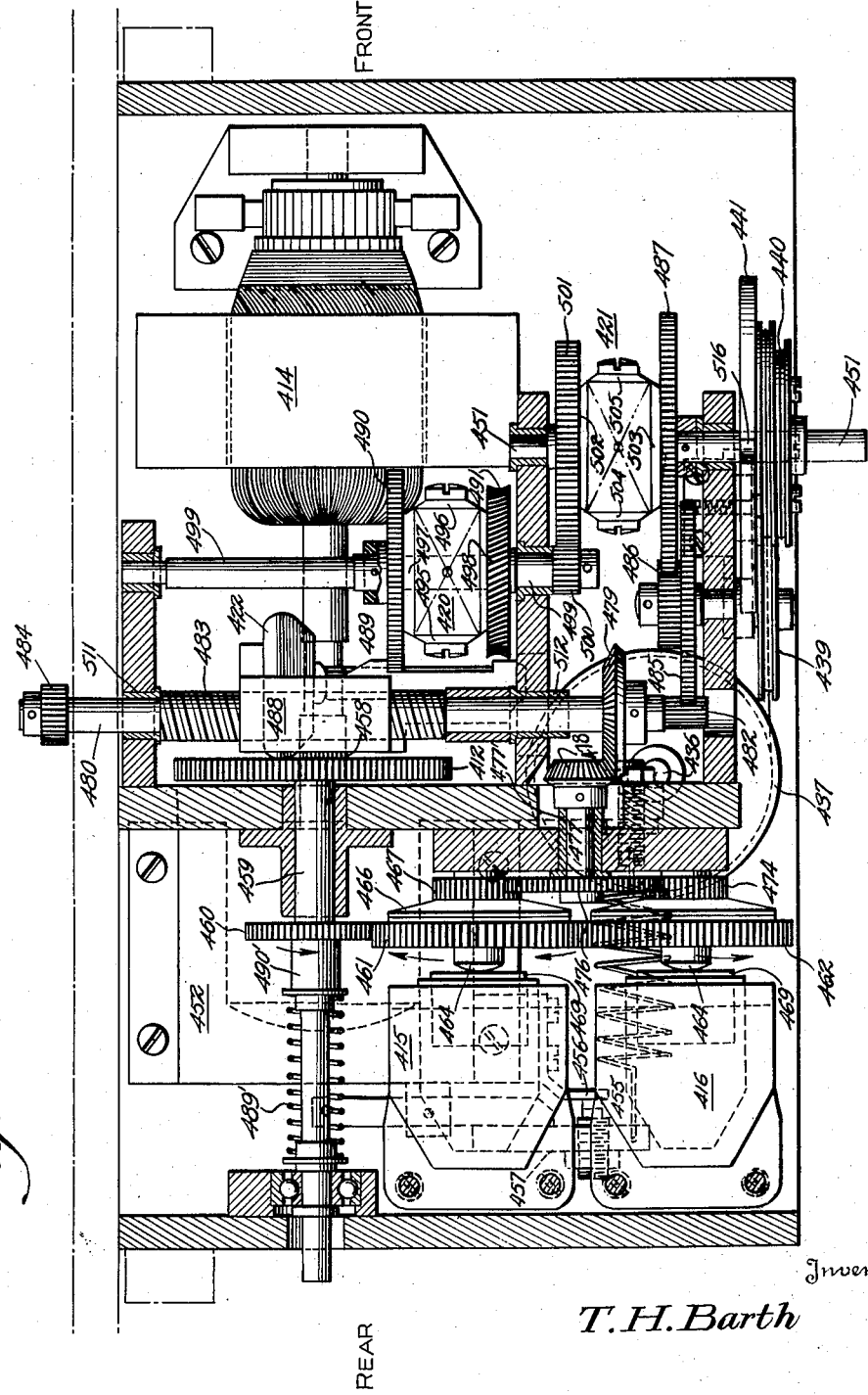
Fig. 48 is a right side elevation, with parts in section, of the barometric unit.
Figure 49:
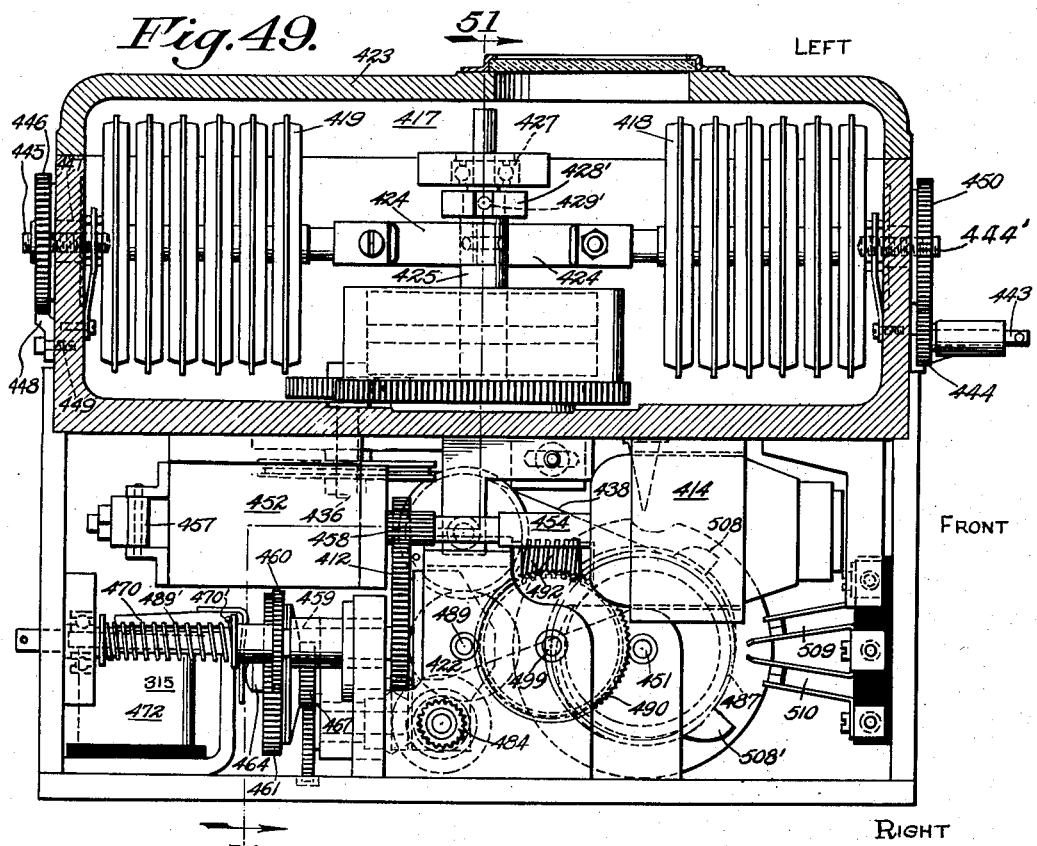
Fig. 49 is a top plan view of the barometric unit.
Figure 50:
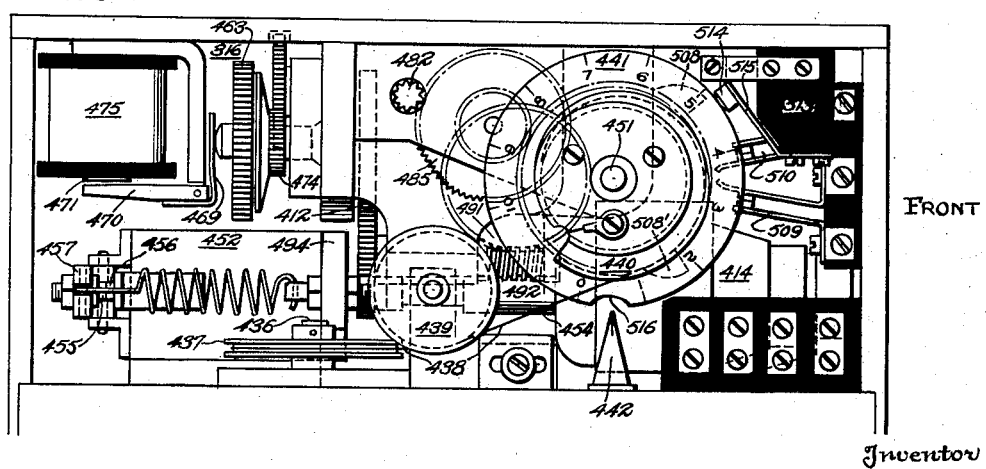
Fig. 50 is a partial bottom plan view of the barometric unit, with certain parts removed.

Cable 438 (Fig. 50) threads pulley 439 and its other end is secured to cam 440, after passing around the cam surface. Cam 440 is secured to altitude scale 441, the calibrations on the latter being truly linear due to the use of cam 440. A fixed pointer 442 (Figs. 50, 53) secured to case 423 indicates the momentary altitude on scale 441. The altitude scale 441 may be set to zero before taking off by means of the aforementioned mechanism actuated by shaft 443 and gear 446. Altitude scale 441 is secured to and rotatable with H shaft 451 (Figs. 48, 50).

Series wound motor 414 (Figs. 2A, 48, 49, 53) furnishes the motive power for the barometric unit. The speed of this motor is maintained substantially constant by governor 452 (Figs. 2A, 53), of a conventional type. In governor 452, weights 453, supported by arms 452', the latter rotatable with shaft 454 of motor 414, move outward by centrifugal force when the motor shaft overspeeds and open the electrical circuit to the motor through the mechanism shown, including contacts 455, 456 and arm 457. When the motor slows down, the electrical circuit is completed through contacts 455 and 456. Contacts 455, 456 are in the circuit connecting the positive line to motor 414.

A pinion 458 (Figs. 49, 53) secured to motor shaft 454 drives constant speed-disc gear 412, secured to and rotatable with shaft 459 (Figs. 48, 53) to which gear 460 is secured. Gear 460 drives upper clutch gear 461, the latter meshing with and driving lower clutch gear 462. Motor 414 is started when main switch 247 (Fig. 2A) is closed, and disc-gear 412 and clutch gears 461, 462 rotate continuously while the sight is in operation.

Clutch gear 461, which forms a part of clutch unit 415, rotates on fixed shaft 463 (Fig. 52) and has an integral sleeve in which a dome-ended push rod 464 fits. A cork insert 465 is embedded in an annular depression in one face of clutch gear 461. Also rotatable on shaft 463 is a clutch disc 466 having an integral cylindrical extension to which pinion 467 is secured. One face of disc 466 is disposed opposite cork insert 465, a disc spring 468 normally holding disc 466 sufficiently separated from cork insert 465 so that there is no frictional engagement between the two. One end of a lever 469, the other end of which is secured to pole piece 470, touches the dome-shaped end of push rod 464. One end of pole piece 470 is pivoted on fixed pin 470', the other end of pole piece 470 being disposed adjacent the core 471 of clutch solenoid 472. A fixed stop 473 limits the movement of pole piece 470 away from core 471. When solenoid 472 is energized, its core 471 attracts pole piece 470, and such, acting through lever 469 and push rod 464, forcing clutch gear 461 sufficiently to the right, as seen in Fig. 52, until clutch gear 461 frictionally engages clutch disc 466. This causes disc 466 and pinion 467 to rotate on shaft 463. Clutch unit 416 is similarly constructed and its pinion 474 (Fig. 48) is caused to rotate when solenoid 475 is energized.

Both pinions 467 and 474 mesh with gear 476, the latter driving bevel pinion 478 (Figs. 48 and 53) through shaft 477, the latter being rotatable in bearing 477'. Bevel pinion 478 is caused to rotate in one direction when clutch unit 415 is engaged, and in the opposite direction when clutch unit 416 is engaged. Clutch units 415, 416 are never engaged simultaneously, and when one clutch unit is engaged, the clutch disc and attached pinion of the non-engaged clutch are rotated idly by gear 476.

Bevel pinion 478 meshes with and drives bevel gear 479 (Figs. 48, 53) the latter secured to $V_H$ shaft 480. Also secured to the $V_H$ shaft and rotatable with it are indicator disc 481, shaft 483, and pinion 484. The lower end of shaft 480 has gear teeth cut thereon forming integral gear 482 which meshes with gear 485, the latter, through pinion 486 secured thereto, driving the lower gear 487 of differential 421. Indicator 481 is calibrated in vertical velocity ($V_H$), climb or dive, in feet per sec., the instantaneous $V_H$ appearing opposite a suitable fixed indicator (not shown). Worm gear 483 engages internally cut threads on carriage 488, the latter sliding longitudinally back and forth as worm gear 483 rotates. Carriage 488 supports, in suitable bearings, roller 422, the latter being in firm but movable contact with one face of disc gear 412. Secured to the same shaft as roller 422 and rotatable with it is an elongated gear 489 which meshes with and drives the upper gear 490 of differential 420.

A spring 489' (Fig. 48), in compression, acting through sleeve 490', gear 460 and shaft 459, holds disc 412 in firm but movable contact with roller 422.

The lower gear 491 of differential 420 has helically cut teeth thereon, and meshes with worm 492, the latter driven at a constant speed by shaft 493. Pinion 494 is secured to and drives shaft 493 from constant speed disc-gear 412. The planetary gears 495, 496 of differential 420 mesh with bevel gears 497, 498 the latter driven, respectively, by gears 490 and 491. Shaft 499 is secured to and driven by the mounting of planetary gears 495, 496 and its rotation represents the output of differential 420.

Pinion 500, secured to and rotatable with shaft 499, drives the upper gear 501 of differential 421. Gears 501 and 487 have, respectively, bevel gears 502 and 503 secured thereto. Planetary gears 504, 505, whose mounting is secured to and drives shaft 451, mesh with bevel gears 502 and 503, the rotation of H shaft 451 representing the output of differential 421. Pinion 484 meshes with and drives $V_H$ disc gear 506 (Figs. 5, 7, 39) of the computer unit 411.

A switch 513 (Fig. 50) is provided, which, when closed, completes the electrical circuit (not shown) to an electric bulb (not shown). Switch 513 is normally open and is closed when sliding contact 514, held in contact with the rim of H disc 441 by a spring arm 515, enters a cam depression 516 in the rim of the H disc. This occurs at an altitude of 8000 ft. and enables the pilot, when he sees the light flash, to observe the altitude indicated on the altimeter of the airplane. If an altitude of 8000 ft. is indicated, it is a check that the barometric unit is operating properly.

A pair of limit switches 509, 510 (Figs. 2A, 49, 50), insulatedly mounted on the case of barometric unit 409 are disposed so as to be engaged and opened by dogs 508, 508' before carriage 483 (Fig. 48) jams against either $V_H$ shaft bearing 511 or 512. Dogs 508, 508' are secured to and rotatable with gear 487, the angular movement of which is determined by the rotation of the $V_H$ shaft 480, which latter rotation also determines the position of carriage 488. Limit switch 509 (Fig. 2A) is in the electrical circuit connecting solenoid 472 to the positive line, the other terminal of solenoid 472 being connected to contact 430. Similarly, solenoid 475 is connected to the positive line through limit switch 510, the other terminal of solenoid 475 being connected to contact 429. Lever 428 is connected to ground, as shown. When lever 428 touches contact 430, the circuit to solenoid 472 is closed, such engaging clutch unit 415 in the manner previously described. Solenoid 475 is similarly energized and clutch unit 416 engaged whenever lever 428 touches contact 429.

The altitude disc 441 and cam 440 shown are designed for use up to 10,000 ft., but this limit may easily be extended up to 30,000 ft. or greater.

The operation of the barometric unit 409 will next be explained in connection with Fig. 53. This figure shows the approximate position of roller 422, carriage 488, $V_H$ scale 481, H scale 441 and cam 440 when the airplane is on the ground, i. e., with the altitude H and the vertical velocity $V_H$ equal to zero.

*General theory.*—The basic principle of the barometric unit lies in the balancing of the pull of evacuated bellows against the pull or torque of a spring or springs. If the forces are unbalanced, the element pulling the harder causes the other to give way a very small amount. This motion actuates electrical contacts which control a servo unit. This in turn applies a correction so that the spring is elongated or shortened sufficiently to balance the forces between bellows and spring. Variations in atmospheric pressure vary the pull of the bellows since they measure the pressure difference between inside and out. This in turn causes various servo and integrating motions which try to balance the forces by extension or shortening of the spring.

Since the wind up or elongation of the spring is proportional to the barometric pressure, this motion of the powered end of the spring may be obtained through a cam such that the cam's position reads pressure altitude and the displacement of the spring which is actuated by the cam follower is proportional to the corresponding pressure as given in the standard pressure-altitude tables. Under these circumstances the position of the cam can be considered to be the altitude providing the forces between bellows and spring are balanced. Since the servo always tries to balance the forces, the position of the cam indicates pressure altitude. Obviously the speed with which the cam turns is the rate of change of altitude or the vertical velocity, referred to in this discussion by $V_H$.

There has been so far outlined a scheme whereby the position of a cam indicates the pressure altitude. Just how is power to be applied to the cam so that the forces between bellows and spring will be balanced? A simple servo would do the trick, but the rate of change of altitude must be known as well. Suppose the cam is geared to a roller rolling on a constant speed disk, then the speed of rotation of the cam will be proportional to the displacement of the roller from the center of the disk. If the position of the roller on the disk is controlled by the servo, it would seem that the cam would always be positioned so as to balance the forces between bellows and spring through action of the servo and the roller and disk arrangement. Actually this system as it stands is unstable. The roller would be moved from the center of the disk by servo action until by its rolling action on the disk it had rotated the cam sufficiently to balance the forces. At this point, however, the roller is far displaced from the correct steady state condition and the cam would continue to rotate, thus causing servo action in the reverse direction. The whole cycle would then repeat in the opposite direction with increasing amplitude.

This hunting is controlled by causing the servo to move not only the roller but also the cam. Now, the cam can be moved through a differential means either by the rotation of the roller or by action of the servo. This additional cam rotation tends to balance the forces and thus stop servo action before the roller has been displaced too far. The use of this additional means for rotating the cam is analagous to the introduction of viscous damping in an oscillating system.

One other engineering feature is incorporated which needs very little explanation. It is the movement of the roller from the center of the disk to a new artificial zero. This is accomplished by subtracting from the roller speed the speed of the roller at the artificial zero. Referring to Fig. 53, this is done by differential 420. The rotation of shaft 499 is directly proportional to the displacement of roller 422 from the artificial zero position. The location of the artificial zero is determined by the ratios of the various gears used.

*Detailed analysis.*—(Refer to Fig. 53) Assume to start with that the instrument is at rest at zero (0) pressure altitude. Assume also that the instrument is running, and that all parts are in equilibrium.

The aircraft takes off and accelerates upward until it reaches a constant rate of climb. It climbs at this steady rate for many minutes and then decelerates upward until it is in level flight.

As the aircraft accelerates upward, the barometric pressure drops slightly causing the evacuated bellows 418 and 419 to pull less hard. This force is transmited to shaft 425 through straps 424. Springs 431 and 432 which originally just counteracted the torque produced by the bellows now overcome the bellows pull and rotates shaft 425 clockwise, causing electrical contact between 428 and 429. Energizing contact 429 electrically causes servo 416 to operate which drives gear 474. Gear 474 drives through gears 476, 478, 479 to reposition roller 422 slightly downward through lead screw 483. At the same time dial 481 which indicates vertical velocity is turned so as to indicate a climb. Gear 479 secured to shaft 480 drives through gears 482, 485, 486 and 487 into differential 421, and hence to cam 440 and altitude indicator 441. Cam 440 rotates clockwise unwinding cable 438. Springs 431 and 432 which were tightly wound up to counteract the torque from bellows 418 and 419 now may unwind through motion of gear 435 until pulley 437 has again tightened cable 438. This series of actions continues until the torque of springs 431 and 432 equals the torque of bellows 418 and 419. At this point the electrical circuit through 428 and 429 is interrupted stopping action of servo 416. (No specific mention is being made of the constant speed power supplied by motor 414 to the servos 415 and 416 and to the constant speed disk 412 and to the artificial zero displacing means, differential 420. The gearing is obvious, and the theory of the latter two components was discussed in the section entitled, "General Theory.")

This action, which will be called a "step," balances the forces momentarily and displaces the roller a slight amount downward. Originally, when all elements were balanced, the rotation of roller 422, combining with the rotation of shaft 493 and gears 491 and 492 in differential 420, resulted in output shaft 499 remaining stationary. However through the first step roller 422 was displaced on the disk, hence its speed was changed. This results in a rotation of shaft 499 since the two sides of differential 420 are no longer matched in speed. This rotation of shaft 499 is fed through differential 421 and drives cam 440 in the same direction as the servo action in the first step did, namely clockwise.

The rotation of the cam at a rate due to the displacement of roller 422 will be in such a direction as to try to keep up with changing barometric pressure. However, since the aircraft is accelerating upward, the cam rotation will not be fast enough to keep up for long, if at all, and another step takes place.

The result of successive steps is to displace roller 422 continually downward and increase the rate of rotation of cam 440. When the aircraft attains a steady rate of ascent, the steps become smaller and smaller until they cease to exist. At this point cam 440 is rotating at such a speed that the forces between bellows and springs are at all times balanced. This rotation of cam 440 comes from the displacement of roller 422 only. Hence dial 441 indicates the instantaneous pressure altitude correctly and dial 481 indicates the true rate of ascent.

In practice the barometric unit 409 will always be taking steps first in one direction and then in the other. These steps are very small and the resulting average readings are quite accurate. However, if there is acceleration upward or downward, both the H and $V_H$ scales will give incorrect readings. The error will be roughly proportional to the acceleration.

When the aircraft decelerates upward to achieve level flight, steps are taken in reverse. That is, springs 431 and 432 are unwound too fast through the action of cam 440 so that bellows 418 and 419 exert a greater torque than the springs. This causes electrical contact between 428 and 430 which in turn operates servo unit 472 which reverses all motions which were originally caused by servo 475 alone. Roller 422 is raised by the servo action, hence cam 440 rotates less rapidly. By a succession of such steps roller 422 is ultimately brought back to its artificial zero position and cam 440 is still. The barometric unit is then indicating the true pressure altitude under level flight.

It should be pointed out that level flight is no different to this device than a steady climb or dive.

It should first be noted that roller 422 is not at the center of disc 412 for the zero $V_H$ condition, but is a short distance above the center. Roller 422 is so disposed because if it were located at the disc center for the zero $V_H$ condition, it would eventually wear a depression at the center of disc 412 since the sight operates most of the time with a $V_H$ equal to or nearly equal to zero. Differential 420 could, of course, be entirely dispensed with in an installation where the above-mentioned disadvantage could be tolerated, in which case elongated gear 489 would drive gear 501 of differential 421 directly.

Being located away from the center of disc 412, roller 422 (the rotation of which represents $V_H$) will be caused to rotate for the zero $V_H$ condition, driving gear 490 through gear 489. To exactly compensate for this rotation of roller 422 when it is at the zero $V_H$ position, differential 420 is employed, the lower bevel gear 498 of this differential being driven at a constant speed from disc 412 through the mechanism shown and described above. The gear ratios and the directions of rotation are such that when roller 422 is at its zero $V_H$ position, the planetary gears of differential rotate but their mounting remains stationary, producing no rotation of shaft 499. Any displacement of roller 422 from its zero $V_H$ position will, however, produce rotation of shaft 499.

The barometric element 417 is actuated by the well known change of atmospheric pressure with change of altitude above the earth's surface. When the airplane is on the ground the atmospheric pressure acting to compress the diaphragms is greatest. However, these diaphragms are held against compression by belt 424 secured in the S-shaped slot in shaft 425, the tension in belt 424 acting to cause shaft 425 to rotate counter-clockwise, as seen in Fig. 53. However, shaft 425 is held against counter-clockwise rotation by springs 431, 432 secured to shaft 425 and also to gear 434. Gear 434 has been rotated, for the ground condition, sufficiently clockwise for springs 431, 432 to exert on shaft 425 a moment exactly equal and opposite to that exerted by belt 424. This rotation of gear 434 is accomplished by means of gear 435, drum 437, cable 438 and cam 440, the latter rotated by altitude or H shaft 451, in the manner described below. Thus, with the airplane on the ground there is no rotation of shaft 425, the torques acting thereon being equal and opposite, and lever 428 remains in a neutral position between contacts 429 and 430.

This same condition also exists when the plane is in the air when the vertical velocity $V_H$ is momentarily zero or constant at any value. Assuming the airplane is diving at a momentarily constant $V_H$, the atmospheric pressure increases as the altitude decreases and hence the tension on belt 424 increases as the airplane dives, tending to rotate shaft 425 counter-clockwise. However, during this same period, the H shaft 451, and with it H scale 441 and cam 440, are being rotated counter-clockwise, as will be explained below. This counter-clockwise rotation of cam 440 causes clockwise rotation of gear 434, and such, acting through springs 431, 432, produces a torque tending to rotate shaft 425 clockwise. Cam 440 is so designed that this latter torque is exactly equal and opposite to the increasing torque due to the increased atmospheric pressure on the diaphragms, and thus shaft 425 is not rotated and lever 428 remains in its neutral position.

However, where there is a change in $V_H$ from a momentarily constant $V_H$, lever 428 is displaced from its neutral position and the electrical circuit between it and one of contacts 429, 430 is then closed. This change of $V_H$ causes a change in the rate of atmospheric pressure change on the diaphragms, producing an abrupt instead of a gradual change in the torque exerted by belt 424 on shaft 425. Since the momentary opposing torque exerted by springs 431, 432 on shaft 425 continues to change gradually based on an unchanged momentarily constant $V_H$, there occurs a torque unbalance on shaft 425, and the latter is rotated slightly. The direction of rotation of shaft 425 depends upon whether $V_H$ is increased or decreased, and whether the airplane is climbing or diving.

If the airplane were diving at a momentarily constant $V_H$, and the pilot increased the angle of dive, such would result in an increase of $V_H$ diving, the rate of pressure change on the diaphragms would increase, the tension in belt 424 would increase abruptly, shaft 425 would be rotated slightly counter-clockwise (Fig. 53) and lever 428 would make electrical contact with contact 430.

However, if the airplane were diving and the pilot decreased the angle of dive (corresponding to a decrease in $V_H$), the rate of pressure change on the diaphragms would decrease, the tension in belt 424 would decrease abruptly, (the opposing torque exerted by springs 431, 432 based upon a continuing constant $V_H$ remaining momentarily the same), shaft 425 and lever 428 would be rotated slightly clockwise and lever 428 would bear against and complete the electrical circuit with contact 429.

Assuming, for example, a third condition, i. e., from horizontal flight ($V_H$=O) the pilot-operator places the plane in a dive, the effect of such change in flight path, traced through the entire mechanism of the barometric unit, is as follows: For horizontal flight, the atmospheric pressure on the diaphragms remains the same, the altitude H remains constant, shaft 451 does not rotate and lever 428 remains in its neutral position. When the airplane is placed in a dive, the abrupt increase of pressure due to decreasing altitude on the diaphragms increases the tension in belt 424 and the momentary increase in counter-clockwise torque on shaft 425 causes shaft 425 and lever 428 to rotate counter-clockwise, lever 428 making electric contact with contact 430. This closes the circuit to and energizes the solenoid 472, which engages clutch unit 415, causing gear 476 to rotate in the direction shown in Fig. 53. Gear 476 drives $V_H$ shaft 480 through the mechanism shown, shaft 480 and worm 483 rotating in the direction shown. This rotation of worm 483 causes carriage 488 to move downward and roller 422 to move toward or beyond the center of disc-gear 412, depending upon the change of $V_H$ and hence the amount of rotation of $V_H$ shaft 480. This movement of roller 422 causes it to rotate at a decreased rate in the same direction as it approaches the center of disc 412, and to rotate at a gradually increasing rate in the opposite direction if it be moved beyond the center of disc 412. The lower bevel gear 498 of differential 420 continuing to rotate at a constant speed in the direction indicated (Fig. 53), this decrease in the rotational speed of roller 422 in the same direction will result in rotation of shaft 499 in the direction indicated. Rotation of roller 422 in the direction opposite to the direction in which it rotates for the zero $V_H$ condition will obviously cause increased rotational speed of shaft 499, also in the direction shown.

Considering, for the moment, gear 487 stationary, it is apparent that gear 501, rotated by shaft 499 and gear 500 in the direction shown, will produce rotation of H shaft 451 in the direction indicated, and consequent counter-clockwise rotation of H indicator 441 and cam 440. This rotation of cam 440, acting through the mechanism shown, will cause springs 431, 432 to exert a clockwise torque on shaft 425, and when cam 440 has been rotated sufficiently for this torque to exceed the opposing torque due to the diaphragms, shaft 425 and lever 428 will rotate clockwise through a small angular movement and the electrical circuit between lever 428 and contact 430 will be broken. The opening of this circuit will de-energize solenoid 472, clutch unit 415 will be disengaged and $V_H$ shaft 480 will not be rotated further.

However, gear 487 is not stationary when $V_H$ shaft 480 is rotated, but rotates in the direction shown for the corresponding indicated direction of rotation of the $V_H$ shaft. The effect of such rotation of gear 487 is also to produce rotation of the H shaft 451 as shown, the result of which is to apply a clockwise torque on shaft 425 as above described. However, such rotation of H shaft 451 resulting from the rotation of gear 487 occurs immediately when the $V_H$ shaft 480 is rotated, and the electrical circuit between lever 428 and contact 430 is opened much more quickly than it would be if gear 487 were stationary. This is necessary to prevent overcontrol, for without direct coupling of the $V_H$ shaft to the H shaft and hence to the springs 431, 432, roller 422 would be moved back and forth on disc gear 412 in wide sweeps and would require considerable time to settle down after a change of $V_H$.

While the displacement of roller 422 does immediately change the speed of the H shaft, which corresponds to $V_H$, the springs 431, 432 are not directly affected by this change of rate but by the accumulating effect thereof, and this requires time. It is by coupling the $V_H$ shaft to the H shaft, through gears or pinions 482, 485, 486, 487 and differential 421, that this overcontrol is eliminated and roller 422 settles down very quickly after a change of $V_H$. The system shown is not a true follow-up system, but a system that, in effect, predicts the effect of a change of rate and neutralizes this effect before it occurs.

It should be emphasized that the working length of the diaphragms of the barometric element 417 remains substantially constant for all altitudes and atmospheric pressures; preferably such working length should not vary by more than 0.001 inch. Belt 424 remains in tension at all times, such tension decreasing, however, with increase of altitude.

It is apparent that the rate of rotation of H shaft 451 is a function of the displacement of roller 422, which displacement is determined by the amount of rotation of $V_H$ shaft 480. This rotation of shaft 480, which represents the vertical velocity $V_H$, is thus a function of the rate of change of altitude as represented by the speed of rotation of the H shaft 451.

The computer unit 411 of my device, which solves for the rate $n$, and which, in its present form, corrects for trail, will next be described in connection with Figs. 5, 6, 7, 25, 39 to 47 inclusive. This unit is located within the sight case (Fig. 5) directly above the barometric unit 409 and below the azimuth gyro 144 and turn and tilt servomechanism 241. It receives, as inputs, $V_H$ from the barometric unit 409, $\alpha$, from the $\alpha$ and $\beta$ servo unit 355, $n_2$ from the tilt servo unit 241' and supplies, as its output, $n \pm n_2$, corrected for trail, to the entrance prism tilting mechanism. The dive angle indicating drum 527 is also actuated by the computer unit.

Referring to Fig 7, shaft 396, rotated by the $\alpha$ and $\beta$ servo unit 355 proportional to the angle of the dive $\alpha$, drives short shaft 517 through universal joint 518. Secured to and rotatable with shaft 517 is a pinion 519, the latter meshing with and driving gear 520 to which pulley 521 is secured. Gear 520 and pulley 521 are rotatable on a fixed stub shaft 522 extending from a mounting bracket 523, the latter fixed to the computer base plate 524. One end of a flexible cable 525 is secured to and wound around pulley 521, its other end being secured to pulley 527 (Figs. 6, 20), integral with dive angle indicating drum 526. Cable 525 threads guide pulley 528 in passing from pulley 521 to pulley 527. Drum 526 and pulley 527 are rotatable on fixed shaft 529, supported by bracket 530. A spring 527' (Fig. 20), contained within drum 526, is secured to both fixed shaft 529 and to drum 526, and acts to rotate drum 526 in the direction indicated by the arrow (Fig. 6), and to keep cable 525 taut. The outer surface of drum 526 is graduated in degrees of angle of dive or climb which graduations are observable through window 109 (Fig. 4) in the rear of the sight casing.

Shaft 517 (Fig. 39) extends through and is rotatable in a bearing in bracket 523, the rear end of shaft 517 having pinion 531 secured thereto, the latter meshing with and driving gear 532 (Figs. 39, 42) to which the front bevel gear 533 of differential 534 is secured. Gears 532 and 533 are journaled on shaft 532' (Fig. 44), the latter rotatable in bearings 538 and 539 supported in mounting brackets secured to the computer unit base plate 524. Both the rear bevel gear 535 of differential 534 and a bevel gear 537 are secured to and rotatable with a sleeve 536, both gears 535 and 537 being journaled on shaft 532'. Bevel gear 537 (Figs. 39, 42, 44) is driven by bevel pinion 540, secured to and rotatable with shaft 541, the latter in turn rotatable with and driven by the planetary gear mounting 542 of differential 543.

Figure 42:
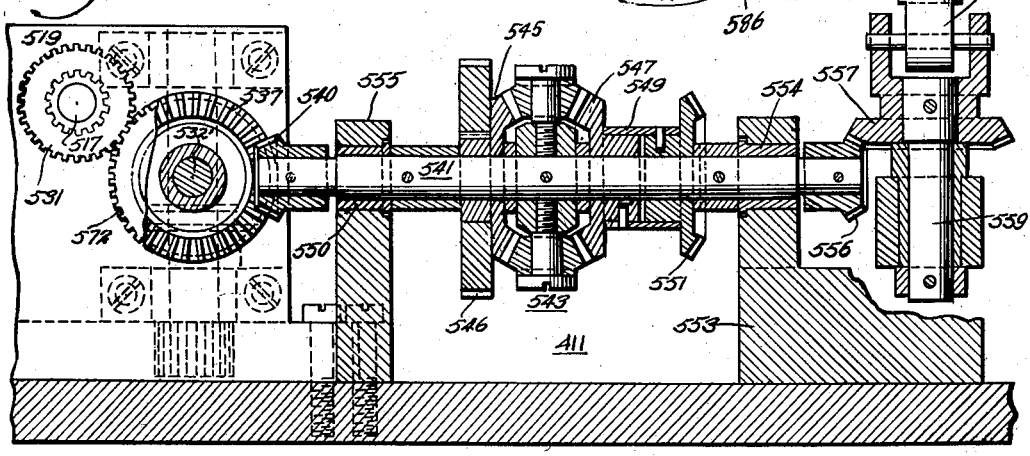
Fig. 42 is a vertical sectional view of the computer unit, as indicated by line 42—42 of Fig. 39.
Figure 43:
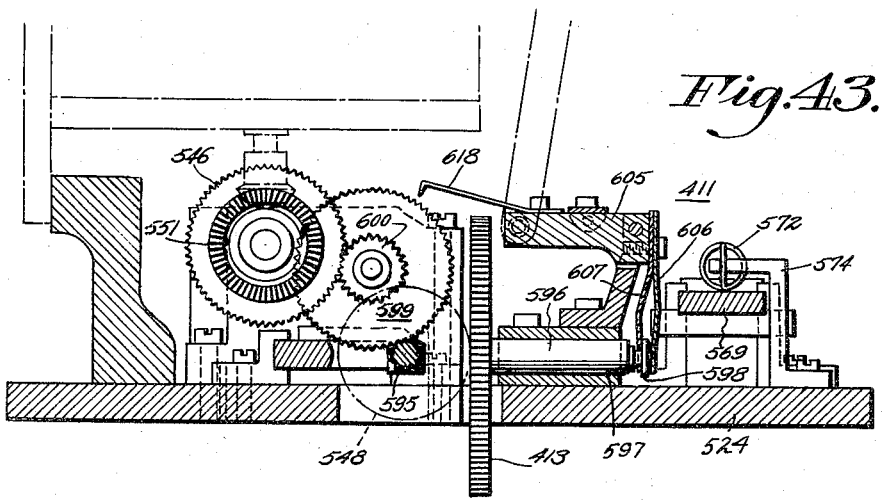
Fig. 43 is a vertical longitudinal sectional view of the computer unit as indicated by line 43—43 of Fig. 39.
Figure 44:
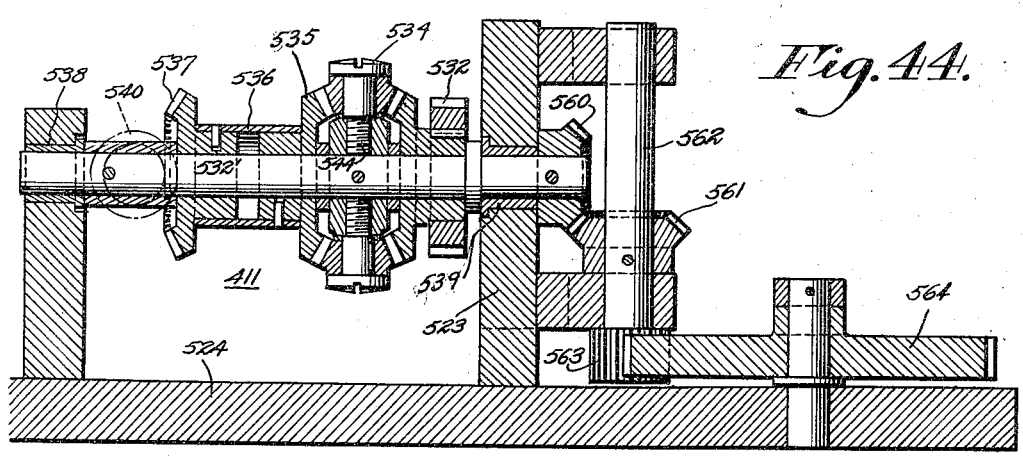
Fig. 44 is a vertical longitudinal sectional view of the computer unit as indicated by line 44—44 of Fig. 39.
Figure 45:
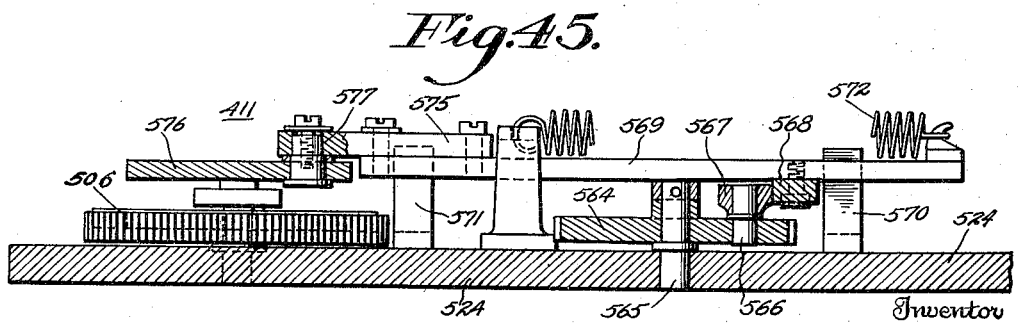
Fig. 45 is a transverse sectional view of the computer unit as indicated by line 45—45 of Fig. 39.

The left bevel gear 545 (Figs. 39 and 42) of differential 543 is secured to and driven by gear 546, the rotation of this latter gear dependent upon the rotation of $n$ roller 548, as described below. The right bevel gear 547 (Figs. 39 and 42) of differential 543 is driven from the tilt servo unit 241' at rate $n_2$ through sleeve 549, bevel gear 551 (Fig. 43), and bevel pinion 281 (Figs. 26, 43). Bevel gears 547 and 551 are both secured to and rotatable with sleeve 549; bevel gear 551 meshes with and is driven by bevel pinion 281 of the tilt servo unit 241' (Figs. 26, 28). Bevel gears 547 and 551 are journaled on a shaft 541 (Fig. 42). Shaft 541 is rotatably supported in bearings 550 and 554, supported in mounting brackets 553 and 555. The right end of shaft 541 has a bevel pinion 556 secured thereto, pinion 556 driving bevel gear 557 which in turn drives shaft 160 (Figs. 6, 20, 42) through semi-universal coupling 558 (Figs. 40, 42) at a rate corresponding to $n \pm n_2$. Bevel gears 557 and coupling 558 are secured to a short shaft 559 (Fig. 42) which rotates in a bearing supported in an extension from bracket 553.

Shaft 532' (Figs. 39, 44), the rotation of which represents the output of differential 534, is secured to and rotatable with the planetary gear mounting 544. Bevel pinion 560 is secured to the front end of shaft 532' and meshes with bevel pinion 561, the latter secured to and rotatable with shaft 562, which has bearings in rigid extensions from mounting bracket 523. A pinion 563 is secured to shaft 562 at its lower end and meshes with and drives R disc-gear 564 (Figs. 39, 41, 44), the latter journaled on a stub shaft 565 secured to and extending upwardly from base plate 524. R disc 564 has graduations on the upper face thereof in degrees of range angle R, the momentary range angle R being indicated opposite index 564' mounted on base plate 524.

Figure 41:
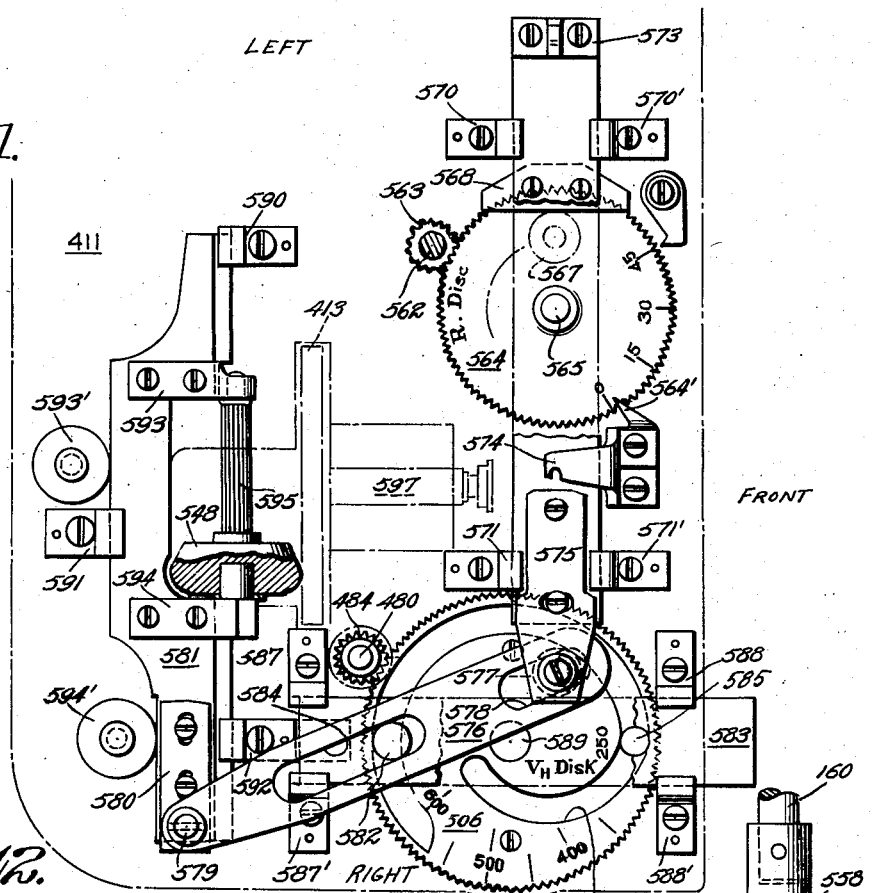
Fig. 41 is a partial horizontal plan view of the computer unit, with parts omitted for greater clarity.

A roller 567 (Fig. 45) rotatably mounted on a pin 566 fixedly secured to disc-gear 564 and extending upwardly therefrom, bears against a cross bar 568, bolted to the lower face of a bar 569. Bar 569 is longitudinally slidable in guides 570, 570', 571, 571' (Figs. 39, 41) secured to base plate 524, and is positioned by disc-gear 564 acting through roller 567 and cross bar 568. A spring 572 held between brackets 573, 574 secured, respectively, to the left end of bar 569 and to base plate 524, acts to force bar 569 longitudinally to the right (Fig. 7) toward $V_H$ disc-gear 506, and to keep cross bar 568 in contact with roller 567. An extension arm 575 is fixedly secured to the right end of bar 569, the right end of arm 575 being connected to floating lever 576, near the front end of the latter, by flanged connecting pin 577. Pin 577 passes through a hole drilled in arm 575 near its right end and is longitudinally slidable in an elongated slot 578 in lever 576. The other or rear end of lever 576 is rotatably connected to an upwardly extending cylindrical projection 579 (Figs. 39, 40) of bracket 580, the latter secured to longitudinally slidable roller bar 581 (Fig. 41).

An upwardly extending pin 582 (Figs. 39, 40, 41) rigidly secured to $V_H$ bar 583 has a slidable fit in a longitudinal slot 584 in lever 576, while a downwardly extending pin 585, also rigidly secured to $V_H$ bar 583, has a slidable fit in a cam slot 586 in $V_H$ disc-gear 506. $V_H$ bar 583 is longitudinally slidable between guides 587, 587', 588, 588' mounted on base plate 524 and is positioned by $V_H$ disc-gear 506 by means of pin 585 and cam slot 586. The longitudinal position of $V_H$ bar 583 in turn determines the position of pin 582, the location of the latter upon, which lever 576 is pivoted, varying the actual and relative lengths of the front and rear lever arms of lever 576. $V_H$ disc-gear 506 is rotatably journaled on an upwardly-extending stub shaft 589, fixedly secured to base plate 524. The angular position of disc-gear 506 is determined by pinion 484 secured to and driven by $V_H$ shaft 480 of the barometric unit 409 (Fig. 53).

Roller bar 581 is longitudinally slidable in guides 590, 591 and 592 (Fig. 41) mounted on base plate 524, and bears against rollers 593', 594' rotatable on upwardly extending studs from base plate 524. A pair of brackets 593, 594 secured to bar 581 serve as bearing supports for elongated gear 595. Gear 595 (Figs. 39, 43) meshes with and drives gear 599, which has a concentric integral pinion 600, the latter meshing with and driving aforementioned gear 546 of differential 543. Gear 595 and pinion 600 are journaled on a fixed stud 601 extending from a bracket 555.

N roller 548 (Figs. 39, 41) is mounted on the right end of gear 595, and is concentric and rotatable therewith, a central opening in roller 548 being machined to receive the gear teeth of gear 595. Constant speed disc-gear 413, driven by gear 412 of the barometric unit 409 (Fig. 25), firmly but movably bears against and frictionally drives roller 548. Gear 413 (Figs. 39, 43) is supported by and secured to one end of shaft 596, the latter rotatable in bearing block 597 mounted on base plate 524. The other end of shaft 596 has a reduced diameter portion which terminates in an integral dome-ended flange 598.

A bracket 603 (Figs. 43, 46) is bolted to the top of bearing block 597 and is drilled near the top to receive pin 604 on which arm 605 is pivotally mounted. Two leaf spring arms 606, 607 are secured to the pivoted end of arm 605, the free end of spring 606 bearing against the dome end of flange 598 and acting to force it longitudinally to the rear, the free end of spring arm 607 being forked to fit around the reduced diameter portion of shaft 596 adjacent to the flat surfacee of flange 598. Spring arm 607 is thicker (Fig. 46) and considerably stronger than spring arm 606, and, when the rear or free end of arm 605 is lowered in the manner described below, spring arm 607 bears against the flat surface of flange 598 and forces shaft 596 longitudinally to the front against spring 606. This longitudinal movement of shaft 596 displaces disc-gear 413 from frictional contact with roller 548. If the rear or free end of arm 605 be raised from its lowered position, the lower forked end of spring 607 is moved to the rear, and spring 606, acting on the dome end of shaft 596, forces disc-gear 413 into frictional engagement with roller 548.

The lower end of a rigid connecting link 608 (Figs. 46, 47) is connected to the rear or free end of arm 605 by means of pin 609; the upper end of this same link is connected to the lower end of bell crank lever 610 by means of pin 611, link 608 being rotatable through a small angle on both pins 609 and 611. Bell crank lever 610 is rotatably pivoted on pin 612 supported by a rigid extension from the torque motor frame. Two coil springs 613, 614, the upper ends of which are connected to a cross-arm 615 bolted to the top of arm 605, and whose lower ends are connected, respectively, to studs 616, 617 screwed into opposite ends of bearing block 597, act to force the free end of arm 605 downward and to hold the upper rounded end of lever 610 in contact with the outer conical surface of the azimuth gyro locking cone 222. A locking aram 618, also secured to the top of arm 605, is disposed to engage the teeth of and lock gear 599, when the rear end of arm 605 is in the lowered position, as indicated by the broken lines on Fig. 46.

The mechanism described in the paragraph immediately above serves automatically to unlock gear 599 and frictionally engage disc 413 and roller 548 when the azimuth gyro is unlocked, and automatically to lock gear 599 and disengage disc 413 from roller 548 when the azimuth gyro is locked either manually or automatically in the manner above described. The upper end of lever 610 follows the movement of locking cone 222.

An explanation as to how the computer unit 507 solves the equation $$n = C \frac{\sin 2R}{V_H}$$

is contained in the paragraphs immediately following.

Referring to Fig. 39, gear 532 of differential 534 is rotated corresponding to the dive angle $\alpha_1$ (Fig. 1). Gear 535 of this same differential is rotated corresponding to angle $\alpha_2$, the angle between the line of sight and the longitudinal axis of the airplane, which is the result of tilting the line of sight at rate of $n \pm n_2$, or is the equivalent of $\Sigma_T n \pm n_2$.

The output of differential 534, which represents the angle $\alpha_1 \pm \alpha_2$, or the angle $90 - R$ (Fig. 1), is applied to rotate R disc-gear 564, by means of 2 to 1 gearing, as shown, through angle $(180-2R)$.

As R disc 564 is rotated through the angle $180-2R$, bar 569, and with it pin 577 and the front end of lever 576, are moved longitudinally through a distance equivalent to $\sin(180-3R)$, which is in turn equivalent to $\sin 2R$. In Fig. 39, R disc is shown in its position corresponding to $R=45°$, or $2R=90°$, in which position bar 569 and the front end of lever 576 are farthest to the left (Figs. 7, 39 and 41), sin 2R then being at its maximum value. Any change in the value of R from $R=45°$ will result in a reduction in the value of sin 2R and hence in movement of the front end of lever 576 to the right (Figs. 7, 39 and 41). Thus the position of pin 577, and hence the front end of lever 576, is proportional to sin 2R.

The position of the floating pivot of lever 576 as well as the actual and relative lengths of the lever arms on each side of said pivot, are dependent on the angular position of $V_H$ disc-gear 506, the latter positioned corresponding to the momentary value of $V_H$, supplied from the barometric unit 409. The $V_H$ disc gear 506 shown is calibrated for values of $V_H$ from 250 to 600 ft. per sec. and is shown in its angular position corresponding to a $V_H=250$ ft. per sec. Other $V_H$ disc-gears calibrated in different ranges of air speeds may obviously be substituted for the one shown. Rotation of $V_H$ disc-gear 506 in a counter-clockwise direction, as seen in Fig. 39, will result in movement of $V_H$ bar 583 and pin 582 to the rear, increasing the length of the lever arm (of lever 576) to the front of pin 582 and decreasing the length of the lever arm on the rear side of this same pin. Such rotation of the $V_H$ disc gear, which corresponds to an increase $V_H$, will result in movement of the rear end of lever 576 to the left, the position of pin 577 being considered stationary for the moment. It will also be observed, the position of pin 582 being considered as remaining stationary for the moment, that any movement of bar 569 to the right (corresponding to an increase in the value of the angle R above 45°, or a decrease in the value of this angle below 45°), will also result in movement of the rear end of lever 576 to the left. Movement of the rear end of lever 576 to the left results in corresponding movement of roller bar 581 and roller 548, roller 548 being moved nearer to the center of constant speed disc gear 413. This change of position of roller 548 will result in a decrease in its rotational speed, and a corresponding decrease in the rotational speed of gear 546 of differential 543.

Again referring to the equation solved by the computer $$n = C \frac{\sin 2R}{V_H}$$

it is evident that the rotational speed of $n$ roller 548 and hence the rotational speed of gear 546, is dependent on the position of $n$ roller 548 on disc gear 413. It has been explained that either an increase of $V_H$, or a change in the angle R from a value of 45°, or both, will result in movement of $n$ roller 548 toward the center of disc 413 and hence in a decrease in the the value of $n$. It is obvious that a decrease of $V_H$, or a change in the value of the angle R toward 45° will result in an increase of $n$. The constant C of the aforementioned equation is introduced into the mechanism by a proper choice of gear ratios.

Gear 546 of differential 543 being rotated corresponding to rate $n$, and bevel gear 547 of this same differential being rotated at a rate corresponding to $n_2$, the output of this differential rotates at a rate corresponding to $n \pm n_2$. The output of differential 543 positions bevel gear 535 of differential 534 corresponding to $\Sigma_T n \pm n_2$, corresponding to the angle $\alpha_2$.

Trail may be set into the computer in either of two ways, first, by adjustment of bracket 580 (it having elongated holes therein for such purpose); second, by a change in the contour of cam slot 586 in disc gear 506. Any value of trail set in the instrument by adjustment of bracket 580 will necessarily be constant, while trail set into the instrument by a change in the contour of slot 586 may be made to vary with $V_H$ if, for any reason, such is found desirable. Obviously, also, a constant value of trail may be set into the instrument by changing the contour of slot 586. In any event, the effect of setting trail into the instrument will be to increase the value of $n$, such being accomplished by moving the $n$ roller 548 further from the center of disc 413 than it otherwise would be moved.

In the mechanism above described, three separate electric motors are employed to furnish motive power for the turn and tilt servo unit, the $\alpha$ and $\beta$ servo unit, and the barometric unit. It is obvious that a single governor controlled motor could be employed to replace these three motors, if desired.

Certain preliminary explanatory remarks are necessary at this point prior to an explanation of the operation of my present bomb sight in connection with dive bombing, including pilot directing.

With no distortion or optical parallax, with a sufficient target distance, and with the bomb sight in operation (azimuth gyro released with its spinning axis pointing to or near the target), the following effects will be observed by the pilot-operator looking into the telescope: (a) Lateral wing inclinations relative to the longitudinal axis of the airplane will be indicated by movement of the incomplete cross-lines relative to the azimuth stabilized complete cross-lines and also relative to the target, but such will not cause motion of the complete cross-lines relative to the target; (b) If the azimuth gyro 144 be turned or tilted, the complete cross-lines will be moved relative to the target, at rates $n_3$ and $n_1$, respectively; (c) If the entrance prism 126 be tilted or turned, the complete cross-lines will also be moved relative to the target, at rates $n_2$ and $n_4$, respectively. The entrance prism is also tilted at the rate $n$ for trajectory compensation.

Thus, both precession of the azimuth gyro 144 and movement of the entrance prism 126 cause movement of the complete cross-lines relative to the target.

The intersection of the aforementioned cross-lines, etched on reticle lens 122 (Figs. 2, 9 and 12), is stabilized in space by the spinning azimuth gyro 144 (when released), but these lines themselves rotate about their intersection as the fuselage is rotated and the wings laterally inclined about the longitudinal axis of the airplane. The incomplete cross-lines, etched on lens 120 (Figs. 9 and 12) are controlled by the vertical gyro 169 and represent, subject to a multiplying factor as described below, the vertical and horizontal planes of gyro 169. Thus the angle between the athwartships complete cross-lines and the horizontal incomplete cross-lines is the angle $\beta$, as affected by such multiplying factor.

When the airplane is in level flight and the wings are inclined laterally, the angle $\beta$ is readily apparent. But when the airplane is diving vertically the angle $\beta$ is zero for all lateral positions of the wings. When the airplane is diving at any angle less than 90° to the horizontal, the wings must be inclined through a greater angle to produce the same angle $\beta$ than would be necessary if the airplane were in level flight. Since it is necessary in the operation of this bomb sight for the pilot-operator to be able to observe the wing positions while looking through the optical system, and thus control the fuselage while in a dive, the aforementioned mechanism controlling the angular position of the incomplete cross-lines has been so geared that when the airplane is diving at a 60° angle with reference to the horizontal, wing motions about the longitudinal axis of the airplane will be indicated by the same angular displacement between the aforementioned complete and incomplete cross-lines. This being so, when the airplane is in level flight, the angular displacement between the complete and incomplete cross-lines will be equal to the angle of lateral inclination of the wings of the airplane with reference to the horizontal, multiplied by a factor 1.25. When the airplane is diving at an angle greater than 60° to the horizontal, the angle indicated between the complete and incomplete cross-lines will be less than the angle through which the wings have been laterally inclined. Thus, the angle $\beta$ is said to be "stepped-up" for dive angles ($\alpha_1$) less than 60°, and is "stepped down" for dive angles greater than 60°.

One feature of my present bomb sight is the employment of what I denominate "overcontrol." By this I mean an arrangement of the mechanism whereby the pilot-operator, in changing the direction of the line of sight to move it on or keep it on the target, is required to change the direction of the longitudinal axis of the airplane through a greater angle than the angle through which the line of sight is moved, but in the same direction. I have found such over-control desirable, for without it, i. e., directing by moving the longitudinal axis of the airplane through the same angle that the line of sight is moved results in gradually turning the airplane into the wind. Furthermore, by the use of over-control, the pilot-operator is enabled more quickly to obtain the collision condition necessary for the solution of the bombing problem.

Overcontrol is accomplished in my present bomb sight by turning or tilting the entrance prism 126 (Fig. 2) in such a direction that it causes motion of complete cross-lines with reference to the target in a direction opposite to that caused by precession of the azimuth gyro 144.

The same currents that energize the bail magnet 190', and hence cause turning of the azimuth gyro 144, also energize and set in motion the turn servo unit 238 for the entrance prism 126, and for the same period. The rate of prism turning, $n_4$, being 2° per sec., and the rate of azimuth gyro turning, $n_3$, being 3° per second, it is evident that if the line of sight is to be turned through 1°, it would require one second and that during this second the airplane fuselage would be turned through 3°, the overcontrol factor being 2.

Likewise, the rate of azimuth gyro tilting, $n_1$, being 3° per sec., and the rate of entrance prism tilting, $n_2$, being 2¼° per sec., it would require $$\frac{1}{\frac{3}{4}}$$

or 1.33 sec. to tilt the line of sight through 1°, and during such period the longitudinal axis of the airplane would be tilted through an angle of $1.33 \times 3 = 4°$. Here the overcontrol factor is equal to 3.

While, for purposes of overcontrol, the entrance prism 126 is tilted at the rate $n_2$ in such direction as to produce movement of the complete cross-lines relative to the target in a direction opposite to that produced by tilt of the azimuth gyro 144, this prism 126 is also tilted at the rate $n$, for trajectory compensation always, in such direction as to cause the intersection of the complete cross-lines to move aft relative to the target, the word "aft" being thus employed also in relation to the airplane.

The effect of this rate $n$ is to decrease the range angle R, such as would be caused by a variable head wind acting on the airplane or a variable target motion away from the airplane.

Actually, the rates $n_2$ and $n$ are combined in differential 543 (Figs. 2, 39) of the computer unit 411 and the summation $n+n_2$ is applied to tilt the entrance prism 126.

The steps listed immediately below should be followed in utilizing my present bomb sight in dive bombing from an airplane:

(1) Prior to leaving the ground, the barometric element 417 should be checked to see if the altitude scale 441 reads zero altitude, and if not, it should be set to zero by the mechanism above described. As an alternate or additional check after the airplane is in the air, the electric bulb controlled by switch 513 (Fig. 50) should flash on when the altimeter installed in the airplane indicates an altitude of 8000 ft.

(2) Rotate sheave 116, using arm 118 and knob 119 until the zero graduation on scale 107 (Fig. 4) is opposite pointer 108. This rotates entrance prism casing 102' until the opening therein is at the front.

(3) Pre-set the entrance prism, if desired, by means of push-button switches 243 to 246, inclusive.

(4) Close main starting switch 247 (Fig. 2A) after the airplane is in the air, thus starting the sight mechanism, including the gyros.

(5) After reaching a suitable altitude, level and unlock the vertical gyro 169. This is accomplished as follows: The gyro is first released. The pilot then flies the airplane level, longitudinally and laterally, on any two courses 90° apart, and on each such course sets the vertical gyro to the vertical by pressing and closing push-button switches 327 or 328 until the zero graduation on dive angle indicator drum 527 appears opposite index 109' (Figs. 2, 4). The fore-and-aft and athwartships levels installed in the airplane may be used as indicators in flying the airplane level. The above procedure sets the vertical gyro 169 sufficiently close to the vertical in two planes 90° apart for all practical purposes as far as the operation of the sight is concerned. Closing push-button switch 327 or 328 energizes the bail magnet 309 of the vertical gyro, and such, through the mechanism previously described, including roller 301 and bail 299, precesses the spinning axis of the gyro. When push-button switch 328 is closed the gyro rotor precesses in a direction opposite to that in which it precesses when switch 327 is closed.

(6) When ready to attack a target by dive bombing, the pilot-operator places the airplane in a dive and maneuvers the airplane until the target is seen in the optical system at or near the intersection of the complete cross-lines. The pilot-operator then releases the azimuth gyro 144, by pulling on knob 105 and rod 103.

As the pilot-operator continues his dive, looking through the telescope 100, he will observe the target to drift away from the intersection of the cross-wires, such drift being due to wind, target motion, etc., or it may be due to tilt of the entrance prism at the rate $n$ by means of the mechanism above described. The pilot-operator then maneuvers the airplane in such direction as to bring the target back on the cross-wires intersection. He may maneuver the airplane to correct for fore-and-aft and athwartships drift one at a time or simultaneously, simultaneous correction of all drift generally resulting in the airplane reaching a collision condition more quickly.

Assuming, for example, that the target drifts forward from the cross-lines intersection, the pilot then noses the airplane up (decreases the angle of dive $\alpha_1$) to bring the cross-line back on the target. This change in the direction of the longitudinal axis of the airplane results in the following, referring now to Fig. 2:

When the change of direction exceeds 1°, the spinning axis of the azimuth gyro 144 continuing to point in the same direction in space, brush 209 (Figs. 2, 2A) make electrical contact with contact 211, energizing the torque motor 194 and simultaneously engaging one of the clutch units of the tilt servo unit 241'. The torque motor 194 exerts a torque on the cardan 141 of the azimuth gyro 144 in such direction as to cause precession of the rotor of this gyro in the same direction that the longitudinal axis of the airplane has been moved. The torque motor 194 will continue to be energized, and the aforementioned clutch unit of the tilt servo unit 241', will remain engaged until the spinning axis of the azimuth gyro 144 is again parallel to the longitudinal axis of the airplane, when the electrical circuit between brush 209 and contact 211 will be broken. This precession of the rotor of gyro 144, acting through link 143 and yoke 138, moves tube 137 and lens 122 upward, such moving the cross-wire intersection toward the target at rate $n_1$, as seen by the pilot through the optical system.

The engagement of the aforementioned clutch unit of the tilt servo unit 241' will, through the mechanism shown and previously described, rotate gear 547 of differential 543 in such direction and at such rate as to produce a tilt of entrance prism 126 downward, or clockwise, as seen in Fig. 2, about its pivoting axis through gudgeons 155', 156', at rate $n_2$. This movement of the entrance prism 126 has the effect of moving the cross-lines intersection further away from the target, for purpose of overcontrol, as described above. However, since the rate $n_1$ exceeds the rate $n_2$, the cross-wires intersection is moved on the target, the longitudinal axis of the airplane meanwhile being moved through a greater angle than the angle through which the line of sight is moved, by an overcontrol factor of 3. It is apparent that this change in the direction of the longitudinal axis of the airplane not only moves the cross-wire intersection back on the target, but also brings the airplane to a new course for purposes of drift compensation. Due to the overcontrol feature, which necessitates relatively large movements of the fuselage longitudinal axis for corresponding movements of the line of sight, the airplane course upon which there is no drift is reached much more quickly.

If now the target continues to drift forward relative to the cross-wire intersection, it is apparent that the airplane is still diving too steeply and that a further reduction in the dive angle $\alpha_1$ is necessary to reach a collision or no drift course. If the target begins to drift aft relative to the cross-wires intersection, the plane must be obviously dived more steeply for a collision condition.

While the entrance prism 126 is tilted at rate $n_2$ only when brush 209 makes electrical contact with one of the contacts 210, 211, this prism is being continuously tilted at variable rate $n$ throughout the dive, the effect of the tilt at rate $n$ being to always move the cross-wires intersection relative to the target. It is obvious that the pilot, in directing the airplane for a collision condition, must also maneuver the airplane to correct for the drift due to entrance prism tilt at rate $n$.

If, for example, the target drifts to the right of the intersection of the cross-wires, as seen through the optical system, the pilot changes the direction of the longitudinal axis of the airplane to the right to compensate for this drift and to again bring the intersection of the crosslines back on the target. This movement of the longitudinal axis of the airplane causes brushes 213', 214' (Fig. 37) to make electrical contact with contacts 215, 218, respectively, thus energizing solenoid 190 of the bail magnet 190' (Fig. 2) and engaging one of the clutch units of turn servo unit 238. Solenoid 190 causes the bail 184 to frictionally engage roller 187 of the azimuth gyro, precessing the spinning rotor of the azimuth gyro to the right, the gyro rotor case and cardan 141 being moved through the same angle. This movement of cardan 141 causes, through the mechanism shown, the cross-wires intersection to move to the right toward the target, as seen through the optical system, at rate $n_3$. Meanwhile, the turn servo unit 238 is turning the prism case 102, and with it the entrance prism 126, in such direction as to cause the cross-wires intersection to move to the left and away from the target, as seen in the optical system, at rate $n_4$. The electrical circuit is broken between brushes 213', 214' and contacts 215, 218 when the spinning axis of the gyro has moved to the right through the same angle as the longitudinal axis of the airplane, this change in the direction of such longitudinal axis being greater than the change in direction of the line of sight by the aforementioned overcontrol factor of $\alpha$.

The pilot-operator having maneuvered the airplane to bring the cross-wire intersection back on the target, he now continues to observe target drift, and maneuvers his airplane accordingly.

Throughout the dive, after the azimuth gyro 144 has been released, the computer unit 507, receiving input $\alpha_1$, from the $\alpha_1$ servo unit and input $V_H$ from the barometric unit 409, solves for rate $n$ and applies it as an input to differential 543 where it is combined with rate $n_2$. The output of differential 543, $n \pm n_2$, is then applied to tilt the entrance prism 126. Meanwhile, lens 120 is rotated by the $\beta$ servo unit to indicate the fuselage planes, and hence the angle $\beta$ (as affected by the aforementioned multiplying factor), in the pilot's line of sight as he looks through the optical system.

All directing to determine the collision or no-drift course is thus accomplished by fuselage motions. The collision course is obtained and the problem solved when the cross-wires intersection stays on the target and does not drift off, even though during this time, the entrance prism is being tilted at rate $n$. However, since all angles, the rate $n$, distances, air speed, wind and lift involved in the solution of the problem are variable, the collision or no drift condition, once obtained, will not last. By further directing, in the manner above described, it may quickly be obtained again, however.

The entrance prism 126 may be pre-set to any desired position within its range of movement by the mechanism controlled by push-button switches 243 to 246, inclusive (Fig. 2A), taking into consideration the effect of known variables, and a collision or no-drift condition may be reached more quickly.

Once the no-drift condition is reached, the bombs may be dropped at any altitude, and several bombs may be dropped during the same dive.

Figure 46:
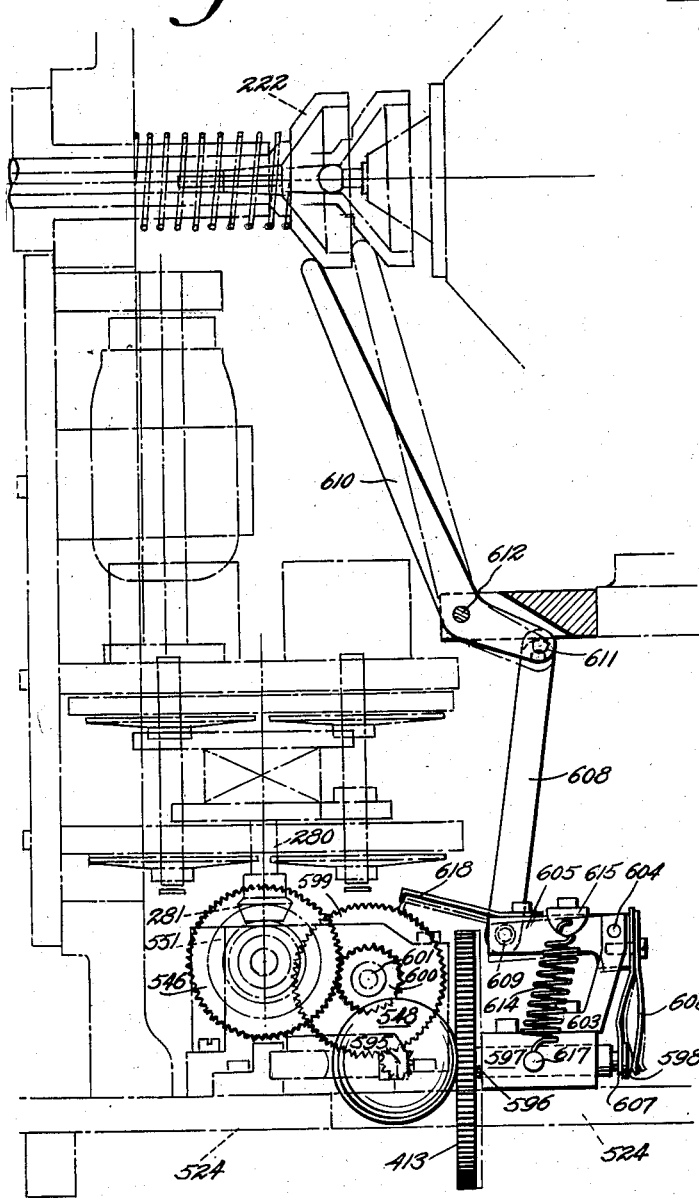
Fig. 46 is a fragmentary vertical longitudinal sectional view through the rear end of the sight casing, showing the computer unit locking mechanism as seen from the right side.
Figure 47:
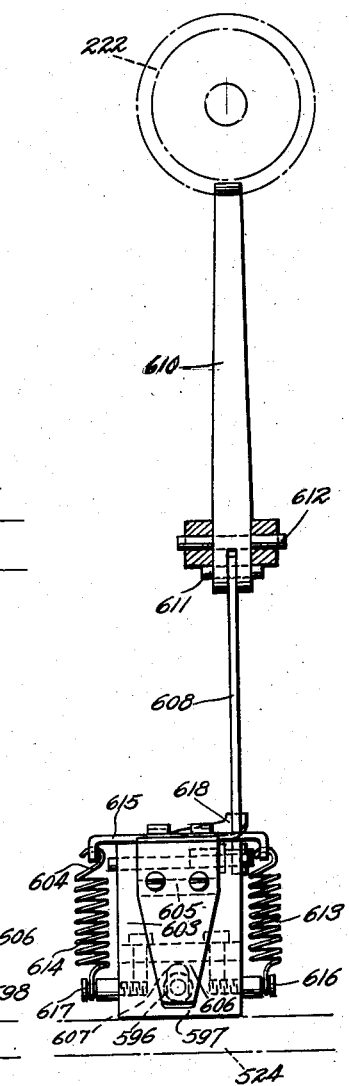
Fig. 47 is a front elevation of the locking mechanism of Fig. 46.

When the pilot "pulls out" of the dive upon the completion of the attack and begins to climb again, as is usually the case, this sudden change of direction from diving to climbing leaves the entrance prism 126 pointed downward, and the azimuth gyro 144 and computer unit 507 are locked by means of the mechanism previously described in connection with Figs. 21 and 46, respectively.

Other modifications and changes in the number and arrangement of the parts may be made by those skilled in the art without departing from the nature of this invention, within the scope of what is hereinafter claimed.

The invention described herein may be manufactured and used by or for the Government of the United States of America for governmental purposes without the payment of any royalties thereon or therefor.

I claim:

1. A collision track bomb sight for use in diving aircraft, comprising an optical system, a first gyroscopic means, a second gyroscopic means, a barometric means, a computer means, the line of sight from the eye of the bomb-sight operator to the target passing through the field of view of said optical system, said optical system having in the line of sight thereof a rotatable and tiltable entrance prism, means in the field of view of said system forming a pair of complete cross-lines and a pair of incomplete cross-lines, said first gyroscopic means having a rotor, means controlled by said first gyroscopic means for stabilizing said complete cross-lines in azimuth, means controlled by the movements of said aircraft for precessing the rotor of said first gyroscopic means to follow said movements, an overcontrol means including a means controlled by the movements of said aircraft for turning and tilting said entrance prism, said overcontrol means causing a change in the direction of said line of sight opposite to that caused by movements of said aircraft, said second gyroscopic means having a rotor, the spinning axis thereof being adjustable to the vertical, means controlled by the movements of said aircraft relative to said spinning axis for positioning said incomplete cross-lines, a dive angle indicating means, a vertical velocity indicating means, an altitude indicating means, means controlled by the movements of said aircraft relative to said spinning axis for supplying the angle of dive of said aircraft to said computer means and to said dive angle indicating means, said barometric means being responsive to changes in atmospheric pressure and supplying the vertical velocity of said aircraft to said computer means, and said vertical velocity indicating means and the altitude of said aircraft to said altitude indicating means, said computer means solving for the rate of tilting of said entrance prism for trajectory compensation and for trail compensation, means controlled by said computer means for tilting said entrance prism at said rate, and a locking means for each said gyroscopic means, the movements of the longitudinal and athwartships axes of said aircraft being indicated by relative displacements of said incomplete cross-lines relatively to said complete cross-lines.

2. A collision track bomb sight for use in diving aircraft, comprising an optical system, a first gyroscopic means, a second gyroscopic means, a baromethic means, a computer means, the line of sight from the eye of the bombsight operator to the target passing through the field of view of said optical system, said optical system having in the line of sight thereof a rotatable and tiltable entrance prism, means in the field of view of said system forming a pair of complete cross-lines and a pair of incomplete cross-lines, said first gyroscopic means having a rotor, means controlled by said first gyroscopic means for stabilizing said complete cross-lines in azimuth, means controlled by the movements of said aircraft for precessing the rotor of said first gyroscopic means to follow said movements, an overcontrol means including a means controlled by the movements of said aircraft for turning and tilting said entrance prism, said overcontrol means causing a change in the direction of said line of sight opposite to that caused by movements of said aircraft, said second gyroscopic means having a rotor the spinning axis thereof being adjustable to the vertical, means controlled by the movements of said aircraft relative to said spinning axis for positioning said incomplete cross-lines, means controlled by the movements of said aircraft relative to said spinning axis for supplying the angle of dive of said aircraft to said computer means, said barometric means being responsive to changes in atmospheric pressure and supplying the vertical velocity of said aircraft to said computer means, said computer means solving for the rate of tilting of said entrance prism for trajectory compensation, and for trail compensation, means controlled by said computer means for tilting said entrance prism at said rate, and a locking means for each said gyroscopic means, the movements of the longitudinal and athwartships axes of said aircraft being indicated by relative displacements of said incomplete cross-lines relatively to said complete cross-lines.

3. A bombsight for use in aircraft, comprising an optical system, a first gyroscopic means, a second gyroscopic means, a barometric means, a computer means, said optical system having in the line of sight thereof a rotatable and tiltable entrance prism, means in the field of view of said system forming a pair of comple cross-lines and a pair of incomplete cross-lines, said first gyro-scopic means having a rotor, means controlled by said first gyroscopic means for stabilizing said complete cross-lines in azimuth, means controlled by the movements of said aircraft for precessing the rotor of said first gyroscopic means to follow said movements, an overcontrol means including a means controlled by the movements of said aircraft for turning and tilting said entrance prism, said overcontrol means causing a change in the direction of said line of sight opposite to that caused by movements of said aircraft, said second gyroscopic means having a rotor the spinning axis thereof being adjustable to the vertical, means controlled by the movements of said aircraft relative to said spinning axis for positioning said incomplete cross-lines, means controlled by the movements of said aircraft relative to said spinning axis for supplying the angle of dive of said aircraft to said computer means, said barometric means being responsive to changes in atmospheric pressure and supplying the vertical component of the velocity of said aircraft to said computer means, said computer means solving for the rate of tilting of said entrance prism for trajectory compensation and for trail compensation, and means controlled by said computer for tilting said entrance prism at said rate, the movements of the longitudinal and athwartships axes of said aircraft being indicated by relative displacements of said incomplete cross-lines relatively to said complete cross-lines.

4. A collision track bomb sight for use in dive bombing from aircraft, said bomb sight including an optical system, the line of sight from the eye of the bomb-sight operator to the target passing through the field of view of said optical system, azimuth stabilized cross-lines in said field of view, means controlled by the movements of said aircraft for shifting said cross-lines, indicating marks in said optical system for indicating the attitude and movements of the fore and aft axes of said aircraft, vertically stabilized gyroscopic means for positioning said indicating marks and for indicating the dive angle of said aircraft, an overcontrol means responsive to the movements of said aircraft for causing a change in the direction of said line of sight opposite to that caused by said movements, a barometric means for obtaining the vertical velocity and altitude of said aircraft, means responsive to changes in said dive angle and vertical velocity for computing the rate of tilt of said line of sight for trajectory compensation and for trail compensation, means for applying said rate of tilt to said optical system to angularly move said line of sight, and means for indicating said altitude and vertical velocity.

5. A collision track bomb sight for use in dive bombing from aircraft, said bomb sight including an optical system, the line of sight from the eye of the bomb-sight operator to the target passing through the field of view of said optical system, azimuth stabilized cross-lines in said field of view, means controlled by the movements of said aircraft for shifting said cross-lines, indicating means in said optical system for indicating the attitude and movements of the fore and aft axes of said aircraft, vertically stabilized gyroscopic means for positioning said indicating means and for indicating the dive angle of said aircraft, and overcontrol means responsive to the movements of said aircraft for causing a change in the direction of said line of sight opposite to that caused by said movements, a barometric means for obtaining the vertical velocity of said aircraft, means responsive to changes in said dive angle and vertical velocity for computing the rate of tilt of said line of sight for trajectory compensation and for trail compensation, and means for applying said rate of tilt to said optical system to angularly move said line of sight.

6. A bomb sight for use in dive bombing from aircraft, said bomb sight including an optical system, the line of sight from the eye of the bomb-sight operator to the target passing through the field of said optical system, azimuth stabilized cross-lines in the field of view of said optical system, means controlled by the movements of said aircraft for moving said cross-lines, indicating means in said optical system for indicating the attitude and movements of the longitudinal and fore and aft axes of said aircraft, vertically stabilized means for positioning said indicating means and for obtaining the dive angle of said aircraft, a barometric means for obtaining the vertical velocity of said aircraft, means responsive to changes in the dive angle and vertical velocity of said aircraft for computing the rate of tilt of said line of sight for trajectory compensation, and means for applying said rate of tilt to said system to correspondingly angularly move said line of sight.

7. A collision track bomb sight for use in diving aircraft, said bomb sight including an optical system, the line of sight from the eye of the bomb-sight operator to the target passing through the field of view of said optical system, azimuth stabilized means in the field of view of said optical system for indicating target drift, vertically-stabilized means in the field of view of said line of sight for indicating the attitude and movement of the longitudinal and fore and aft axes of said aircraft, means responsive to the movements of said aircraft for moving said azimuth stabilized means, an overcontrol means responsive to the movements of said aircraft for causing a change in the direction of said line of sight opposite to that caused by said movements, a barometric means for obtaining the vertical velocity and altitude of said aircraft, a means responsive to changes in the dive angle and vertical velocity of said aircraft for computing the rate of tilt of said line of sight for trajectory compensation and for trail compensation, and means for operating said optical system to tilt said line of sight at such rate.

8. A collision track bomb sight for use in diving aircraft, said bomb sight including an optical system, the line of sight from the eye of the bomb-sight operator to the target passing through the field of view of said optical system, azimuth stabilized means in the field of view of said optical system for indicating target drift, vertically stabilized means in said line of sight for indicating the attitude and movements of said aircraft, means responsive to the movements of said aircraft for moving said azimuth stabilized means, an overcontrol means responsive to the movements of said aircraft for causing a change in the direction of said line of sight opposite to that caused by said movements, a barometric means for obtaining the vertical velocity of said aircraft, a means responsive to changes in the dive angle and vertical velocity of said aircraft for computing the rate of tilt of said line of sight for trajectory compensation and for trail compensation, and means for operating said optical system to tilt said line of sight at such rate.

9. A bomb sight for use in diving aircraft, said bomb sight including an optical system, the line of sight from the eye of the bomb-sight operator to the target passing through the field of view of said optical system, azimuth stabilized means in the field of view of said optical system for indicating the target drift, vertically stabilized means in said line of sight for indicating the attitude and movements of said aircraft, means responsive to the movements of said aircraft for moving said azimuth stabilized means, a barometric means for obtaining the vertical velocity of said aircraft, a means responsive to changes in the dive angle and vertical velocity of said aircraft for computing the rate of tilt of said line of sight for trajectory compensation, and means for operating said optical system to tilt said line of sight at such rate.

10. A barometric device for use in aircraft for computing and indicating the altitude and vertical velocity of said aircraft, comprising two sets of aneroid diaphragms under atmospheric pressure, an electrically energized clutch means having one electrical circuit for operating said clutch means in one direction and a second electrical circuit for operating said clutch means in the opposite direction, a first shaft having an S-shaped slot therein, belt means passing through said slot and secured to each said set of diaphragms, the movement of said diaphragms under change of atmospheric pressure causing rotation of said first shaft through a small angle in either one or the other direction, circuit-closing means responsive to the rotation of said first shaft for closing one or the other of the electrical circuits to and engaging said clutch means, a second shaft geared to said clutch means, said clutch means rotatably driving said second shaft when said clutch means is engaged, indicating means graduated in vertical velocity secured to and rotatable with said second shaft, an elongated shaft having a roller secured thereto and concentric therewith, a worm gear secured to and concentric with said second shaft, a carriage having gear teeth therein and bearings for supporting said elongated shaft and roller, said gear teeth engaging said worm gear, said carriage slidable longitudinally along said worm gear as said second shaft is rotated, a disc gear, a governor controlled substantially constant speed electric motor for driving said disc gear and said clutch means, means including a spring for holding one face of said disc gear in firm but movable contact with the rim of said roller, said roller being moved along the face of said disc gear as said carriage is moved longitudinally, said roller being rotatable at a speed depending on its position with reference to the center of said disc gear, said roller being zeroed at an artificial zero position somewhat away from the center of said disc gear, a first differential means responsive to the rotation of said roller and said disc gear for compensating for the zero position of said roller away from the center of said disc gear, an altitude shaft, a second differential means having two input gears, said elongated shaft driving one said input gear through said first differential means, said second shaft driving the other said input gear, said second differential rotatably driving said altitude shaft, an indicating disc graduated in altitude, a cam means secured to one face of said indicating disc, said indicating disc being secured to and rotatable with said altitude shaft, a rotatable spring gear, a pair of equal and opposing coil springs secured to said first shaft and further secured to said spring gear at opposite points, and means including a cable means secured to said cam means for rotating said spring gear, the rotation of said spring gear acting through said springs causing rotation of said first shaft in a direction opposite to that caused by said movement of said diaphragms, the working movement of each said diaphragm being limited to about one one-thousandth of an inch, the position of said roller on said disc gear and the rotational speed of said altitude shaft being a function of said vertical velocity.

11. A barometric device for use in aircraft for computing and indicating the altitude and vertical velocity of said aircraft, comprising two sets of aneroid diaphragms under atmospheric pressure, an electrically energized clutch means having one electrical circuit for operating said clutch means in one direction and a second electrical circuit for operating said clutch means in the opposite direction, a first shaft having an S-shaped slot therein, a belt means passing through said slot and secured to each said set of diaphragms, the movement of said diaphragms under change of atmospheric pressure causing rotation of said first shaft through a small angle in either one or the other direction, circuit closing means responsive to the rotation of said first shaft for closing one or the other of the electrical circuits to and engaging said clutch means, a second shaft geared to said clutch means, said clutch means rotatably driving said second shaft when said clutch means is engaged, an indicating means graduated in vertical velocity secured to and rotatable with said second shaft, an elongated shaft having a roller secured thereto and concentric therewith, a worm gear secured to and concentric with said second shaft, a carriage having gear teeth therein and bearings for supporting said elongated shaft and roller, said gear teeth engaging said worm gear, said carriage slidable longitudinally along said worm gear as said second shaft is rotated, a disc gear, a governor controlled electric motor for driving said disc gear and said clutch means, means including a spring for holding one face of said disc gear in firm but movable contact with the rim of said roller, said roller being moved along the face of said disc gear as said carriage is moved longitudinally, said roller being rotatable at a speed depending on its position with reference to the center of said disc gear, an altitude shaft, differential means having two input gears, said elongated shaft driving one said input gear, said second shaft driving the other said input gear, said differential rotatably driving said altitude shaft, an indicating disc graduated in altitude, a cam means secured to one face of said indicating disc, said indicating disc being secured to and rotatable with said altitude shaft, a rotatable spring gear, a pair of equal and opposing coil springs secured to said first shaft and further secured to said spring gear at opposite points, and means including a cable means secured to said cam means for rotating said spring gear, the rotation of said spring gear acting through said springs causing rotation of said first shaft in a direction opposite to that caused by said movement of said diaphragms, the position of said roller on said disc gear and the rotational speed of said altitude shaft being a function of said vertical velocity.

12. A barometric device for use in aircraft for computing the altitude and vertical velocity of said aircraft comprising two sets of aneroid diaphragms under atmospheric pressure, an electrically energized clutch means having one electrical circuit for operating said clutch means in one direction and a second electrical circuit for operating said clutch means in the opposite direction, a first shaft having an S-shaped slot therein, a belt means passing through said slot and secured to each said set of diaphragms, the movement of said diaphragms under change of atmospheric pressure causing rotation of said first shaft through a small angle in either one or the other direction, a circuit-closing means responsive to the rotation of said first shaft for closing one or the other of the electrical circuits to and engaging said clutch means, a second shaft geared to said clutch means, said clutch means rotatably driving said second shaft when said clutch means is engaged, an elongated shaft having a roller secured thereto and concentric therewith, a worm gear secured to and concentric with said second shaft, a carriage having gear teeth therein and bearings for supporting said elongated shaft and roller, said gear teeth engaging said worm gear, said carriage slidable longitudinally along said worm gear as said second shaft is rotated, a disc gear, a governor controlled electric motor for driving said disc gear and said clutch means, means including a spring for holding one face of said disc gear in firm but movable contact with the rim of said roller, said roller being moved along the face of said disc gear as said carriage is moved longitudinally, said roller being rotatable at a speed depending on its position with reference to the center of said disc gear, an altitude shaft, a differential means having two input gears, said elongated shaft driving one said input gear, said second shaft driving the other said input gear, said differential rotatably driving said altitude shaft, a cam means secured to one face of said indicating disc, said cam means being secured to and rotatable with said altitude shaft, a rotatable spring gear, a pair of equal and opposing coil springs secured to said first shaft and further secured to said spring gear at opposite points, and means including a cable means secured to said cam means for rotating said spring gear, the rotation of said spring gear acting through said springs causing rotation of said first shaft in a direction opposite to that caused by said movement of said diaphragms, the position of said roller on said disc gear and the rotational speed of said altitude shaft being a function of said vertical velocity.

13. A barometric device for computing and indicating the altitude and vertical velocity of an aircraft, said device being responsive to changes in the earth's atmospheric pressure with change of altitude above the earth's surface, comprising a plurality of diaphragms under atmospheric pressure, a pair of electrical circuits having circuit closing means, means responsive to the movement of said diaphragm means with change of atmospheric pressure for exerting an actuating moment on said circuit closing means to one or the other of the pair of electrical circuits, a rotatable output shaft operable in either direction, means including solenoid-actuated clutch means responsive to said circuit closing means for rotating said shaft in one or the other direction dependent on which circuit has been closed, a disc gear, a governor controlled electrical driving means of substantially constant speed for driving said clutch means and said disc gear, a variable speed rotatable roller, means including a spring for holding one face of said disc gear in firm but movable contact with said roller, means including a carriage means responsive to the rotation of said output shaft for positioning said roller on said disc gear, the rotational speed of said roller being a function of its position from the center of said disc gear, said roller being zeroed at an artificial zero position somewhat away from the center of said disc gear, a first differential means responsive to the rotation of said roller and said disc gear for compensating for the zero position of said roller away from the center of said disc gear, an altitude shaft, a second differential means responsive to the rotation of said roller and said output shaft for rotating said altitude shaft, a cam means secured to and rotatable with said altitude shaft, means including a cable means and two opposing spring means actuable by rotation of said cam means for exerting a moment on said circuit closing means in opposition to that exerted by said diaphragm means, an indicator graduated in vertical velocity secured to said output shaft, and an indicating means graduated in altitude secured to said altitude shaft, the position of said roller on said disc gear and the rotational speed of said altitude shaft being a function of said vertical velocity.

14. A barometric device for computing and indicating the altitude and vertical velocity of an aircraft, said device being responsive to changes in the earth's atmospheric pressure with change of altitude above the earth's surface, comprising a plurality of diaphragms under atmospheric pressure, a pair of electrical circuits having circuit closing means, means responsive to the movement of said diaphragm means with change of atmospheric pressure for exerting an actuating moment on said circuit closing means to one or the other of the pair of electrical circuits, a rotatable output shaft operable in either direction, means including solenoid-actuated clutch means responsive to said circuit closing means for rotating said shaft in one or the other direction dependent on which circuit has been closed, a disc gear, a governor controlled electrical driving means for driving said clutch means and said disc gear, a variable speed rotatable roller, means including a spring for holding one face of said disc gear in firm but movable contact with said roller, means including a carriage means responsive to the rotation of said output shaft for positioning said roller on said disc gear, the rotational speed of said roller being a function of its position from the center of said disc gear, an altitude shaft, a differential means responsive to the rotation of said roller and said output shaft for rotating said altitude shaft, a cam means secured to and rotatable with said altitude shaft, means including a cable means and two opposing spring means actuable by rotation of said cam means for exerting a moment on said circuit closing means in opposition to that exerted by said diaphragm means, an indicator graduated in vertical velocity secured to said output shaft, and an indicating means graduated in altitude secured to said altitude shaft, the position of said roller on said disc gear and the rotational speed of said altitude shaft being a function of said vertical velocity.

15. A barometric device for computing the altitude and vertical velocity of an aircraft, said device being responsive to changes in the earth's atmospheric pressure, comprising a plurality of diaphragms under atmospheric pressure, a pair of electrical circuits having circuit closing means, means responsive to the movement of said diaphragm means with change of atmospheric pressure for exerting an actuating movement on said circuit closing means to one or the other of the pair of electrical circuits, a rotatable output shaft operable in either direction, means including solenoid-actuated clutch means responsive to said circuit closing means for rotating said shaft in one or the other direction dependent on which circuit has been closed, a disc gear, a governor controlled electrical driving means for driving said clutch means and said disc gear, a variable speed rotatable roller, means including a spring for holding one face of said disc gear in firm but movable contact with said roller, means including a carriage means responsive to the rotation of said output shaft for positioning said roller on said disc gear, the rotational speed of said roller being a function of its position from the center of said disc gear, a differential means responsive to the rotation of said roller and said output shaft for rotating said altitude shaft, a cam means secured to and rotatable with said altitude shaft, means including a cable means and two opposing spring means actuable by rotation of said cam means for exerting a moment on said circuit closing means in opposition to that exerted by said diaphragms means, the position of said roller on said disc gear and the rotational speed of said altitude shaft being a function of said vertical velocity.

16. A device for computing and indicating the vertical velocity and altitude of an aircraft, said device being responsive to changes in the earth's atmospheric pressure with change of altitude above the earth's surface, comprising a plurality of diaphragms under atmospheric pressure, a rotatable output shaft operable in either direction, a pair of electrical circuits having circuit closing means responsive to the movement in one direction of said diaphragms with a change of atmospheric pressure for closing one of said circuits, a clutch means responsive to said circuit closing means for rotating said output shaft in one or the other direction dependent on which circuit has been actuated, a variable speed roller, a constant speed rotatable disc gear having one face thereof in firm but movable contact with said roller, electrical means for driving said clutch means and said roller, means including a carriage means responsive to the rotation of said output shaft for positioning said roller on said disc gear, said roller being zeroed at an artificial zero position somewhat away from the center of said disc gear, means including a first differential means for compensating for the zero position of said roller away from the center of said disc gear, an altitude shaft, means including a second differential means responsive to the rotation of said roller via said first differential means and to said output shaft for rotatably driving said altitude shaft, means including a cam means, a cable means and a dual-spring means responsive to the rotation of said altitude shaft for actuating said circuit closing means in opposition to said diaphragms, an indicator graduated in vertical velocity secured to said output shaft, and an indicating means graduated in altitude secured to said altitude shaft, the position of said roller on said disc-gear and the rotational speed of said altitude shaft being a function of said vertical velocity.

17. A device for computing the vertical velocity and altitude of an aircraft, said device being responsive to changes in the earth's atmospheric pressure with change of altitude above the earth's surface, comprising a plurality of diaphragms under atmospheric pressure, a rotatable output shaft operable in either direction, a pair of electrical circuits having circuit closing means responsive to the movement in one direction of said diaphragms with a change of atmospheric pressure for closing one of said circuits, a clutch means responsive to said circuit closing means for rotating said output shaft in one or the other direction dependent on which circuit has been actuated, a variable speed roller, a constant speed rotatable disc-gear having one face thereof in firm but movable contact with said roller, an electric motor for driving said clutch means and said disc-gear, means including a carriage means responsive to the rotation of said output shaft positioning said roller on said disc-gear, an altitude shaft, means including a differential means responsive to the rotation of said roller and said output shaft for rotatably driving said altitude shaft, and means including a cam means, a cable means and a dual-spring means responsive to the rotation of said altitude shaft for actuating said circuit closing means in opposition to said diaphragms, the position of said roller on said disc-gear and the rotational speed of said altitude shaft being a function of said vertical velocity.

18. A device for computing the vertical velocity and altitude of an aircraft in which installed, comprising a plurality of diaphragms under atmospheric pressure, a rotatable output shaft operable in either direction, a pair of electrical circuits having circuit closing means responsive to the movement in one direction of said diaphragms with a change of atmospheric pressure for closing one of said circuits, a clutch means responsive to said circuit closing means for rotating said output shaft in one or the other direction dependent on which circuit has been actuated, a variable speed roller, a constant speed rotatable disc-gear having one face thereof in firm but movable contact with said roller, an electric motor for driving said clutch means and said disc-gear, means including a carriage means responsive to the rotation of said output shaft positioning said roller on said disc-gear, an altitude shaft, and means including a differential means responsive to the rotation of said roller and said output shaft for rotatably driving said altitude shaft, and means responsive to the rotation of said altitude shaft for actuating said circuit closing means to close the other said circuit.

19. A barometric device for use in aircraft for computing and indicating the altitude and vertical velocity of said aircraft, comprising a diaphragm means responsive to changes in the earth's atmospheric pressure, an overcontrol preventing means limiting the response of said diaphragm means resulting from the change of atmospheric pressure, an output means including a shaft rotatable in either direction, means including a pair of electrical circuits having circuit closing means and a clutch means responsive to the movement of said diaphragm means and said overcontrol means for positioning said output means, a motor for driving said shaft and said clutch means, said overcontrol preventing means including a variable speed roller, means responsive to said output means and gear means driven by said motor for varying the speed of said roller, a differential means responsive to said output means and said gear means, an indicator graduated in vertical velocity positioned by said ouput means, and an indicating means graduated in altitude positioned by said differential means.

20. A barometric device for use in aircraft for computing and indicating the altitude and vertical velocity of said aircraft, comprising a diaphragm means responsive to changes in the earth's atmospheric pressure, an overcontrol preventing means limiting the response of said diaphragm means resulting from the change of atmospheric pressure, an output means including a shaft rotatable in either direction, means including a pair of electrical circuits having circuit closing means and a clutch means responsive to the movement of said diaphragm means and said overcontrol means for positioning said output means, a motor for driving said shaft and said clutch means, said overcontrol means including a variable speed roller, means responsive to said output means and gear means driven by said motor for varying the speed of said roller, an indicator graduated in vertical velocity positioned by said output means, and an indicating means graduated in altitude positioned by said overcontrol means.

21. A barometric device for use in aircraft for computing and indicating the altitude and vertical velocity of said aircraft, comprising a diaphragm means responsive to changes in the earth's atmospheric pressure, an overcontrol preventing means limiting the response of said diaphragm means resulting from the change of atmospheric pressure, an output means including a shaft rotatable in either direction, means including a pair of electrical circuits having circuit closing means and a clutch means responsive to the movement of said diaphragm means and said overcontrol means for positioning said output means, a motor for driving said shaft and said clutch means, said overcontrol means including a variable speed roller, and means responsive to said output means and gear means driven by said motor for varying the speed of said roller.

22. A barometric device for use in aircraft for computing and indicating the altitude and vertical velocity of said aircraft, comprising a diaphragm means responsive to changes in the earth's atmospheric pressure, an overcontrol preventing means limiting the response of said diaphragm means resulting from atmospheric pressure changes, an output means including a shaft rotatable in either direction, a first driving means for said output means, a second driving means for said overcontrol means, said output means being responsive to said first and second driving means, said overcontrol preventing means including a variable speed roller, means responsive to said first and second driving means for varying the speed of said roller, a differential gear system driven by said first and second driving means, an indicator graduated in vertical velocity positioned by said output means, and an indicating means graduated in altitude positioned by said differential system.

23. A barometric device for use in aircraft for computing and indicating the altitude and vertical velocity of said aircraft, comprising a diaphragm means responsive to changes in the earth's atmospheric pressure, an overcontrol preventing means limiting the response of said diaphragm means resulting from atmospheric pressure changes, an output means including a shaft rotatable in either direction, a system of gears operable in response to movement of said diaphragm means and said overcontrol preventing means for actuating said output means, said overcontrol preventing means including a variable speed roller, shiftable means responsive to said output means for varying the speed of said roller, an indicator graduated in vertical velocity positioned by said output means, a differential means in said system of gears, and an indicating means graduated in altitude positioned by said differential means.

24. In a barometric device for use in aircraft for computing and indicating the altitude and vertical velocity of said aircraft, comprising a diaphragm means responsive to changes in the earth's atmospheric pressure, an overcontrol preventing means limiting the response of said diaphragm means resulting from atmospheric pressure changes, an output means including a shaft rotatable in either direction, a system of gears operable in response to movement of said diaphragm means and said overcontrol preventing means for actuating said output means, said overcontrol preventing means including a variable speed roller, and shiftable means responsive to said output means for varying the speed of said roller.

25. An aiming angle sight for use in directing the flight path of an aircraft on a collision course toward a target comprising an optical system including in the line of sight thereof a rotatable and tiltable prism, the line of sight from the eye of the operator to the target passing through the field of view of said optical system, first and second reticles in said field of view, vertical and azimuth gyroscopic means, means controlled by said vertical gyroscopic means for stabilizing said first reticle relative to the roll axis of said aircraft, means controlled by said azimuth gyroscopic means for stabilizing said second reticle relative to the yaw and pitch axes of said aircraft whereby movements of the target and the longitudinal axis of the aircraft are indicated by relative displacements of the target and said first and second reticles and alignment of the target with the reticles is accomplished by changes in the direction of the flight path, control means for precessing the azimuth gyroscopic means in response to changes in the direction of said flight path to move its axis in the same direction as such changes and maintain said second reticle in said field of view, and overcontrol means controlled by said precessing control means for rotating and tilting said prism to change said line of sight in a direction opposite to said flight path changes.

References Cited in the file of this patent

UNITED STATES PATENTS

| | | |
|---|---|---|
| 1,449,526 | Mackensen | Mar. 27, 1923 |
| 1,519,002 | Morse | Dec. 9, 1924 |
| 1,783,769 | Bates | Dec. 2, 1930 |
| 1,919,191 | Bates | July 25, 1933 |
| 1,934,375 | Reynolds et al. | Nov. 7, 1933 |
| 2,078,982 | Stark | May 4, 1937 |
| 2,105,147 | Inglis | Jan. 11, 1938 |
| 2,309,400 | Kollsman | Jan. 29, 1943 |
| 2,371,606 | Chafee et al. | Mar. 20, 1945 |
| 2,392,436 | Van Auken | Jan. 8, 1946 |
| 2,407,191 | Tear et al. | Sept. 3, 1946 |
| 2,408,356 | Willard | Sept. 24, 1946 |
| 2,409,648 | Van Auken et al. | Oct. 22, 1946 |
| 2,410,097 | Morgenthaler | Oct. 29, 1946 |
| 2,410,468 | Van Auken et al. | Nov. 5, 1946 |
| 2,424,257 | Sherman | July 22, 1947 |
| 2,428,678 | Norden et al. | Oct. 7, 1947 |
| 2,438,532 | Barth | Mar. 30, 1948 |

FOREIGN PATENTS

| | | |
|---|---|---|
| 454,443 | Great Britain | Oct. 1, 1936 |
| 457,473 | Great Britain | Nov. 30, 1936 |